US012633275B1

(12) United States Patent
Nash et al.

(10) Patent No.: US 12,633,275 B1
(45) Date of Patent: May 19, 2026

(54) SUPER FAN MUSIC AND MEDIA SUBSCRIPTION TIERS

(71) Applicant: Music IP Holdings (MIH), Inc., Charleston, SC (US)

(72) Inventors: Michael Nash, Charleston, SC (US); Jonathan Dworkin, Charleston, SC (US); Christopher Horton, Charleston, SC (US)

(73) Assignee: Music IP Holdings, Inc., Nashville, TN (US)

( * ) Notice: Subject to any disclaimer, the term of this patent is extended or adjusted under 35 U.S.C. 154(b) by 0 days.

(21) Appl. No.: 19/354,680

(22) Filed: Oct. 9, 2025

Related U.S. Application Data

(60) Provisional application No. 63/782,518, filed on Apr. 2, 2025.

(51) Int. Cl.
G10H 1/00 (2006.01)
G06F 9/50 (2006.01)

(52) U.S. Cl.
CPC ......... G10H 1/0025 (2013.01); G06F 9/5038 (2013.01)

(58) Field of Classification Search
CPC .......................... G10H 1/0025; G06F 9/5038
See application file for complete search history.

(56) References Cited

U.S. PATENT DOCUMENTS 12,019,982 B2    6/2024   Veyseh et al.
12,080,046 B2    9/2024   Saraee et al.
(Continued)

FOREIGN PATENT DOCUMENTS

AU        2004258523 A1    1/2005
CA          2065641 A1    11/2006
(Continued)

OTHER PUBLICATIONS

Atal et al., "A pattern recognition approach to voiced-unvoiced-silence classification with applications to speech recognition", IEEE Transactions on Acoustics, Speech, and Signal Processing (vol. 24, Issue: 3, Jun. 1976), 12 Π pgs.
(Continued)

*Primary Examiner* — Jeffrey Donels

(57) ABSTRACT

Aspects of the present disclosure are directed to a method for providing differentiated access in a media subscription platform. The method may comprise: maintaining a data store that associates subscribers with subscription tiers and stores a permission policy defining allowed subscriber interactions with media items supplied by creators. The method comprises receiving, from a client device of a premium tier subscriber, a request relating to a referenced media item. The method comprises determining, from the permission policy, at least one content-interaction mode permitted for the subscriber with respect to the referenced media item. The method comprises generating, by an AI model selected based on the content-interaction mode and permission policy, modified content, supplemental content, or generative content. The AI model may generate natural language explanations for music recommendations, analyze subscriber comments to identify positive community engagement, facilitate social connections between subscribers, create interactive visual experiences, and provide conversational artist information.

23 Claims, 13 Drawing Sheets

(56)  References Cited

U.S. PATENT DOCUMENTS

| | | | |
|---|---|---|---|
| 12,086,857 | B2 | 9/2024 | Kharbanda et al. |
| 12,106,318 | B1 | 10/2024 | Chiang et al. |
| 12,106,548 | B1 | 10/2024 | Brudalla et al. |
| 12,118,325 | B2 | 10/2024 | Gray et al. |
| 12,118,976 | B1 | 10/2024 | Chen et al. |
| 12,165,655 | B1 | 12/2024 | Sandrew |
| 12,204,627 | B2 | 1/2025 | Wexler |
| 2006/0004669 | A1 | 1/2006 | Ito |
| 2006/0190970 | A1* | 8/2006 | Hellman ............... H04N 21/84 |
| | | | 725/74 |
| 2006/0271494 | A1 | 11/2006 | Ito |
| 2007/0140318 | A1* | 6/2007 | Hellman ............... H04H 20/28 |
| | | | 375/130 |
| 2022/0059063 | A1* | 2/2022 | Balassanian ........... G06N 3/006 |
| 2022/0092267 | A1 | 3/2022 | Hou et al. |
| 2022/0134914 | A1* | 5/2022 | Jung .................... B60N 2/0025 |
| | | | 297/256.1 |
| 2023/0095092 | A1 | 3/2023 | Xiao et al. |
| 2023/0377099 | A1 | 11/2023 | Kreis et al. |
| 2023/0377214 | A1 | 11/2023 | Kansy et al. |
| 2024/0005604 | A1 | 1/2024 | Kreis et al. |
| 2024/0095987 | A1 | 3/2024 | Piramutha et al. |
| 2024/0152544 | A1 | 5/2024 | Aykut et al. |
| 2024/0185396 | A1 | 6/2024 | Hatamizadeh et al. |
| 2024/0253217 | A1 | 8/2024 | Vahdat et al. |
| 2024/0282079 | A1 | 8/2024 | Saraee et al. |
| 2024/0289407 | A1 | 8/2024 | Rofouei et al. |
| 2024/0304177 | A1 | 9/2024 | Wu et al. |
| 2024/0312087 | A1 | 9/2024 | Agrawal et al. |
| 2024/0346629 | A1 | 10/2024 | Harikumar et al. |

FOREIGN PATENT DOCUMENTS

| | | | |
|---|---|---|---|
| CA | 2605646 | A1 | 11/2006 |
| CN | 1525363 | A | 9/2004 |
| JP | 2004013493 | A | 1/2004 |
| JP | 2004506947 | A | 3/2004 |
| JP | 2004193843 | A | 7/2004 |
| JP | 2006244075 | A | 9/2006 |
| JP | 3990853 | B2 | 10/2007 |
| JP | 4353651 | B2 | 10/2009 |
| JP | 4456185 | B2 | 4/2010 |
| KR | 100865247 | B1 | 10/2008 |
| TR | 2024005874 | A2 * | 5/2024 |
| TR | 2024006991 | A2 * | 9/2024 |
| WO | 2024097380 | A1 | 5/2024 |
| WO | 2024158853 | A1 | 8/2024 |
| WO | 2024220450 | A1 | 10/2024 |
| WO | 2024243183 | A2 | 11/2024 |

OTHER PUBLICATIONS

Kingma et al., "Auto-Encoding Variational Bayes", Cornell Univ., arXiv:1312.6114v11 [stat. ML]—, Dec. 10, 2022, pgs.

Sohl-Dickstein et al., "Deep Unsupervised Learning using Nonequilibrium Thermodynamics" Cornell Univ., arXiv:1503.03585v8 [cs.LG], Nov. 18, 2015. 18 pgs.

Ronneberger et al., "U-Net: Convolutional Networks for Biomedical Image Segmentation", Cornell Univ., arXiv:1505.04597v1 [cs.CV], May 18, 2015, 8 pgs.

Ho et al., "Denoising Diffusion Probabilistic Models", Cornell Univ., arXiv:2006.11239v2 [cs.LG], Dec. 16, 2020, 25 pgs.

Radford et al., "Learning Transferable Visual Models From Natural Language Supervision", Cornell Univ., arXiv:2103.00020v1 [cs.CV], Feb. 26, 2021, 48 pgs.

Dhariwal et al., "Diffusion Models Beat GANs on Image Synthesis", Cornell Univ., arXiv:2105.05233v4 [cs.LG], Jun. 2021, 44 pgs.

Rombach et al., "High-Resolution Image Synthesis with Latent Diffusion Models", Cornell Univ., arXiv:2112.10752v2 [cs. CV], Apr. 13, 2022, 45 pgs.

Blattmann et al., "Semi-Parametric Neural Image Synthesis", Cornell Univ., arXiv:2204.11824v3 [cs.CV], Oct. 24, 2022, 34 pgs.

Karras et al., . . . "Elucidating the Design Space of Diffusion-Based Generative Models", Cornell Univ., arXiv:2206.00364v2 [cs.CV], Oct. 11, 2022, 47 pgs.

Graikos et al., "Diffusion models as plug-and-play priors" Cornell Univ., arXiv:2206.09012v3 [cs.LG], Jan. 8, 2023, 22 pgs.

Luo, "Understanding Diffusion Models: A Unified Perspective", Cornell Univ., arXiv:2208.11970v1 [cs.LG], Aug. 25, 2022, 23 pgs.

Ruiz et al., "DreamBooth: Fine Tuning Text-to-Image Diffusion Models for Subject-Driven Generation", Cornell Univ., arXiv:2208.12242v2 [cs.CV], Mar. 15, 2023, 25 pgs.

Yang et al., "Diffusion Models: A Comprehensive Survey of Methods and Applications", Cornell Univ., arXiv:2209.00796v9 [cs.LG], Oct. 24, 2022, 39 pgs.

Yang et al., "Diffusion Models: A Comprehensive Survey of Methods and Applications", Cornell Univ., arXiv:2209.00796v13 [cs. LG], Oct. 24, 2022, 39 pgs.

Lipman et al., "Flow Matching for Generative Modeling", Cornell Univ., arXiv:2210.02747v2 [cs. LG], Feb. 8, 2023, 28 pgs.

Peebles et al., "Scalable Diffusion Models with Transformers", Cornell Univ., arXiv:2212.09748v2 [cs. CV], Mar. 2023, 25 pgs.

Schneider et al., "MoOsai: Text-to-Music Generation with Long-Context Latent Diffusion", Cornell Univ., arXiv:2301.11757v2 [cs. CL], Jan. 30, 2023, 13 pgs.

Fei, et al., "Generative Diffusion Prior for Unified Image Restoration and Enhancement", Cornell Univ., arXiv:2304.01247v1 [cs. CV], Apr. 3, 2023, 46 pages.

Ghosal, et al., "Text-to-Audio Generation using Instruction-Tuned LLM and Latent Diffusion Model", Cornell Univ., arXiv:2304.13731v2 [eess.AS], May 29, 2023, 15 pages.

Liu, et al., AudioLDM: Text-to-Audio Generation with Latent Diffusion Models, Cornell Univ., arXiv:2301.12503v3 [cs. SD], Sep. 9, 2023, 25 pages.

Wei, et al., "ELITE: Encoding Visual Concepts into Textual Embeddings for Customized Text-to-Image Generation", Cornell Univ., arXiv:2302.13848v2 [cs.CV], Aug. 18, 2023, 16 pages.

Zhang, et al., "A Survey on Audio Diffusion Models: Text to Speech Synthesis and Enhancement in Generative AI", Cornell Univ., arXiv:2303.13336v2 [cs.SD], Apr. 2, 2023, 18 pages.

Nikkiran, et al., "Step-by-Step Diffusion: An Elementary Tutorial", Cornell Univ., arXiv:2406.08929v2 [cs.LG], Jun. 23, 2024, 51 pages.

Copet, et al., "Simple and Controllable Music Generation", Cornell Univ., arXiv:2306.05284v3 [cs. SD], Jan. 30, 2024, 17 pages.

Li, et al., "JEN-1: Text-Guided Universal Music Generation with Omnidirectional Diffusion Models", Cornell Univ., arXiv:2308.04729v1 [cs. SD], Aug. 9, 2023, 12 pages.

Yao, et al., "JEN-1 Composer: A Unified Framework for High-Fidelity Multi-Track Music Generation", Cornell Univ., arXiv:2310.19180v2 [cs.SD], Nov. 3, 2023, 12 pages.

Xue, et al., "Auffusion: Leveraging the Power of Diffusion and Large Language Models for Text-to-Audio Generation", Cornell Univ., arXiv:2401.01044v1 [cs.SD], Jan. 2, 2024, 17 pages.

Zheng, et al., "BAT: Learning to Reason about Spatial Sounds with Large Language Models", Cornell Univ., arXiv:2402.01591v2 [eess. AS], May 25, 2024, 16 pages.

Sammani, et al., "Interpreting and Analyzing CLIP's Zero-Shot Image Classification via Mutual Knowledge", Cornell Univ., arXiv:2410.13016v2 [cs.CV], Oct. 20, 2024, 28 pages.

Sammani, et al., "Interpreting and Analyzing CLIP's Zero-Shot Image Classification via Mutual Knowledge", Cornell Univ., arXiv:2410.13016v1 [cs.CV], Oct. 16, 2024, 28 pages.

Chen, et al., "F5-TTS: A Fairytaler that Fakes Fluent and Faithful Speech with Flow Matching", Cornell Univ., arXiv:2410.06885v2 [eess.AS], Oct. 15, 2024, 18 pages.

Chen, et al., "Contrastive Localized Language-Image Pre-Training", Cornell Univ., arXiv:2410.02746v1 [cs.CV], Oct. 3, 2024, 20 pages.

Xin, et al., "DiffATR: Diffusion-based Generative Modeling for Audio-Text Retrieval", Cornell Univ., arXiv:2409.10025v2 [cs.SD], Oct. 17, 2024, 5 pages.

Chen, et al., "JEN-1 DreamStyler: Customized Musical Concept Learning via Pivotal Parameters Tuning", Cornell Univ., arXiv:2406.12292v1 [cs.SD], Jun. 28, 2024, 13 pages.

(56)        References Cited

OTHER PUBLICATIONS

Chan, Stanley, H., "Tutorial on Diffusion Models for Imaging and Vision", Cornell Univ., arXiv:2403.18103v2 [cs.LG], Sep. 6, 2024, 89 pages.

Tu, et al., "A Closer Look at the Robustness of Contrastive Language-Image Pre-Training (CLIP)", Cornell Univ., arXiv:2402.07410v1 [cs.CV], Feb. 12, 2024, 14 pages.

Esser, et al., "Scaling Rectified Flow Transformers for High-Resolution Image Synthesis", Cornell Univ., arXiv:2403.03206v1 [cs.CV], Mar. 5, 2024, 28 pages.

Bansal, et al., "Universal Guidance for Diffusion Models", Cornell Univ., arXiv:2302.07121v1 [cs.CV], Feb. 14, 2023, 10 pages.

Young, Mike, "A Complete Guide to Turning Text into Audio with Audio-LDM", retrieved from the internet on Oct. 20, 2024, https://notes.airmodels.fyi/audio-ldm-ai-text-to-audio-generation-with-latent-diffusion-models/, 9 pages.

"Lecture 14: LPC speech synthesis and autocorrelation-based pitch tracking", ECE 417, Multimedia Signal Processing, Oct. 10, 2019, 37 pages.

Ribeiro, Andre, "Linking Images and Text with OpenAI CLIP", Tawards Data Scoemce.retrieved from the internet on Oct. 22, 2024, https://towardsdatascience.com/linking-images-and-text-wth-openai-clip-abb4bdf5dbd2, 23 pages.

Copet, Jade, "MusicGen:Simple and Controllable Music Generation", GitHub, retrieved from the internet on Oct. 20, 2024, https://github.com/facebookresearch/audiocraft/blob/main/docs/MUSICGEN.md, 10 pages.

Agostinelli, et al., "MusicLM: Generating Music From Text", Cornell Univ., arXiv:2301.11325v1 [cs. SD], Jan. 26, 2023, 15 pages.

Microsoft Copilot: Your AI Companion, retrieved from the internet on Oct. 23, 2024, https://copilot. microsoft.com/?FORM=hpcodx&showconv=1, 3 pages.

Graf et al., "Features for voice activity detection: a comparative analysis", EURASIP Journal on Advances in Signal Processing, a SpringerOpen Journal, 2015, 15 pages.

"SELD SpatialSoundQA", GitHub, retrieved from the internet on Oct. 20, 2024, https://github.com/X-LANCE/SLAM-LLM/blob/main/examples/seld_spatialsoundqa/README.md, 4 pages.

Radford, et al., "Contrastive Language-Image Pretraining", CLIP Explained, Papers With Code, retrieved from the internet on Oct. 22, 2024, https://paperswithcode.com/method/clip, 5 pages.

Huang, et al., "Make-An-Audio: Text-To-Audio Generation with Prompt-Enhanced Diffusion Models", Cornell Univ., arXiv:2301.12661v1 [cs. SD], Jan. 30, 2023, 16 pages.

Aguilera, Frank Morales, "Open AI Clip: Bridging Text and Images", The Deep Hub, https://medium.com/thedeephub/openai-clip-bridging-text-and-images-aaf3cd20299e, Apr. 11, 2024, 15 pages.

Ramponi, Marco, "Recent developments in Generative AI for Audio", AssemblyAI, retrieved from the internet on Oct. 20, 2024, https://www.assemblyai.com/blog/recent-developments-i n-generative-ai-for-audio/, 34 pages.

Weng, Lilian, "What are Diffusion Models?", GitHub, Jul. 11, 2021, https://lilianweng.github.io/posts/2021-07-11-diffusion-models/#reverse-diffusion-process, 25 pages.

O'Connor, Ryan, "Automatic summarization with LLMs in Python", AssemblyAI, retrieved from the internet on Oct. 20, 2024, https://www.assemblyai.com/blog/automatic-summarization-llms-python/, 12 pages.

"Apply LLMs to audio files, Learn how to leverage LLMs for speech using LeMUR", Assembly AI, retrieved from the internet on Oct. 20, 2024, https://www.assemblyai.com/docs/getting-started/apply-llm-to-audio-files, 5 pages.

"Building In-Video Search", Netflix Technology Blog, Nov. 6, 2023, 12 pages.

Stevens, Ingrid, "Chat with Your Audio Locally: A guide to RAG with Whisper, Ollama, and FAISS", Medium, Nov. 19, 2023, https://medi um. com/@ingridstevens/chat-with-your-audio-locally-a-gui de-to-rag-with-whisperollama-and-faiss-6656b040a68, 9 pages.

Anderson, Brian, "Reverse-Time Diffusion Equation Models", Stochastic Processes and their Applications 12 (1982) 313-326, North-Holland Publishing Company, 14 pages.

"Content Moderation", AssemblyAI, retrieved from the internet on Oct. 20, 2024, https://www.assembyai.com/docs/audio-intelligence/content-moderation, 11 pages.

Muthukumar, "Detecting Voiced, Unvoiced and Silent parts of a speech signal", Medium, Mar. 19, 2024, https://muthuku37.medium.com/detecting-voiced-unvoiced-and-silent-parts-of-a-speech-signal ?4e6fbf5e 75, 26 pages.

"Diffusion Models: A Comprehensive High-Level Understanding", Research Graph, Medium, May 21, 2024, https://medium.com/@researchgraph/diffusion-model-compreshensive-high-level-understanding-55d6ecad2cba, 22 pages.

Larcher, Mario, "Diffusion Transformer Explained", Towards Data Science, Feb. 28, 2024, https://medium.com/towards-data-sciene/diffusion-transforer-explai ned-e603c4770f7 e, 19 pages.

O'Connor, Ryan, "Introduction to Diffusion Models for Machine Learning" AssemblyAI, May 12, 2022, https://www. assemblyai.com/blog/diffusion-models-for-machine-learning-introduction/, 34 pages.

Andreas, et al., "DRCap_Zeroshot_Audio-Captioning", GitHub, retrieved from the internet on Oct. 20, 2024, https://github.com/X-LANCE/SLAM-LLM/blob/main/examples/drcap_zeroshot_aac/README.md, 3 pages.

Di Pietro, Mauro, "GenAI with Python: Build Agents from Scratch (Complete Tutorial)", Towards Data Science, Sep. 29, 2024, https://towardsdatascience.com/genai-with-python-build-agents-from-scratch-com pletetutorial-4fc1 e0814e2ec, 31 pages.

Ramesh, et al., "Hierarchical Text-Conditional Image Generation with CLIP Latents", Cornell Univ., arXiv:2204.06125v1 [cs.CV], Apr. 13, 2022, 27 pages.

Ramirez, et al., "Voice Activity Detection. Fundamentals and Speech Recognition System Robustness." InTech Open Science Open Minds, 2007, 24 pages.

Swimberghe, Niels, "How to integrate spoken audio into LangChain.js using AssemblyAI", AssemblyAI, Aug. 15, 2023, https://www.assemblyai.com/blog/integrate-audio-langchainjs/, 12 pages.

"A Fairytaler that Fakes Fluent and Faithful Speech with Flow Matching", F5-TTS, retrieved from the internet on Oct. 20, 2024, https://swivid.github.io.F5-TTS/, 17 pages.

"CLIP: Connecting text and images", OpenAI, Jan. 5, 2021, https://openai.com/index/clip/, 16 pages.

"CLIP", Hugging Face, retrieved from the internet on Oct. 22, 2024, https://huggingface.co/docs/transformers/model_doc/clip, 49 pages.

Rustamy, Fahim, Phd., "CLIP Model and The Importance of Multimodal Embeddings", Towards Data Science, Dec. 11, 2023, https://towardsdatascience.com/clip-model-and-the-importance-of-multimodalembeddings-1c8f6b13bf72, 20 pages.

"Diffusion Models from Scratch", Hugging Face Diffusion Course, retrieved from the internet on Oct. 22, 2024, https://huggingface.co/learn/diffusion-course/en/unit1 /3, 31 pages.

"MC_MusicCaps", GitHub, retrieved from the internet on Oct. 20, 2024, https://github.com/L-LANCES/SLAM-LLM/blob/main/examples/mc_musiccaps/README. md, 2 pages.

Briggs, James, "Quick-fire Guide to Multi-Modal ML With OpenAI's CLIP", Towards Data Science, Aug. 11, 2022, https://towardsdatascience. com/quick-tire-guide-to-multi-modal-ml-with-openais-cli p. 2dad7 e398ac0, 21 pages.

Bouchard, Louis-Francois, "Stable Diffusion for Videos Explained", Towards AI, Nov. 29, 2023, https://pub.towardsai.net/stable-diffusion-for-videos-explained-fawf0b6af3b0, 15 pages.

Erdem, Kemal, "Step by Step visual introduction to Diffusion Models", published Nov. 1, 2023, https://erdem.pl/2023/11/step-by-step-visual-introduction-to-diffusion-models, 15 pages.

"Stable Diffusion: Training Your Own Model in 3 Simple Steps", run:ai, https://www.run.ai.guides/generative-ai/stablediffusion-training, 10 pages.

Stevens, Ingrid, "Uncovering Insights in Audio: An Exploration", GitHub, retrieved from the internet on Oct. 20, 2024, https://github.com/ingridstevens/whisper-audio-transcriber/tree/main, 6 pages.

(56) References Cited

OTHER PUBLICATIONS

Palucha, Szymon, "Understanding OpenAI's CLIP model", Medium, Feb. 24, 2024 https://medium.com/@paluchasz/understanding-openais-cl i p-m odel-6b52bade3fa3, 23 pages.

Chen et al., JEN-1 DreamStyler: Customized Musical Concept Learning via Pivotal Parameters Tuning, Cornell Univ., arXiv:2406. 12292 [cs.SD], Jun. 18, 2024, 13 pages.

Github, "SLAM-MC", retrieved from the internet on Oct. 20, 2024, https://github.com/X-LANCE/SLAM-LLM, 5 pages.

Github, "SLAM-LLM", retrieved from the internet on Oct. 20, 2024, https://github.com/X-LANCE/SLAM-LLM, 4 pages.

Huggingface.co Blog, "The Annotated Diffusion Model", retrieved from the internet on Oct. 20, 2024, https://huggingface.co/blog/annotated-diffusion, 38 pages.

Huggingface.co Blog, "Train a Diffusion Model", retrieved from the internet on Oct. 20, 2024, https://huggingface.co/docs/ diffusers/tutorials/basic_training, 12 pages.

IBM, "What are Diffusion Models?", retrieved from the internet on Oct. 22, 2024, 18 pages.

Lil 'Log, "What are Diffusion Models?", retrieved from the internet on Oct. 22, 2024, 25 pages.

Assembly AI, "Topic Detection", retrieved from the internet on Oct. 20, 2024, https://www.assemblyai.com/docs/audiointelligence/topic-detection, 6 pages.

Assembly AI, "Key Phrases", retrieved from the internet on Oct. 20, 2024, https://www.assemblyai.com/docs/audiointelligence/key-phrases, 5 pages.

Assembly AII, "Sentiment Analysis", retrieved from the internet Oct. 20, 2024, https://www.assemblyai.com/docs/audio-intelligence/sentiment-analysis, 4 pages.

Assembly AI, "Summarization", retrieved from the internet on Oct. 20, 2024, https://assemblyai.com/docs/ audiointelligence/summarization, 6 pages.

Chen et al., "Buildin In-Video Search", Medium, Nov. 6, 2023, https://netflixtechblog.com/building-in-videosearch-936766f0017c, 12 pages.

Atal, Bishnu S.; and Rabiner, Lawrence R.; "A Pattern Recognition Approach to Voiced-Unvoiced-Silence Classification with Applications to Speech Recognition" IEEE Transactions on Acoustics, Speech, and Signal Processing, vol. ASSP-24, No. 3, pp. 201-212; Jun. 1976.

Horton, et al.; AI-Generated Derivative Content Scaling for Merchandise; U.S. Appl. No. 19/349,714, filed Oct. 3, 2025.

* cited by examiner

Permission Policy Record 202

Media Item Entry 204

Media Item ID: 206    'Song_12345'
Artist ID: 208    'Artist_780'

Tier-Based Permission Matrix 210

| Feature/Action | Basic Tier 212 | Premium Tier 214 | Super Fan Tier 216 |
|---|---|---|---|
| Streaming 218 | Allowed | Allowed | Allowed |
| AI Recommendations 220 | Basic | With Explanations | With Explanations |
| Audio Modification 222 | Prohibited | Limited | Full Access |
| Visual Generation 224 | Prohibited | Allowed | Allowed |
| Interactive Booklets 226 | Prohibited | View only | View + Contribute |
| Merchandise Design 228 | Prohibited | Prohibited | Allowed |
| Social Features 230 | Comments Only | AI-Moderated | AI-Moderated |
| Artist Chatbot 232 | Prohibited | Limited Access | Full ACcess |

⋮

Artist-Defined Constraints 234

Tempo Modification Range: 236    *0.8x to 1.2x*
Pitch Shift Range: 238    *±2 semitones*
Vocal Insertion: 240    *Allowed (backup vocals only)*
Genre Transfer: 242    *Prohibited*
Lyric Modification: 244    *Translation only*

AI Model Routing Rules 246

Discovery Model: 248    *VectorSpace_Recommender_v3*
Audio Processing Model: 250    *AudioTransform_Engine_v2*
Visual Generation: 252    *ImageSynth_Multimodal_v4*
Brand Compliance Model: 254    *BrandGuard_Classifier_v1*

Brand Guidelines Integration 256

Color Palette: 258    *#FF0000, #000000, #FFFFFF*
Logo Usage Rules: 260    *Minium size: 100px, Clear Space: 20px*
Visual Style: 262    *Dark, edgy, high contrast*

Granular Control Parameters 264

Max Processing Time: 266 = 30 seconds
Priority Weight 268 = 0.85

*FIG. 2*

SUPER FAN MUSIC AND MEDIA SUBSCRIPTION TIERS

CROSS-REFERENCE TO RELATED APPLICATIONS

This application claims the benefit of and priority to U.S. Provisional Patent Application No. 63/782,518, filed on Apr. 2, 2025, the entire contents of which are hereby incorporated by reference.

FIELD OF INVENTION

The present disclosure relates to digital media services, and more particularly to artificial intelligence-enhanced digital media subscription services.

BACKGROUND

Digital music streaming services operate on subscription models that differentiate tiers primarily through functional limitations such as advertisement presence, audio quality, number of concurrent streams, and offline download capabilities. Current platforms employ recommendation algorithms based on collaborative filtering and basic content analysis, tracking listening patterns to suggest similar content. These services provide uniform content catalogs across subscription levels, with variations only in delivery parameters and access restrictions. Rights management systems use binary permission structures where content is either fully accessible or completely restricted, without granular control mechanisms for different types of user interactions.

Artificial intelligence technologies, including large language models, natural language processing, computer vision, and generative AI systems, have advanced significantly in recent years. Retrieval-augmented generation (RAG) systems combine language models with external knowledge bases to provide contextually relevant information. Audio processing AI performs source separation, style transfer, and real-time modification of content in specialized production environments. These technologies operate primarily in professional software applications, research environments, and standalone creative tools, separate from consumer streaming platforms.

The transition from physical to digital media eliminated supplementary materials such as liner notes, album booklets, and artwork that previously enhanced the music consumption experience. Current streaming platforms provide only basic metadata and static album art, while artist-fan interactions occur predominantly through separate social media platforms without integration into the listening environment. User engagement in existing services remains largely passive, with limited opportunities for content creation, community participation, or demonstration of fan loyalty beyond basic playlist creation and sharing. Revenue models rely on flat subscription fees distributed based on stream counts, without mechanisms to capture additional value from highly engaged users who historically purchased merchandise, attended concerts, and collected physical media.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a method is provided. The method comprises maintaining, by a system comprising at least one processor and memory, a data store that associates a plurality of subscribers with subscription tiers and stores a permission policy that defines allowed subscriber interactions with media items supplied by creators. The method comprises receiving, from a client device of a subscriber of the plurality of subscribers, the subscriber being identified as belonging to a premium tier, a request relating to a referenced media item. The method comprises determining, from the permission policy, at least one content-interaction mode that is permitted for the subscriber with respect to the referenced media item. The method comprises generating, by one or more artificial-intelligence models selected based on the content-interaction mode and the permission policy, at least one of modified content, supplemental content, or generative content.

According to other aspects of the present disclosure, the method may include one or more of the following features. The method may further comprise generating natural language explanations identifying at least one of: harmonic progression patterns, tempo relationships, vocal characteristics, or thematic similarities as a reason for recommending media items to the subscriber. The explanations may be personalized based on a demonstrated musical knowledge level of a user, and a complexity of the explanations may vary according to the demonstrated musical knowledge level of the user. The musical knowledge level of the user may be determined by analyzing at least: interaction patterns with technical features, dwell time on explanations, search query complexity, and explicit user feedback.

The method may further comprise analyzing subscriber comments using a trained machine learning model to identify contributions that generate positive community engagement and increase visibility of the identified contributions. The method may further comprise enabling subscribers to overlay time-synchronized comments on media content and moderating the comments to maintain positivity while preserving constructive criticism. The method may further comprise facilitating shared listening experiences by generating AI-assisted discussion prompts based on the content and participant interaction history.

The method may further comprise predicting, by the artificial-intelligence models, subscriber combinations and interaction types that will generate positive community outcomes and proactively suggesting connections based on the predicted subscriber combinations. Suggesting connections may comprise analyzing subscriber interaction graphs to identify optimal network topologies for community growth, calculating compatibility scores based on factors including at least one of musical taste overlap, interaction style patterns, timezone compatibility, or complementary expertise areas, generating introduction prompts tailored to shared interests identified through content consumption patterns, and monitoring initial interactions to refine future connection predictions.

The modified content, supplemental content, or generative content may comprise dynamically generated interactive visual experiences that aggregate content from multiple sources including digitized album materials, web-based information, and fan submissions. The method may further comprise generating, by the artificial-intelligence models, interactive visualizations that respond to at least one of audio characteristics, lyrical content, listener movements, biofeedback, or thematic elements of the media item. The visualizations may incorporate at least one of artist imagery, fan-contributed assets, or contextual information.

The subscription tiers may be differentiated based on access to artificial-intelligence powered features. Basic tier subscribers may receive algorithmic recommendations and premium tier subscribers may receive AI-generated explanations, interactive features, and content creation capabilities. The method may further comprise dynamically allocating computational resources to prioritize AI processing requests from premium tier subscribers. The method may further comprise tracking AI feature usage by tier and adjusting available features based on subscription level and resource availability. The permission policy may indicate different AI capabilities available at each subscription tier, enabling creators to control feature access while maintaining content parity across tiers.

The content-interaction mode may include merchandise design, and the method may further comprise enabling premium tier subscribers to create designs using AI-generated imagery derived from the media item. The method may further comprise assigning design privileges based on composite engagement metrics including at least one of listening time, social participation, or community contributions. The method may further comprise maintaining, by the artificial-intelligence models, brand consistency by adapting fan designs to comply with artist-defined visual guidelines.

The supplemental content may comprise at least one of an AI-generated playlist, song recommendation, album recommendation, artist recommendation, or playlist recommendation. The supplemental content may comprise an AI-generated non-interactive visual experience in at least one of a 2D format, a 3D format, or an augmented reality format, the visual experience configured to accompany music being played by the subscriber. The supplemental content may comprise an AI-powered avatar of an artist that is configured to interact with the subscriber through natural language conversation. The supplemental content may comprise an AI-generated game thematically related to at least one of an artist, a song, an album, a playlist, or a theme.

The supplemental content may comprise AI-moderated artwork, images, and video from subscribers, and the method may further comprise sequencing, by the artificial-intelligence models, the subscriber-contributed content and optionally applying, by the artificial-intelligence models, effects and animation to the subscriber-contributed content. The supplemental content may comprise a content challenge created by at least one of an artist or an artificial-intelligence model, and the method may further comprise inviting subscribers to create and submit content meeting specified requirements, judging winning content by at least one of an artificial-intelligence model or human evaluators, and making winning content available to other subscribers. The method may further comprise facilitating, by the artificial-intelligence models, creation of the submitted content by providing at least one of AI-assisted design tools for modifying artist branding elements or AI-assisted remixing tools for modifying artist audio content.

The method may further comprise providing an AI-mediated interface through which subscribers contribute to artist-related world building content, ensuring thematic consistency of contributed content, filtering out problematic content including at least one of explicit imagery or objectionable language, and presenting the artist-related world building content as at least one of an interactive multimedia space, a game, or a collection of videos.

The method may further comprise receiving natural language queries from the subscriber regarding an artist, retrieving information from a knowledge base comprising artist-approved data, fan contributions, and web sources using retrieval augmented generation, and generating natural language responses providing contextual information about the artist. The method may further comprise verifying facts using source validation and consistency checking before generating the natural language responses.

The content-interaction mode may include audio manipulation, and the method may further comprise enabling subscribers to perform at least one of: DJ-style cross-mixing between songs using non-generative manipulation including speed change, pitch change, or source separation; or controlled music remixing including genre transfer, mashups, tempo modification, or vocal insertion under artist-defined guidelines.

The method may further comprise analyzing user-provided text descriptions or user-provided video content and generating audio clips suitable for social media sharing, the audio clips selected and modified based on user-specified parameters including at least one of clip length or content subject matter. The method may further comprise providing an interactive content-modification experience that enables the subscriber to at least one of create, transform, or curate content that is derived from or associated with the referenced media item.

The modified content, supplemental content, or generative content may comprise at least one of audio content or non-audio visual content. The permission policy may be defined at a catalog level and may apply to multiple media items supplied by a creator. The permission policy may be defined individually for each media item supplied by a creator.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

FIG. 2 illustrates a permission policy record defining subscriber interactions across subscription tiers, according to aspects of the present disclosure.

DETAILED DESCRIPTION

Figure 1:
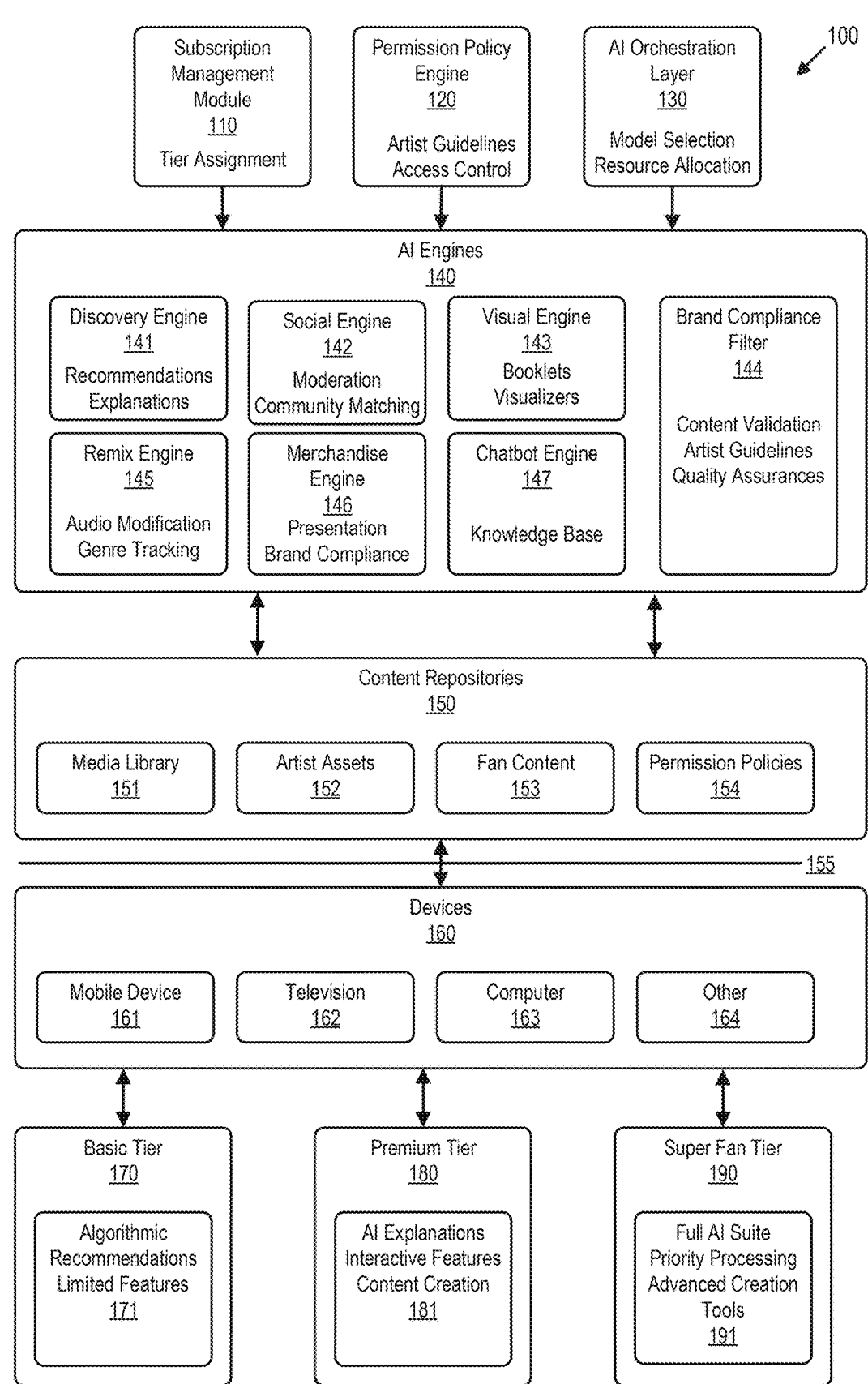
FIG. 1 illustrates a block diagram of a subscription system with AI engines and content repositories, according to aspects of the present disclosure.

The following description sets forth exemplary aspects of the present disclosure. It should be recognized, however, that such description is not intended as a limitation on the scope of the present disclosure. Rather, the description also encompasses combinations and modifications to those exemplary aspects described herein.

The present disclosure relates to an AI-augmented premium music subscription tier system that provides differentiated access to artificial intelligence-powered features based on subscriber tier levels. The system may implement a tiered subscription model where subscribers receive varying levels of AI-enhanced functionality depending on their subscription status. In some aspects, the system may comprise at least one processor and memory configured to maintain a data store that associates a plurality of subscribers with subscription tiers. The data store may also store a permission policy that defines allowed subscriber interactions with media items supplied by creators. The permission policy may specify which types of content modifications, supplemental content generation, or other AI-powered features are available to subscribers at different tier levels.

The system may receive, from a client device of a subscriber of the plurality of subscribers, a request relating to a referenced media item. The subscriber may be identified as belonging to a premium tier, which may provide access to enhanced AI features beyond those available to basic tier subscribers. The request may specify a desired interaction with the referenced media item, such as generating recommendations with explanations, modifying audio characteristics, creating visual content, or accessing interactive experiences. Upon receiving the request, the system may determine, from the permission policy, at least one content-interaction mode that is permitted for the subscriber with respect to the referenced media item. The content-interaction mode may specify the type and scope of AI-powered interactions allowed based on the subscriber's tier level and any creator-defined restrictions associated with the specific media item.

The system may generate, by one or more artificial-intelligence models selected based on the content-interaction mode and the permission policy, at least one of modified content, supplemental content, or generative content. The artificial-intelligence models may be specifically chosen to match the requested operation type and the constraints defined in the permission policy. Modified content may include transformations of existing media items, such as tempo adjustments or audio effects. Supplemental content may include additional materials that enhance the media experience, such as interactive visual experiences or personalized recommendations. Generative content may include newly created materials derived from or inspired by the referenced media item.

The following sections describe the components and methods of the AI-augmented premium music subscription tier system with specific examples of how subscribers interact with the system, how permission policies govern feature access, and how various artificial-intelligence models generate different types of content based on subscription tier and creator preferences.

Referring to FIG. 1, a subscription system 100 may provide an integrated platform architecture for delivering AI-augmented premium music subscription services. In some cases, the subscription system 100 may enable subscribers to access enhanced AI-powered features through their existing streaming service accounts while providing additional functionality that extends beyond traditional music streaming capabilities. The subscription system 100 may comprise a subscription management module 110 that handles tier assignment and subscriber authentication. The subscription management module 110 may maintain associations between subscribers and their respective subscription tiers, manage user account information, and process billing operations. In some cases, the subscription management module 110 may verify subscriber credentials and determine access privileges based on the subscriber's current tier status.

A permission policy engine 120 may be communicatively coupled to the subscription management module 110 and may store permission policies that define allowed subscriber interactions with media content. The permission policy engine 120 may enforce artist-defined guidelines and access control rules, determining which features and content modifications are permitted for each subscriber based on their tier and the specific permissions associated with each media item. In some cases, the permission policy engine 120 may evaluate requests in real-time to ensure compliance with creator-defined constraints.

An AI orchestration layer 130 may be operatively connected to the subscription management module 110 and/or the permission policy engine 120. The AI orchestration layer 130 may perform intelligent routing and model selection, determining which AI models to invoke based on the subscriber's tier, the requested content-interaction mode, and the applicable permission policy. The AI orchestration layer 130 may route discovery-related requests to the discovery engine 141, social interaction requests to the social engine 142, visual content generation requests to the visual engine 143, audio modification requests to the remix engine 145, merchandise design requests to the merchandise engine 146, and conversational queries to the chatbot engine 147, with all AI-generated outputs passing through the brand compliance filter 144 before delivery to subscribers. The AI orchestration layer 130 may dynamically allocate GPU and CPU computational resources based on subscription tier priorities, with premium and super fan subscribers receiving preferential resource allocation during high system load periods. In some cases, the AI orchestration layer 130 may manage resource allocation to ensure that higher-tier subscribers experience reduced latency and enhanced processing capabilities compared to lower-tier subscribers.

As further shown in FIG. 1, the subscription system 100 may comprise AI engines 140 that include multiple specialized components configured to perform different AI-powered functions. In some aspects, a discovery engine 141 may be configured to generate personalized music recommendations and provide natural language explanations of why particular media items are recommended. The discovery engine 141 may utilize vector space mapping and latent semantic analysis to identify relationships between songs and generate explanations tailored to the demonstrated musical knowledge level of the subscriber. In some aspects, a social engine 142 may be configured to moderate fan commentary for positivity and value, identify and elevate high-quality fan contributions, facilitate shared listening experiences with AI-assisted discussion prompts, and predict subscriber connections based on compatibility scores. The social engine 142 may analyze interaction patterns to generate positive community outcomes and enhance subscriber engagement through intelligent social features.

In some aspects, a visual engine 143 may be configured to generate interactive visual experiences and real-time visualizers. The visual engine 143 may aggregate content from multiple sources including digitized album materials, web-based information, and fan submissions to create multimedia experiences that evolve as new content becomes available. In some cases, the visual engine 143 may produce dynamic visualizations that respond to audio characteristics, lyrical content, or thematic elements of media items. In some aspects, a remix engine 145 may be configured to enable controlled music remixing, genre transfer, tempo modification, and other audio transformations within artist-defined constraints. The remix engine 145 may allow subscribers in premium and higher tiers to create derivative works according to the permission policy associated with each media item. In some aspects, a merchandise engine 146 may be configured to enable fan co-creation of merchandise designs using AI-generated imagery derived from media items. The merchandise engine 146 may assign design privileges based on composite engagement metrics and ensure brand compliance by adapting fan designs to conform with artist-defined visual guidelines. In some aspects, a chatbot engine 147 may be configured to provide natural language processing-driven conversational interactions with artist history, lore, and trivia. The chatbot engine 147 may access a knowledge base comprising artist-approved data, media, fan contributions, and public news sources to deliver contextual information and behind-the-scenes content.

In some aspects, a brand compliance filter 144 may be operatively connected to the AI engines 140 and may validate all AI-generated or AI-modified content to ensure conformity with artist guidelines, brand standards, and quality requirements. The brand compliance filter 144 may filter inappropriate content and ensure that all output maintains thematic consistency with the artist's established aesthetic. The brand compliance filter 144 may receive content from the visual engine 143, remix engine 145, and merchandise engine 146 before that content is stored in the content repositories 150 or delivered to subscriber devices 160, ensuring real-time validation of all user-generated and AI-modified materials.

With continued reference to FIG. 1, content repositories 150 may comprise multiple data storage systems that maintain different types of content and information. A media library 151 may store original media items including songs, albums, and music videos. An artist assets repository 152 may store artist-approved imagery, logos, and/or branding materials. A fan content repository 153 may store user-generated content and fan contributions. A permission policies repository 154 may store the permission policies associated with each media item and artist. The AI engines 140 may communicate bidirectionally with the content repositories 150, retrieving source content from the media library 151, artist assets repository 152, and permission policies repository 154 for processing, while storing newly generated content, user interaction history, and updated metadata in the fan content repository 153 and other appropriate repositories.

Devices 160 may communicate with the subscription system 100 over a network 155, which may comprise the Internet, cellular networks, or other data communication networks. The network 155 may support secure, encrypted communication channels that maintain subscriber privacy while enabling real-time transmission of audio, video, and interactive content between the subscription system 100 and the devices 160. The devices 160 may include a mobile device 161, a television 162, a computer 163, and other device 164 types that enable subscribers to access the AI-augmented subscription services. The devices 160 may represent different subscription tiers and their associated feature access levels.

In some aspects, a basic tier 170 may represent subscribers who may receive algorithmic recommendations and limited features through basic tier features 171. The basic tier 170 may provide access primarily to passive listening and basic discovery functions without AI-generated explanations or interactive capabilities. In some aspects, a premium tier 180 may represent subscribers who receive AI-generated explanations, interactive features, and content creation capabilities through premium tier features 181. The premium tier 180 may provide access to enhanced AI-powered functionality beyond that available to basic tier subscribers, including personalized explanations for recommendations and interactive content experiences. In some aspects, a super fan tier 190 may represent subscribers who receive access to the full AI suite, priority processing of AI requests, and advanced creation tools through super fan tier features 191. The super fan tier 190 may include merchandise co-design capabilities, exclusive interactive experiences, and enhanced social features that are not available to lower-tier subscribers.

The subscription tiers may be differentiated based on access to artificial-intelligence powered features, with each tier providing progressively more sophisticated AI capabilities. Data flows may occur bidirectionally between the subscription system 100 and the devices 160, with subscriber requests transmitted from the devices 160 to the subscription system 100, and AI-generated or AI-modified content, recommendations, and interactive experiences transmitted from the subscription system 100 to the devices 160. The AI orchestration layer 130 may dynamically allocate computational resources based on the tier of the requesting device, ensuring that premium tier 180 and super fan tier 190 subscribers receive prioritized processing compared to basic tier 170 subscribers. Each subscription tier may inherit the features of lower tiers while adding tier-specific capabilities, creating a progressive enhancement model where super fan tier 190 subscribers have access to all features available in premium tier 180 and basic tier 170, plus additional exclusive super fan tier features 191.

The subscription tier structure described herein (basic tier, premium tier, and super fan tier) is exemplary and not limiting. Alternative embodiments may implement any number of subscription tiers (e.g., two tiers, four tiers, five or more tiers) with different naming conventions, feature allocations, and pricing structures. The tier-based differentiation of AI-powered features and computational resource allocation described herein applies regardless of the specific number or nomenclature of subscription levels implemented in any particular embodiment.

Referring to FIG. 2, a permission policy record 202 may provide a hierarchical data structure that enables granular control over subscriber interactions with media content based on subscription tier and artist preferences. The permission policy record 202 may be stored in the permission policies repository 154 and may be accessed by the permission policy engine 120 to determine allowed interactions for each subscriber request. The permission policy record 202 may organize permission data in a hierarchical structure where the media item entry 204 serves as the parent identifier, with the tier-based permission matrix 210, artist-defined constraints 234, AI model routing rules 246, brand guidelines integration 256, and granular control parameters 264 serving as child data structures that collectively define the complete set of rules governing subscriber interactions with the media item. In some aspects, a media item entry 204 may form the header of the permission policy record 202 and may identify the specific media content to which the policy applies. The media item entry 204 may include a media item identifier 206, which may uniquely identify the song, album, music video, or other media asset. The media item entry 204 may further include an artist identifier 208 that may identify the artist or rights holder associated with the media item. The artist identifier 208 may link the permission policy to the specific artist's brand guidelines and creative constraints.

A tier-based permission matrix 210 may define feature access levels for each subscription tier. The tier-based permission matrix 210 may comprise a tabular data structure that maps specific features or actions to permission levels across multiple subscription tiers, enabling differential feature access based on subscriber status. The tier-based permission matrix 210 may implement a progressive permission model where capabilities typically increase from basic tier 212 through premium tier 214 to super fan tier 216, with permission values ranging from 'Prohibited' (feature unavailable), through 'Allowed' or 'Limited' (feature available with restrictions), to 'Full Access' (feature available without restrictions), as shown for various features in the matrix. The tier-based permission matrix 210 may include columns for a basic tier 212, a premium tier 214, and a super fan tier 216, representing the three primary subscription levels in the system.

As further shown in FIG. 2, the tier-based permission matrix 210 may specify various types of permissions for different features. A streaming permission 218 may specify whether subscribers at each tier are permitted to stream the media item. An AI recommendations permission 220 may specify the level of AI-powered discovery features available to each tier. As shown in the tier-based permission matrix 210, basic tier 212 subscribers may receive 'Allowed' access to basic algorithmic recommendations, while premium tier 214 and super fan tier 216 subscribers may receive 'With Explanations' access, providing AI-generated natural language breakdowns of musical structure, lyrical similarity, and other factors underlying the recommendations.

An audio modification permission 222 may specify whether and to what extent subscribers may use AI tools to modify, remix, or transform the audio content of the media item. A visual generation permission 224 may specify whether subscribers may use AI tools to generate visual content derived from or associated with the media item, such as artwork, visualizers, or animated experiences. An interactive booklets permission 226 may specify access to dynamically generated multimedia experiences that aggregate content related to the media item and artist. In some aspects, a merchandise design permission 228 may specify whether subscribers may use AI tools to co-create merchandise designs incorporating imagery derived from the media item. A social features permission 230 may specify the level of community and social interaction features available to each tier. An artist chatbot permission 232 may specify access to the natural language processing-driven conversational agent that provides artist information, history, and trivia.

With continued reference to FIG. 2, artist-defined constraints 234 may comprise a set of specific parameters and rules established by the artist or rights holder to control how AI systems may modify or transform their media content. The artist-defined constraints 234 may ensure that derivative works created by subscribers remain consistent with the artist's creative vision and brand identity. A tempo modification range 236 may specify the permissible range of tempo adjustments that may be applied to the audio content. A pitch shift range 238 may specify the permissible range of pitch adjustments that may be applied to the audio content, expressed in semitones. For example, as illustrated in FIG. 2, a permission policy record 202 may specify a tempo modification range 236 of 0.8× to 1.2× (allowing tempo adjustments between 80% and 120% of the original tempo) and a pitch shift range 238 of +2 semitones, providing clear numerical boundaries for AI-powered audio transformations. A vocal insertion rule 240 may specify whether and how subscribers may insert their own vocal recordings into the media item. A genre transfer rule 242 may specify whether AI-powered genre transformation is permitted for the particular media item. A lyric modification rule 244 may specify permissible alterations to the lyrical content of the media item.

AI model routing rules 246 may comprise a set of specifications that determine which artificial intelligence models are invoked to process requests related to the media item. A discovery model 248 may specify the particular AI model used for generating recommendations and explanations related to the media item. An audio processing model 250 may specify the particular AI model used for audio modification operations. A visual generation model 252 may specify the particular AI model used for creating visual content. A brand compliance model 254 may specify the particular AI model used for validating generated content against brand guidelines. As illustrated in FIG. 2, the AI model routing rules 246 may specify particular model implementations such as 'VectorSpace_Recommender_v3' the for discovery model 248, 'AudioTransform_Engine_v2' for the audio processing model 250, 'ImageSynth_Multimedia_v4' for the visual generation model 252, and 'BrandGuard_Classifier_v1' for the brand compliance model 254, allowing the AI orchestration layer 130 to invoke the appropriate specialized models for each type of request.

Brand guidelines integration 256 may comprise a set of visual identity rules and parameters that govern the aesthetic presentation of AI-generated content associated with the media item and artist. A color palette specification 258 may define the approved colors for use in visual content. Logo usage rules 260 may specify technical requirements for incorporating the artist's logo into generated content. A visual style descriptor 262 may provide natural language or parameterized guidance on the overall aesthetic character expected for generated visual content. Granular control parameters 264 may comprise additional configuration values that fine-tune system behavior for requests related to the permission policy record 202. A maximum processing time parameter 266 may specify the computational time limit for AI operations related to the media item. A priority weight parameter 268 may specify a numerical weighting factor used by the AI orchestration layer 130 when allocating computational resources among competing requests. The maximum processing time parameter 266 may prevent excessive computational resource consumption by terminating AI operations that exceed the specified duration (e.g., 30 seconds as shown in FIG. 2), while the priority weight parameter 268 may assign relative importance values (e.g., 0.85 as shown in FIG. 2) that the AI orchestration layer 130 uses to determine resource allocation priority when multiple subscribers request AI processing simultaneously. As an example and as shown in FIG. 2, the color palette specification 258 may define approved colors using hexadecimal color codes (e.g., '#FF0000, #000000, #FFFFFF'), the logo usage rules 260 may specify technical requirements such as 'Minimum size: 100px, Clear space: 20px', and the visual style descriptor 262 may provide aesthetic guidance such as 'Dark, edgy, high contrast' to ensure visual consistency across all AI-generated content associated with the artist.

The permission policy engine 120 may parse the permission policy record 202 to evaluate incoming subscriber requests, comparing the subscriber's tier (basic tier 212, premium tier 214, or super fan tier 216) against the tier-based permission matrix 210 and validating any requested modifications against the artist-defined constraints 234 before authorizing the AI orchestration layer 130 to process the request. The permission policy may indicate different AI capabilities available at each subscription tier, enabling creators to control feature access while maintaining content parity across tiers. In some cases, the permission policy may be defined at a catalog level and may apply to multiple media items supplied by a creator, providing consistent access rules across an artist's entire catalog. Alternatively, the permission policy may be defined individually for each media item supplied by a creator, allowing for granular control over specific songs, albums, or other content based on the creator's preferences for each individual work.

Figure 3:
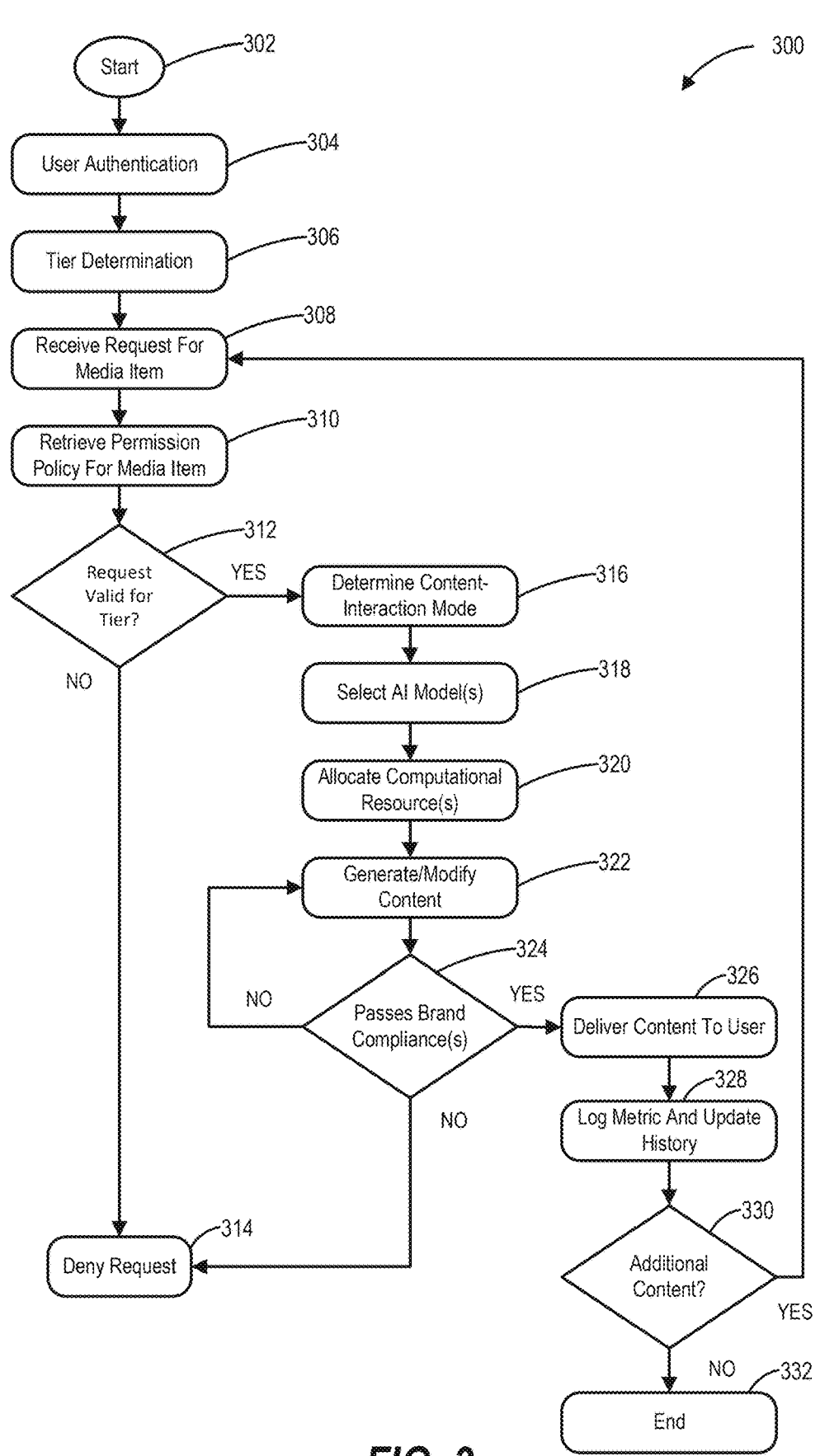
FIG. 3 illustrates a flowchart of a method for processing subscriber requests and delivering content, according to aspects of the present disclosure.

Referring to FIG. 3, a flowchart illustrating a method 300 may depict the overall process by which the subscription system 100 receives a subscriber request, determines applicable permissions based on subscription tier and permission policy, orchestrates appropriate AI models, generates or modifies content, validates brand compliance, and delivers the resulting content to the subscriber, with decision points that route the process flow based on validation outcomes.

The method 300 may begin at a step 302 and may proceed to a user authentication step 304, wherein the subscription system 100 may authenticate the identity of the subscriber making the request. The user authentication step 304 may involve validating login credentials, verifying session tokens, or authenticating through single sign-on integration with third-party platforms such as Spotify®, Apple Music®, or other music streaming services. The authentication may establish the subscriber's identity and may associate the current session with the subscriber's account record in the subscription management module 110.

Following successful authentication, the method 300 may proceed to a tier determination step 306, wherein the subscription system 100 may retrieve the subscription tier associated with the authenticated subscriber from the subscription management module 110. The tier determination step 306 may identify whether the subscriber is associated with the basic tier 212, the premium tier 214, the super fan tier 216, or other defined subscription level. The tier information may be retained in memory for subsequent permission validation operations. The flowchart structure of FIG. 3 illustrates that following tier determination, the method 300 proceeds through a series of validation gates, with the request validation decision step 312 and brand compliance decision step 324 serving as a decision points that determine whether the process continues forward through the content generation pipeline or diverts to alternative paths such as request denial at step 314 or content regeneration via the feedback loop from step 324 to step 322. In some aspects, the method 300 may then proceed to a receive request step 308, wherein the subscription system 100 may receive a request from a client device of the subscriber. The request may relate to a referenced media item and may specify a desired interaction with that media item, such as streaming, generating recommendations with explanations, modifying audio characteristics, creating visual content, accessing interactive experiences, designing merchandise, engaging with social features, or interacting with an artist chatbot. The request may include an identifier of the media item and an indication of the requested operation or content-interaction mode.

Upon receiving the request, the method 300 may proceed to a retrieve permission policy step 310, wherein the subscription system 100 may retrieve the permission policy record 202 associated with the referenced media item from the content repositories 150. The permission policy engine 120 may perform this retrieval operation, accessing the complete set of rules, constraints, and routing information that govern interactions with the specified media item. The content-interaction mode determined at step 316 may influence the AI model selection performed at subsequent step 318, as each type of interaction (recommendation generation, audio modification, visual generation, etc.) may require invocation of specific specialized AI models from the AI model routing rules 246. As further shown in FIG. 3, the method 300 may then proceed to a request validation decision step 312, wherein the subscription system 100 may determine whether the requested operation is valid for the subscriber's tier based on the retrieved permission policy. The permission policy engine 120 may consult the tier-based permission matrix 210 to determine whether the subscriber's tier is granted permission to perform the requested operation. In some cases, if a basic tier subscriber requests audio modification capabilities, the permission policy engine 120 may determine from the audio modification permission 222 that this operation is prohibited for basic tier subscribers. This negative determination may cause the method 300 to follow the 'NO' path from the request validation decision step 312, bypassing all subsequent AI processing, content generation, and brand compliance steps shown in the flowchart.

If the request is not valid for the subscriber's tier, the method 300 may proceed to a deny request step 314, wherein the subscription system 100 may refuse to process the request and may return an error message or notification to the subscriber's client device indicating that the requested feature is not available at their current subscription tier. The method 300 may optionally include information about upgrading to a higher tier to access the requested feature. After denying the request at the step 314, the method 300 may proceed to step 330, bypassing all content generation and delivery operations.

If the request is valid for the subscriber's tier, the method 300 may proceed to a determine content-interaction mode step 316, wherein the subscription system 100 may identify from the permission policy the specific content-interaction mode that is permitted for the subscriber with respect to the referenced media item. The content-interaction mode may specify the type of interaction allowed, such as recommendation generation, audio modification, visual generation, interactive experience access, merchandise design, social interaction, or chatbot access. The permission policy may define not only whether the interaction is allowed, but also the specific parameters and constraints that govern the interaction.

The method 300 may then proceed to a select AI models step 318, wherein the AI orchestration layer 130 may determine which artificial-intelligence models should be invoked to fulfill the request. The AI orchestration layer 130 may consult the AI model routing rules 246 from the permission policy to identify the appropriate models. In some cases, if the request involves generating recommendations with explanations, the AI orchestration layer 130 may select the discovery model 248. If the request involves audio modification, the audio processing model 250 may be selected. Multiple AI models may be selected if the request involves multiple operations, such as generating visual content that must also be validated for brand compliance.

As shown in the progression of FIG. 3, the method 300 may proceed through a sequence of preparatory steps before content generation occurs, ensuring that appropriate AI models are selected and computational resources are allocated before any processing begins. With continued reference to FIG. 3, following AI model selection, the method 300 may proceed to an allocate computational resources step 320, wherein the subscription system 100 may allocate computational resources according to tier-based priority. The AI orchestration layer 130 may manage resource allocation, prioritizing requests from the premium tier 214 and the super fan tier 216 subscribers over requests from the basic tier 212 subscribers. The method 300 may further comprise dynamically allocating computational resources to prioritize AI processing requests from premium tier subscribers. The resource allocation may consider the priority weight parameter 268 associated with the media item's permission policy, as well as current system load, available GPU and CPU resources, and maximum processing time limits. Higher-tier subscribers may receive preferential access to computational resources, resulting in faster processing times and reduced wait times compared to lower-tier subscribers during periods of high system utilization.

The method 300 may then proceed to a generate/modify content step 322, wherein the selected AI models may process the request to generate or modify content in accordance with the permission policy. The AI engines 140 may execute the content generation or modification operation. The method 300 may further comprise providing an interactive content-modification experience that enables the subscriber to at least one of create, transform, or curate content that is derived from or associated with the referenced media item. Depending on the content-interaction mode, the step 322 may involve the discovery engine 141 generating personalized recommendations with natural language explanations, the remix engine 145 modifying audio characteristics within artist-defined constraints, the visual engine 143 creating interactive visual experiences or visualizers, the merchandise engine 146 generating co-designed merchandise imagery, the social engine 142 moderating comments or facilitating community connections, or the chatbot engine 147 generating conversational responses about the artist.

Upon completing content generation or modification, the method 300 may proceed to a brand compliance decision step 324, wherein the subscription system 100 may determine whether the generated or modified content passes brand compliance validation. The brand compliance filter 144 may apply the brand compliance model 254 to analyze the generated content against the brand guidelines integration 256. The validation may check whether the content adheres to color palette specifications, logo usage rules, visual style descriptors, and other brand standards defined by the artist. The brand compliance filter 144 may also screen for inappropriate content, quality issues, or thematic inconsistencies that would be inconsistent with the artist's established brand identity.

If the generated content fails brand compliance validation, the method 300 may loop back to the generate/modify content step 322, wherein the AI models may regenerate or adjust the content to address the compliance issues identified. This feedback loop may involve adjusting color schemes, repositioning or resizing logo elements, modifying visual styles, or regenerating content with different parameters. The loop may continue until the generated content successfully passes brand compliance validation, ensuring that all delivered content maintains consistency with artist brand guidelines. As illustrated in FIG. 3, this feedback loop may be represented by an arrow connecting the brand compliance decision step 324 back to the generate/modify content step 322, creating an iterative refinement cycle that ensures generated content meets all brand compliance requirements before delivery to the subscriber.

If the generated content passes brand compliance validation, the method 300 may proceed to a deliver content to user step 326, wherein the subscription system 100 may transmit the validated content to the subscriber's client device. The content may be delivered over the network 155 to the appropriate device from the devices 160. The delivered content may include AI-generated recommendations with explanations, modified audio files, interactive visual experiences, dynamically generated visual experiences, merchandise design previews, moderated social content, chatbot responses, or other AI-enhanced content appropriate to the request and subscription tier.

Following content delivery, the method 300 may proceed to a log metrics and update history step 328, wherein the subscription system 100 may record information about the completed transaction for analytics, billing, resource optimization, and personalization purposes. The method 300 may further comprise tracking AI feature usage by tier and adjusting available features based on subscription level and resource availability. The logged metrics may include the subscriber's identity and tier, the media item accessed, the content-interaction mode employed, the AI models invoked, computational resources consumed, processing time, success or failure of brand compliance validation, number of regeneration attempts if applicable, and subscriber engagement with the delivered content. This logged information may be stored in the content repositories 150 and may be used to refine AI model selection, optimize resource allocation, personalize future recommendations, calculate engagement metrics for merchandise design eligibility, and generate business intelligence reports. In some aspects, the log metrics and update history step 328 may occur immediately after content delivery and before evaluating additional requests at step 332, ensuring that each completed transaction is recorded for analytics purposes regardless of whether subsequent requests are pending, thereby maintaining audit trails and enabling accurate billing and resource usage tracking across all subscriber interactions.

As further shown in FIG. 3, after logging metrics, the method 300 may evaluate whether additional requests are pending from the same subscriber session or from other subscribers at a more requests decision step 332. If more requests require processing, as indicated by the 'YES' path from the more requests decision step 332, the method 300 may loop back to the receive request step 308 as shown by the feedback arrow in FIG. 3, allowing the system to process the next request without requiring re-authentication or tier re-determination for requests within the same session. This may allow the subscription system 100 to handle multiple requests efficiently within a single session or to process requests from multiple concurrent subscribers.

If no additional requests require processing, the method 300 may proceed to the end step 330, concluding the process. As illustrated in FIG. 3, the method 300 may reach the end step 330 through two distinct paths: from the deny request step 314 when a request is invalid for the subscriber's tier, or through the more requests decision step 332 after successfully processing and logging a valid request when no additional requests are pending. The method 300 may provide a systematic approach to managing tier-based access control, enforcing permission policies, orchestrating AI models, validating brand compliance, and delivering personalized content to subscribers.

Figure 4:
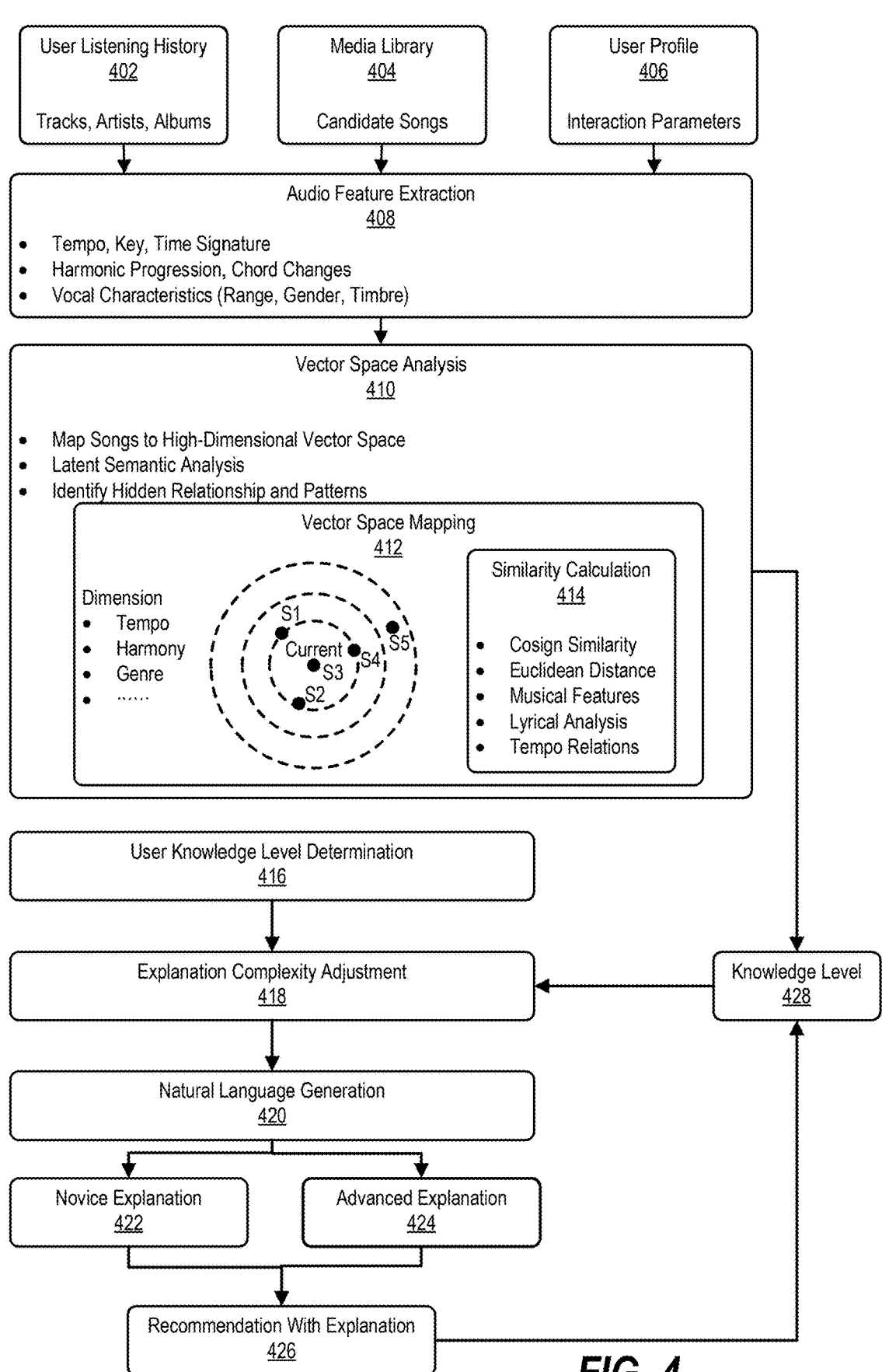
FIG. 4 illustrates a process for generating personalized music recommendations with explanations, according to aspects of the present disclosure.

Referring to FIG. 4, the discovery engine 141 may implement an AI-powered discovery process that generates personalized music recommendations with adaptive explanations tailored to individual subscriber knowledge levels. The discovery engine 141 may process multiple input data streams to create sophisticated recommendation algorithms that not only identify musically similar content but also provide explanations that match the subscriber's level of musical understanding.

A user listening history 402 may provide data about tracks, artists, albums, and playlists that the subscriber has previously streamed, saved, or otherwise engaged with. The user listening history 402 may include temporal patterns of music consumption, frequency of plays for specific songs, skip rates, and other behavioral indicators that reveal the subscriber's musical preferences and listening habits. In some cases, the user listening history 402 may serve as the primary data source for understanding what types of music the subscriber enjoys and may provide reference points for identifying similar content.

A media library 404 may supply a catalog of candidate songs that represent potential recommendations for the subscriber. The media library 404 may comprise the entire catalog of available music or may be pre-filtered based on factors such as release date, popularity, genre classifications, or other criteria. Each song in the media library 404 may include associated metadata such as artist information, album details, release year, genre tags, and other descriptive information that may inform the recommendation process.

A user profile 406 may contain information about the subscriber's interaction patterns with the subscription system 100. The user profile 406 may include behavioral data such as whether the subscriber engages with technical features, how long they spend reading explanations, the complexity of their search queries, whether they provide feedback on recommendations, and other indicators of their musical sophistication and system engagement level. The user profile 406 may enable the discovery engine 141 to adapt its explanation style to match the subscriber's demonstrated knowledge level.

An audio feature extraction module 408 may analyze the audio content of both the subscriber's listening history and candidate songs from the media library 404 to extract musical characteristics and attributes. The audio feature extraction module 408 may employ digital signal processing techniques, music information retrieval algorithms, and machine learning models trained to identify musical attributes from audio waveforms. The extracted features may include tempo measured in beats per minute, key representing the tonal center, time signature indicating rhythmic structure, harmonic progression showing the sequence of chords, chord changes reflecting the frequency and pattern of harmonic shifts, and vocal characteristics such as vocal range, gender of vocalist, and timbre representing tonal quality and texture.

As further shown in FIG. 4, a vector space analysis module 410 may process the extracted audio features to map each song to a point in a high-dimensional vector space, where each dimension may represent a particular musical characteristic or feature. The vector space analysis module 410 may employ latent semantic analysis and vector space mapping techniques to identify hidden relationships between songs and common musical characteristics. Songs with similar musical attributes may be positioned near each other in this vector space, while songs with dissimilar attributes may be positioned farther apart. The vector space analysis module 410 may utilize dimensionality reduction techniques to identify non-obvious connections between songs based on deep structural and aesthetic similarities that may not be apparent from simple genre categorization or explicit metadata.

A vector space mapping 412 may provide a visual representation of the relationships between songs in the high-dimensional space. The vector space mapping 412 may show the positioning of multiple songs including a first song S1, a second song S2, a third song S3, a fourth song S4, and a fifth song S5 relative to each other and to the subscriber's current listening preferences. The vector space mapping 412 may enable the discovery engine 141 to identify clusters of similar songs and determine which candidate songs are most closely related to the subscriber's established preferences. As illustrated in FIG. 4, the vector space mapping 412 may depict songs positioned at varying distances from a central point, with concentric circles representing similarity thresholds or distance bands, where songs positioned within the innermost circle are most similar to the subscriber's preferences, while songs in outer circles represent progressively lower similarity scores. The directional indicators shown in the vector space mapping 412 may represent different musical attribute dimensions, enabling visualization of which specific characteristics (tempo, harmony, vocals, or other features) contribute most significantly to the calculated similarities.

A similarity calculation module 414 may calculate distance metrics between the songs in the user listening history 402 and the candidate songs from the media library 404. The similarity calculation module 414 may employ cosine similarity, Euclidean distance, or other distance measures to quantify how closely each candidate song resembles the songs the subscriber has previously enjoyed. The similarity calculation module 414 may rank the candidate songs by their similarity scores, identifying the top recommendations that are most similar to the subscriber's established preferences. The similarity calculation module 414 may analyze harmonic progression patterns, tempo relationships, vocal characteristics, and thematic similarities to determine which songs are most musically related to a subscriber's listening history. The ranking process may also incorporate diversity factors to ensure that recommendations span multiple artists or sub-genres rather than being overly homogeneous.

A user knowledge level determination module 416 may analyze the user profile 406 to assess the subscriber's demonstrated level of musical knowledge and sophistication. The user knowledge level determination module 416 may examine multiple factors to make this assessment, including interaction patterns with technical features, dwell time on explanations, search query complexity, and explicit user feedback. The user knowledge level determination module 416 may determine whether the subscriber engages with advanced features such as detailed audio analysis displays, music theory explanations, or technical filter options. The user knowledge level determination module 416 may measure how long the subscriber spends reading recommendation explanations, with longer dwell times suggesting higher interest in understanding the reasons behind recommendations. The user knowledge level determination module 416 may also evaluate the complexity of the subscriber's search queries, with use of technical musical terms such as 'harmonic minor scale,' 'syncopation,' or 'counterpoint' indicating higher musical sophistication. Additionally, the user knowledge level determination module 416 may process explicit user feedback when subscribers indicate their familiarity with music theory concepts or request more or less technical explanations.

An explanation complexity adjustment module 418 may be communicatively coupled to the user knowledge level determination module 416 and may adapt the technical depth of recommendation explanations based on the assessed knowledge level. The explanation complexity adjustment module 418 may configure parameters that control vocabulary selection, music theory concept usage, and technical detail density to match the subscriber's demonstrated understanding.

A natural language generation module 420 may receive the adjusted complexity parameters from the explanation complexity adjustment module 418 and may generate explanations at appropriate sophistication levels. For example, for subscribers assessed as having basic musical knowledge, the natural language generation module 420 may produce a novice explanation 422 using accessible, descriptive language that avoids technical musical terminology while still providing meaningful insight into the recommendation basis, such as 'This song has a similar upbeat feeling and female vocals in a similar range.' For subscribers assessed as having advanced musical knowledge, the natural language generation module 420 may produce an advanced explanation 424 incorporating music theory concepts, specific chord progression notation, and technical musical terminology, such as 'This track features a I-V-vi-IV chord progression in C major with soprano vocals at 128 BPM.' A recommendation with explanation 426 may combine the identified song recommendation from the similarity calculation module 414 with the appropriately tailored explanation from the natural language generation module 420, creating a unified output that provides both the recommended content and the reasoning behind it at a complexity level matching the subscriber's knowledge level 428.

The knowledge level 428 may feed back to the explanation complexity adjustment module 418 through a continuous learning loop, as shown by the feedback arrow in FIG. 4, enabling dynamic refinement of explanation sophistication as the subscriber's musical knowledge grows over time through repeated interactions with the system. This feedback mechanism may allow the discovery engine 141 to automatically adapt its communication style to match the evolving expertise of each subscriber without requiring manual configuration or explicit user settings.

The discovery engine 141 may generate natural language explanations identifying at least one of harmonic progression patterns, tempo relationships, vocal characteristics, or thematic similarities as reasons for recommending media items to subscribers. These explanations may be personalized based on the demonstrated musical knowledge level of the subscriber, with the complexity of the explanations varying according to the demonstrated musical knowledge level. The discovery engine 141 may thereby provide AI-powered playlists and song recommendations that not only identify musically similar content but also educate subscribers about the musical relationships underlying the recommendations, with explanation sophistication that adapts dynamically to each subscriber's evolving understanding.

Figure 5:
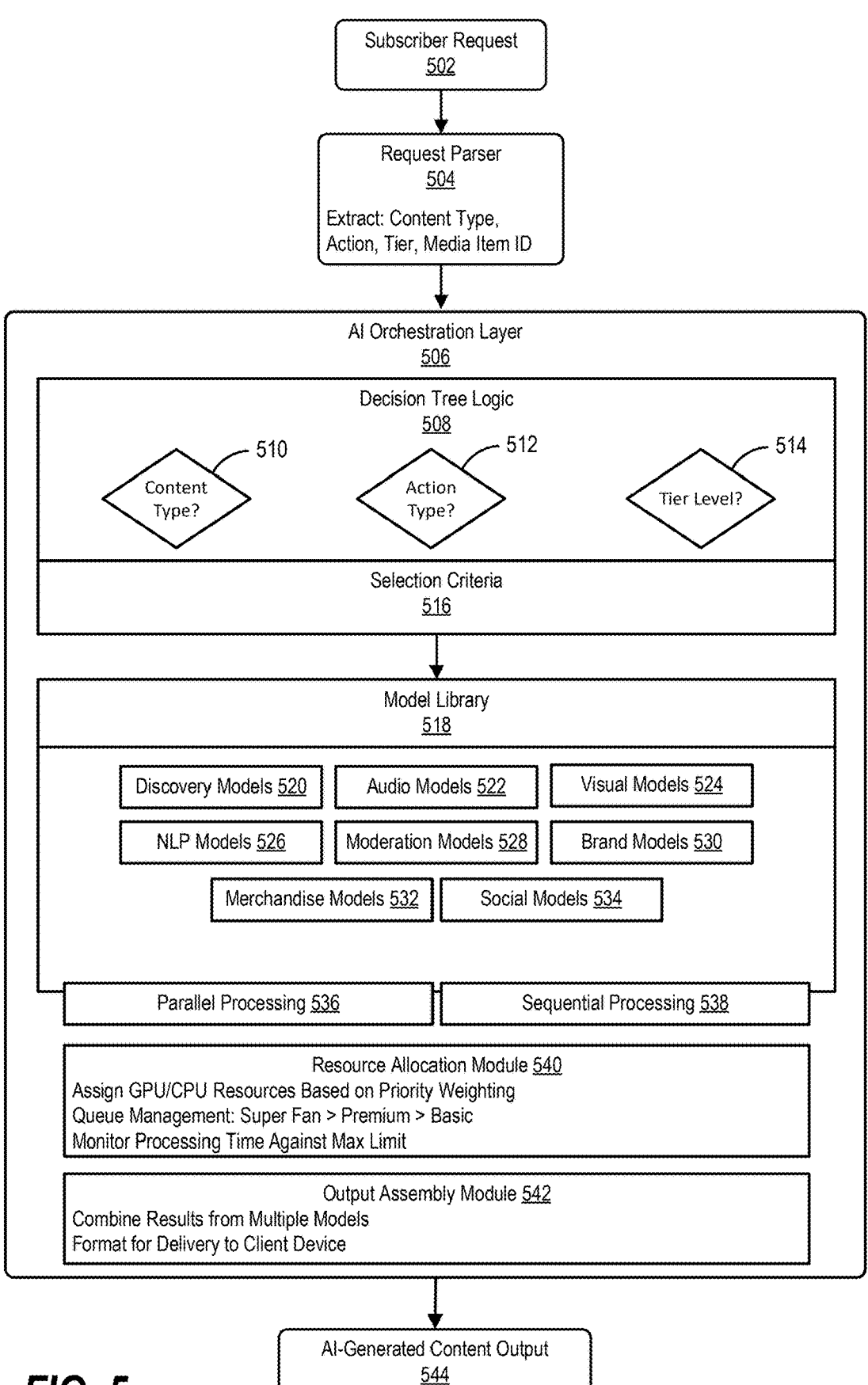
FIG. 5 illustrates a process flow for handling subscriber requests in the AI-augmented subscription system of FIG. 1, according to aspects of the present disclosure.

Referring to FIG. 5, a flow diagram may illustrate the data flow and decision-making process for AI model selection and execution within the subscription system 100, with directional arrows indicating the progression from subscriber request 502 through request parsing, orchestration, model execution, and resource allocation to final content output 544. In some aspects, a subscriber request 502 may initiate the AI-powered content generation process within the subscription system 100. The subscriber request 502 may represent any request from a client device for AI-enhanced functionality, such as generating recommendations, modifying audio, creating visual content, designing merchandise, accessing chatbot services, or engaging with social features. The subscriber request 502 may include information identifying the requesting subscriber, their subscription tier, the media item or content being referenced, and the desired operation or content-interaction mode.

A request parser 504 may receive and analyze the subscriber request 502 to extract parameters for routing and model selection. The request parser 504 may analyze the request to determine the content type, whether the request relates to audio content, visual content, social content, or other media types. The request parser 504 may further identify the action type, determining whether the subscriber wishes to stream, modify, generate, remix, share, or otherwise interact with content. The request parser 504 may also extract the tier level of the requesting subscriber and the media item identifier that specifies the content being referenced. These extracted parameters may be passed to subsequent decision-making logic for processing.

An AI orchestration layer 506 may receive the parsed request parameters and may determine which AI models should be invoked to fulfill the request. The AI orchestration layer 506 shown in FIG. 5 may represent the same as or similar component as the AI orchestration layer 130 described in FIG. 1, with FIG. 5 providing additional detailed internal architecture of the decision-making and model selection processes performed by this component. The AI orchestration layer 506 may serve as the intelligent routing and coordination center of the subscription system 100, ensuring that each request is processed by the appropriate combination of AI models while respecting permission constraints and tier-based resource priorities. As illustrated in FIG. 5, the AI orchestration layer 506 may contain the decision tree logic 508 and may interface with the model library 518, with both the decision tree logic 508 and the processing mode determination (parallel processing 536 or sequential processing 538) operating within the boundaries of the AI orchestration layer 506 to provide centralized coordination of all AI model selection and execution decisions. Decision tree logic 508 within the AI orchestration layer 506 may evaluate the extracted request parameters through a structured set of rules and conditional logic that maps request characteristics to appropriate model selections. A content type decision 510 may evaluate the content type parameter extracted by the request parser 504. If the request relates to audio content, the decision tree logic 508 may consider audio processing models. If the request relates to visual content, the decision tree logic 508 may consider visual generation models. If the request relates to social interactions, the decision tree logic 508 may consider moderation and community models. The content type decision 510 may perform an initial categorization that narrows the set of potentially applicable models.

An action type decision 512 may evaluate what operation the subscriber wishes to perform. If the action is simple streaming or playback, minimal or no AI processing may be required. If the action is modification, such as tempo adjustment, pitch shifting, or audio effects, the decision tree logic 508 may select transformation models. If the action is generation, such as creating new visual content from scratch or generating explanations, the decision tree logic 508 may select generative models. The action type decision 512 may further refine model selection based on the nature of the requested operation.

A tier level decision 514 may evaluate the subscription tier of the requesting subscriber. The tier level may influence not only which features are accessible, but also which specific models are invoked and how computational resources are allocated. In some cases, super fan tier subscribers may have access to more sophisticated or computationally intensive AI models, while basic tier subscribers may be routed to lighter-weight models that provide adequate but less advanced functionality. The tier level decision 514 may ensure that model selection aligns with the subscriber's service level. The decision tree logic 508 may evaluate the content type decision 510, action type decision 512, and tier level decision 514 in a hierarchical sequence, with each decision progressively narrowing the set of candidate AI models until the selection criteria 516 can identify the optimal model or models for the specific request, as shown by the decision diamond flow within the AI orchestration layer 506 in FIG. 5.

Following evaluation of the content type decision 510, action type decision 512, and tier level decision 514, the decision tree logic 508 may apply selection criteria 516 as a final filtering and optimization stage before model selection. Selection criteria 516 may comprise additional factors considered by the decision tree logic 508 when selecting models. The selection criteria 516 may include permission policy constraints retrieved from the content repositories 150, which may define artist-specific rules about which AI operations are permitted for the referenced media item. The selection criteria 516 may further include model routing rules specified by the AI model routing rules 246, which may designate specific models preferred or required for particular media items or artists. Additionally, the selection criteria 516 may consider resource availability and current system load, ensuring that model selection accounts for practical computational constraints and avoids overloading any particular model or processing cluster. The permission policy constraints considered by the selection criteria 516 may be retrieved from the permission policies repository 154 and may be evaluated by the permission policy engine 120 before model selection proceeds, ensuring that the AI orchestration layer 506 only selects models and operations that are explicitly permitted for the combination of the requesting subscriber's tier and the referenced media item's permission policy record 202.

As further shown in FIG. 5, based on the evaluations performed by the decision tree logic 508 and the selection criteria 516, the AI orchestration layer 506 may select one or more models from a model library 518. The model library 518 may comprise a collection of specialized artificial intelligence models, each optimized for particular types of processing or content generation. As illustrated in FIG. 5, the model library 518 may organize these specialized AI models into functional categories displayed in a structured grid format, with discovery models 520, audio models 522, visual models 524, NLP models 526, merchandise models 532, social models 534, moderation models 528, and brand models 530 arranged to facilitate efficient model selection by the AI orchestration layer 506. The models may be organized into functional categories based on their capabilities.

Discovery models 520 may comprise AI models specialized in generating music recommendations and explanations. The discovery models 520 may include vector space recommender models that map songs into similarity spaces and collaborative filtering models that identify patterns based on aggregate user behavior. The discovery models 520 may further include natural language explanation generators that produce personalized recommendation rationales tailored to subscriber musical knowledge levels. The discovery models 520 may be invoked when subscribers request personalized recommendations or seek explanations for why particular content is suggested.

Audio models 522 may comprise AI models specialized in processing and transforming audio content. The audio models 522 may include audio transform engines that modify tempo, pitch, timbre, and other acoustic characteristics, and source separation models that isolate individual instruments or vocal tracks from mixed audio recordings. The audio models 522 may be invoked when subscribers in the premium tier 214 or the super fan tier 216 request audio modification operations permitted by the permission policy for the media item.

Visual models 524 may comprise AI models specialized in generating visual content. The visual models 524 may include image synthesis models that create static artwork or graphics based on audio characteristics or thematic elements, and video generation models that create animated visualizers or video content synchronized with music. The visual models 524 may further include style-adaptive generators that create visual content consistent with artist-defined aesthetic parameters and interactive experience builders that construct multimedia booklet experiences. The visual models 524 may be invoked when subscribers request interactive experiences, visualizers, or other visual experiences associated with media items.

NLP models 526 may comprise natural language processing models specialized in text understanding and generation. The NLP models 526 may include explanation generator models that create human-readable explanations for recommendations, and chatbot conversational AI models that engage in dialogue with subscribers to answer questions about artists, provide trivia, or offer behind-the-scenes information. The NLP models 526 may be invoked for recommendation explanations, artist chatbot interactions, and other text-based features.

Moderation models 528 may comprise AI models specialized in content analysis and quality control. The moderation models 528 may include content classifier models that categorize user-generated content and identify inappropriate material, and sentiment analyzer models that evaluate the emotional tone and constructiveness of fan comments or contributions. The moderation models 528 may be invoked to implement social features, ensuring that community interactions maintain positivity and value.

Brand models 530 may comprise AI models specialized in maintaining visual identity and brand consistency. The brand models 530 may include brand compliance checker models that validate generated content against artist guidelines, and style transfer models that adapt fan-created content to conform with artist-defined aesthetic parameters. The brand models 530 may be invoked as part of the validation process, ensuring all outputs respect brand guidelines.

Merchandise models 532 may comprise AI models specialized in product design and customization. The merchandise models 532 may include design generator models that create merchandise artwork from media assets or fan input, and brand adaptation models that ensure fan designs incorporate proper logos, color palettes, and visual styles defined by the artist. The merchandise models 532 may be invoked when super fan tier subscribers exercise merchandise design permissions.

Social models 534 may comprise AI models specialized in community interaction and engagement optimization. The social models 534 may include community matching models that calculate compatibility scores between subscribers and suggest connections, and engagement predictor models that forecast which community interactions will generate positive outcomes. The social models 534 may be invoked to facilitate social features and connection suggestions.

With continued reference to FIG. 5, the AI orchestration layer 506 may determine whether selected models should execute in parallel processing 536 or sequential processing 538 modes. Parallel processing 536 may be employed when multiple models can execute simultaneously without dependencies, such as when generating both visual content and audio recommendations independently for a complex multi-feature request. Parallel processing 536 may reduce overall latency by leveraging multiple computational resources concurrently. Sequential processing 538 may be employed when models form a pipeline where the output of one model feeds into the input of subsequent models, such as when an audio modification model processes content that is then validated by a brand compliance model. Sequential processing 538 may ensure proper data flow and maintain logical dependencies between processing stages. As shown in FIG. 5, the parallel processing 536 and sequential processing 538 pathways may be depicted as alternative execution routes from the AI orchestration layer 506 to the resource allocation module 540, with the AI orchestration layer 506 determining which processing mode is appropriate based on the independence or interdependence of the selected AI models from the model library 518. As further illustrated in FIG. 5, the resource allocation module 540 and output assembly module 542 may be positioned in a post-orchestration processing section of the architecture, receiving inputs from the AI orchestration layer 506 after model selection and processing mode determination are complete, and handling the execution management and output formatting stages that bridge between AI model invocation and content delivery.

Following the determination of whether to employ parallel processing 536 or sequential processing 538, as shown in FIG. 5, a resource allocation module 540 may manage the assignment of computational resources to the selected AI models based on tier-based priorities and system constraints. A resource allocation module 540 may manage the assignment of computational resources to the selected AI models based on tier-based priorities and system constraints. The resource allocation module 540 may assign GPU and CPU resources based on the priority weight parameter 268 associated with the media item and the subscription tier of the requesting subscriber. The resource allocation module 540 may implement queue management that prioritizes super fan tier requests over premium tier requests, which in turn may receive priority over basic tier requests. This tiered prioritization may ensure that higher-paying subscribers experience faster response times and reduced wait periods during periods of high system utilization. The resource allocation module 540 may further monitor processing time against maximum processing time limits to ensure that no single request monopolizes resources indefinitely, and may terminate or deprioritize requests that exceed time limits.

The resource allocation module 540 may manage various types of computational resources including GPU clusters for parallel processing operations, CPU resources for sequential processing tasks, and memory allocation for intermediate data storage. In some implementations, the AI processing infrastructure may include optional tensor processing units that provide specialized acceleration for transformer-based models used in natural language understanding, optimize recommendation algorithms for personalized discovery, and enable real-time processing of complex generative models, though these components are not separately depicted in FIG. 5 as they operate under the management of the resource allocation module 540.

Following model execution through either parallel processing 536 or sequential processing 538, an output assembly module 542 may perform different operations depending on the processing mode employed: when parallel processing 536 was used, the output assembly module 542 may combine and synchronize results from multiple independently-executed models, whereas when sequential processing 538 was used, the output assembly module 542 may package the final output from the last model in the processing pipeline for delivery. The output assembly module 542 may format the AI-generated content appropriately for transmission over the network 155 and presentation on the subscriber's client device. The formatting may involve encoding media files, structuring data for web interfaces, generating interactive content, or preparing other data formats suitable for the target device and application.

The assembled and formatted content may then be provided as AI generated content output 544, which may represent the final result of the orchestration and processing pipeline. The AI generated content output 544 may comprise recommendations with explanations, modified audio files, generated visual experiences, chatbot responses, moderated social content, merchandise designs, or any other AI-enhanced content appropriate to the original subscriber request 502. The AI generated content output 544 may be delivered to the subscriber's device through the network 155, completing the request processing cycle.

Figure 6:
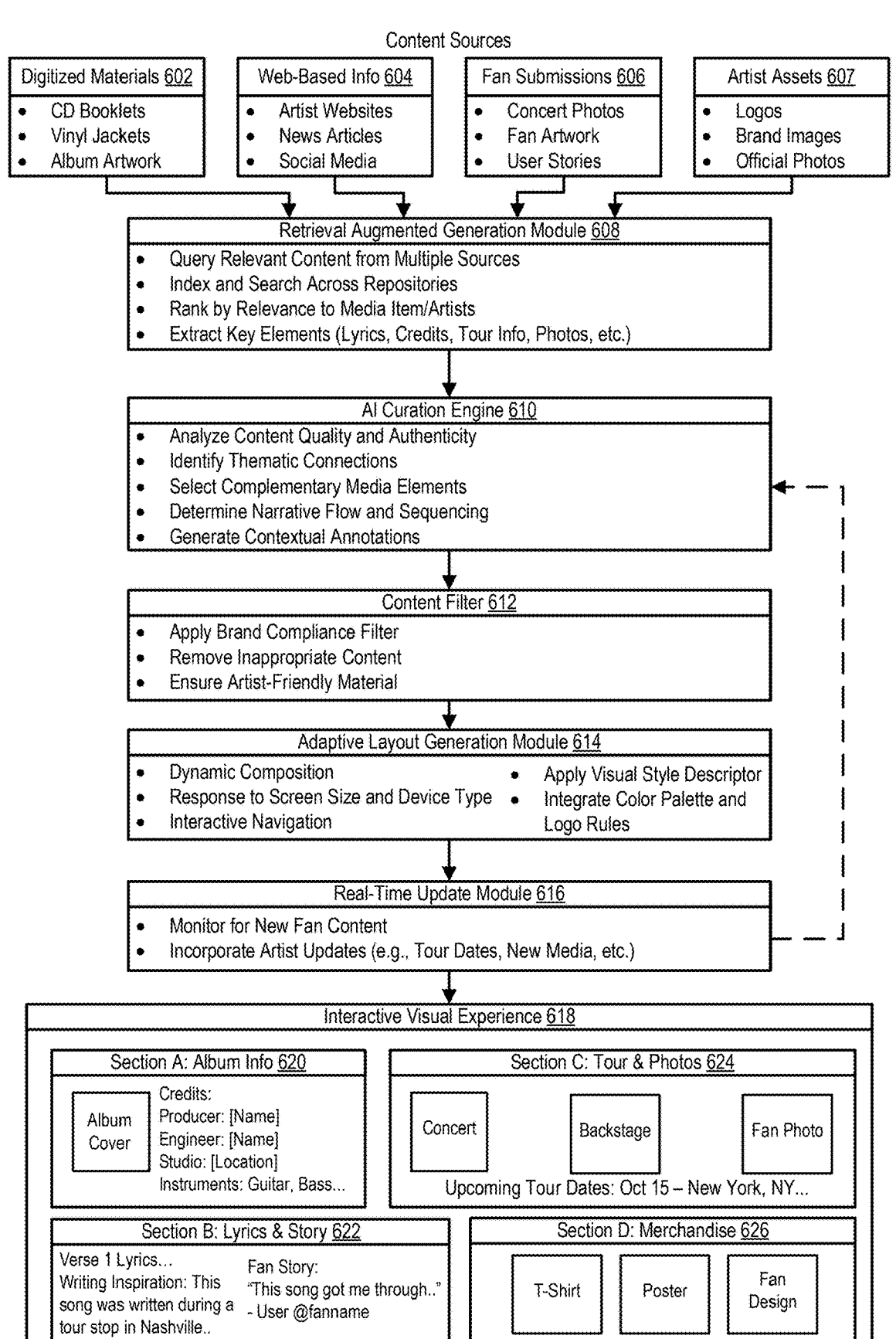
FIG. 6 illustrates a process for generating interactive visual experiences through content aggregation, according to aspects of the present disclosure.

Referring to FIG. 6, a flow diagram may illustrate the architecture and data flow for generating interactive visual experiences within the visual engine 143, with content sources positioned at the top, processing modules arranged in a sequential pipeline through the middle, and the final interactive visual experience interface 618 displayed at the bottom, showing the progression from raw content aggregation through curation and filtering to formatted presentation. In some aspects, the visual engine 143 may implement an interactive visual experience generation process that aggregates content from multiple sources to create dynamic multimedia presentations. The visual engine 143 may generate both interactive visual experiences that subscribers can navigate and explore, as well as non-interactive visualizers that play automatically without subscriber input. The visual engine 143 may support multiple rendering formats including 2D canvas-based graphics, 3D spatial environments, and augmented reality overlays for camera feeds, enabling diverse presentation modes across different device types and subscriber preferences. The visual engine 143 may comprise multiple specialized sub-components including content source modules, processing modules for retrieval and curation, filtering and layout systems, and update mechanisms, all working together to create the visual experience generation pipeline illustrated in FIG. 6. As illustrated in FIG. 6, the visual engine 143 may aggregate content from four primary content source modules grouped at the top of the architecture: the digitized materials module 602, the web information module 604, the fan submissions module 606, and the artist assets module 607, each providing distinct types of content that contribute to the visual experience.

A digitized materials module 602 may provide content sourced from physical album materials that have been converted to digital formats. The digitized materials module 602 may supply CD booklets, vinyl jacket artwork, liner notes, album artwork, and other traditional music packaging materials that have been scanned or digitally reproduced. In some cases, the digitized materials module 602 may preserve the visual aesthetic and informational content of historical music packaging while making this content accessible for digital integration and manipulation. As shown in FIG. 6, the digitized materials module 602 may specifically provide CD booklets, liner notes, and album artwork that have been converted from physical formats to digital representations.

A web information module 604 may aggregate publicly available information from various online sources related to artists and their music. The web information module 604 may collect data from artist websites, music journalism articles, social media posts, interview transcripts, and other web-based content that provides context and background information about artists, albums, and songs. The web information module 604 may continuously monitor and update its content repository to ensure current and relevant information is available for visual experience generation. As illustrated in FIG. 6, the web information module 604 may specifically aggregate content from artist websites, news articles, and social media platforms to provide current contextual information.

A fan submissions module 606 may manage user-generated content contributed by subscribers within the subscription system 100. The fan submissions module 606 may receive concert photographs, fan artwork, personal stories, reviews, and other creative contributions from subscribers who wish to share their experiences and interpretations related to specific artists or media items. The fan submissions module 606 may implement content validation and moderation processes to ensure submitted materials meet quality and appropriateness standards before integration into visual experiences. As shown in FIG. 6, the fan submissions module 606 may specifically collect concert photos, fan artwork, and user stories contributed by subscribers within the community.

An artist assets module 607 may maintain official content provided by artists or their representatives. The artist assets module 607 may store high-resolution logos, promotional photographs, official artwork, brand guidelines, and other authorized materials that artists have approved for use in fan-facing applications. The artist assets module 607 may ensure that all official content maintains proper attribution and usage rights while providing authentic artist-approved materials for visual experience creation. As illustrated in FIG. 6, the artist assets module 607 may specifically maintain logos, brand images, and official photos provided by artists or their authorized representatives.

Following the content sourcing stage shown at the top of FIG. 6, the visual engine 143 may process content through a sequential pipeline of specialized modules, with each stage refining and transforming the content before passing it to the next stage in the architecture. As further shown in FIG. 6, a retrieval augmented generation module 608 may receive content from the digitized materials module 602, the web information module 604, the fan submissions module 606, and the artist assets module 607. The retrieval augmented generation module 608 may query relevant content from these multiple sources based on specific media items, artists, or thematic elements requested by subscribers. As detailed in FIG. 6, the retrieval augmented generation module 608 may perform multiple operations including: querying relevant content from multiple sources based on the media item or artist; indexing and searching across the various content repositories; ranking content by relevance to the media item or request; and extracting key elements such as lyrics, credits, tour information, and photographs that may be incorporated into visual experiences.

A curation engine 610 may process the content retrieved by the retrieval augmented generation module 608 to ensure quality, relevance, and thematic coherence. As illustrated in FIG. 6, the curation engine 610 may perform several analytical functions including: analyzing content quality and authenticity to ensure reliability; identifying thematic connections between different content elements to create coherent narratives; selecting complementary media elements that work together effectively; determining narrative flow and sequencing for optimal subscriber engagement; and generating contextual annotations that provide additional information about the curated content. The curation engine 610 may employ machine learning algorithms to improve content selection and arrangement based on subscriber engagement patterns and feedback. The curation engine 610 may further sequence subscriber-contributed content in an optimal order for presentation and may optionally apply effects and animation to enhance visual presentation while maintaining consistency with the artist's defined visual style.

A content filter 612 may apply brand compliance filtering and content moderation to ensure all materials meet artist guidelines and platform standards. As shown in FIG. 6, the content filter 612 may perform multiple validation operations including: applying brand compliance filtering to ensure adherence to artist guidelines; removing inappropriate content that violates community standards; and ensuring artist-friendly materials that respect brand identity and licensing requirements. The content filter 612 may work in conjunction with the brand compliance filter 144 to maintain consistent quality and appropriateness standards across all generated visual experiences. The content filter 612 may work in conjunction with the brand compliance filter 144 described in FIG. 1 to maintain consistent quality and appropriateness standards across all generated visual experiences, with the content filter 612 providing specialized validation for visual experience content while the brand compliance filter 144 provides system-wide brand compliance enforcement.

A layout generation module 614 may create dynamic compositions that adapt to different screen sizes, device types, and subscriber interaction preferences. The layout generation module 614 may implement responsive design principles that ensure visual experiences display appropriately on mobile devices, desktop computers, tablets, and other display formats. The layout generation module 614 may create interactive navigation systems that allow subscribers to explore different sections and content areas, apply visual style descriptors and logo usage rules from the brand guidelines integration 256, and generate layouts that maintain visual coherence while accommodating diverse content types and formats. As detailed in FIG. 6, the layout generation module 614 may specifically create dynamic compositions that respond to screen sizes and device types, implement interactive navigation systems for content exploration, apply visual style descriptors from brand guidelines, and integrate artist logos and branding elements according to logo usage rules.

A real-time update module 616 may monitor for new content availability and dynamically incorporate fresh materials into existing visual experiences. The update module 616 may track new fan submissions as they are approved and added to the fan submissions module 606, incorporate artist updates such as tour dates, new media releases, and promotional materials as they become available through the artist assets module 607, and refresh web-based information by periodically querying the web information module 604 for updated articles, interviews, and social media content. The update module 616 may implement real-time update functionality that ensures visual experiences remain current and relevant as new content becomes available, without requiring subscribers to manually refresh or reload their experiences. As illustrated by the feedback loop shown with a dashed line in FIG. 6, the real-time update module 616 may monitor the content source modules (digitized materials module 602, web information module 604, fan submissions module 606, and artist assets module 607) for new content availability, creating a dynamic system where visual experiences evolve as new materials become available without requiring manual regeneration.

With continued reference to FIG. 6, the visual experience generation process may output a visual experience interface 618 that presents the curated and organized content in an interactive multimedia format. The visual experience interface 618 may comprise multiple specialized sections that organize different types of content and information related to the media item or artist being explored. As illustrated in the lower portion of FIG. 6, the visual experience interface 618 may be organized into multiple distinct sections labeled as Section A (Album Info), Section B (Lyrics & Story), Section C (Tour & Photos), and Section D (Merchandise), each presenting different types of curated content in specialized formats. Of course, other organizations and layouts are contemplated.

An album information section 620 may display details about the album or media item, including credits and production information, recording studio details, producer and musician information, technical specifications such as recording dates and locations, and other metadata that provides context about the creation and production of the music. The album information section 620 may present this information in an organized, visually appealing format that allows subscribers to explore the technical and creative aspects of the music production process. As shown in Section A of FIG. 6, the album information section 620 may display specific elements including album credits, producer names, recording studio names and locations, instrument details, and other metadata presented in a structured, easily navigable format.

A lyrics section and story 622 may present the lyrical content of songs along with narrative context and interpretation. The lyrics section and story 622 may display synchronized lyrics that highlight in time with audio playback, provide background stories about song creation and meaning, include fan-contributed interpretations and personal stories related to specific songs, and offer contextual information about lyrical themes and artistic intent. The lyrics section and story 622 may create an immersive storytelling experience that connects subscribers more deeply with the artistic content and meaning of the music. As illustrated in Section B of FIG. 6, the lyrics section and story 622 may present verse-by-verse lyrical content alongside fan-contributed stories and interpretations, with example text showing how lyrics ('This song got me through a challenging . . . ') and fan narratives ('User @someone') are integrated into a unified storytelling experience.

A tour and photos section 624 may aggregate visual content related to live performances and artist activities. The tour and photos section 624 may display concert photographs from both official sources and fan contributions, present tour dates and venue information for upcoming and past performances, include behind-the-scenes images from recording sessions and promotional activities, and provide interactive maps or timelines that show the artist's touring history and geographic reach. The tour and photos section 624 may create a visual record of the artist's live performance history and current activities. As depicted in Section C of FIG. 6, the tour and photos section 624 may organize visual content into subsections for concert photos, backstage images, and fan-contributed photos, with upcoming tour dates displayed in a specific format (e.g., 'Upcoming Tour Dates: October 15-New York, NY') that provides clear scheduling information.

A merchandise section 626 may present product information and design elements related to artist merchandise and fan-created items. The merchandise section 626 may display official merchandise such as t-shirts, posters, and other branded items, showcase fan-designed merchandise that has been approved through the merchandise engine 146, provide purchasing links and availability information for items that can be acquired, and present design elements and artwork that subscribers can use in their own creative projects. The merchandise section 626 may integrate with the merchandise co-creation features of the subscription system 100 to provide a seamless experience between content exploration and creative participation. As shown in Section D of FIG. 6, the merchandise section 626 may display different product categories including t-shirts, posters, and fan-designed items, with each category presented in a visually distinct format that allows subscribers to browse available merchandise and fan-created designs.

The visual experience interface 618 may support both interactive visual experiences and non-interactive visualizers as presentation modes. In interactive mode, subscribers may navigate between different sections, explore content in detail, contribute their own materials through the fan submissions module 606, and customize the presentation according to their preferences. In non-interactive mode, the visual experience interface 618 may present content as an automatically progressing slideshow or video-like experience that requires no subscriber input while still providing rich multimedia content synchronized with audio playback. The visual experience interface 618 may render content in multiple formats as mentioned in the visual engine 143 capabilities, including 2D canvas-based presentations for traditional screen displays, 3D spatial environments for virtual reality experiences, and augmented reality overlays that integrate visual content with camera feeds on mobile devices, with the layout generation module 614 adapting the content presentation appropriately for each rendering format.

The method may comprise generating dynamically generated interactive visual experiences that aggregate content from multiple sources including digitized album materials, web-based information, and fan submissions. The visualizations may incorporate at least one of artist imagery, fan-contributed assets, or contextual information sourced from the various content modules and processed through the curation and filtering systems. The method may further comprise sequencing, by the artificial-intelligence models, subscriber-contributed content received through the fan submissions module 606, and optionally applying, by the artificial-intelligence models, effects and animation to the subscriber-contributed content to enhance visual presentation and maintain consistency with the overall visual experience design.

Figure 7:
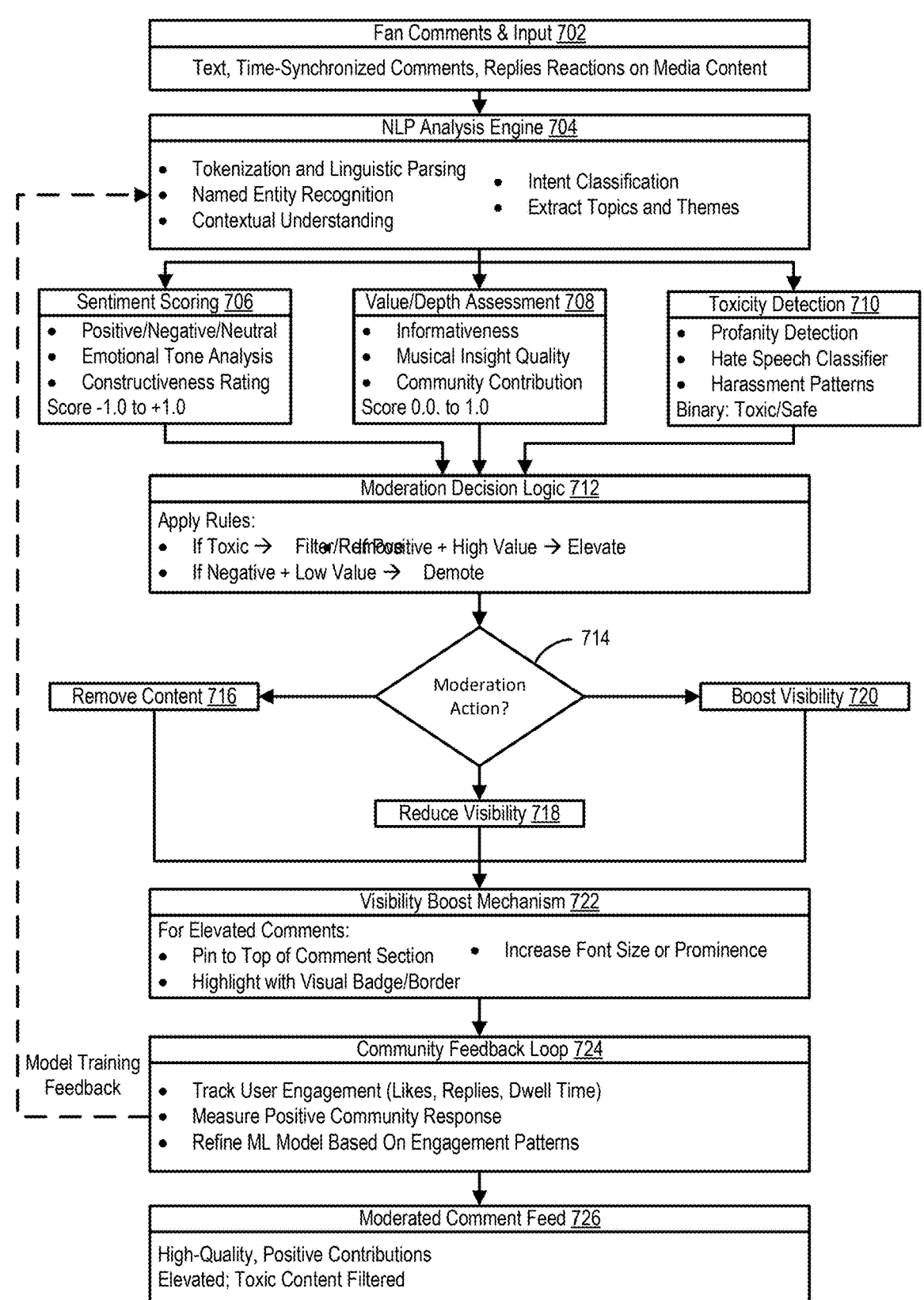
FIG. 7 illustrates a flowchart for analyzing and moderating fan comments in a social media system, according to aspects of the present disclosure.

Referring to FIG. 7, a flow diagram may illustrate the architecture and processing pipeline of the social engine 142, showing the progression from fan input through natural language processing analysis, parallel scoring mechanisms, moderation logic with decision branching, and multiple outcome paths that ultimately feed into a curated comment feed, with a feedback loop enabling continuous system improvement based on community engagement metrics. In some aspects, the social engine 142 may implement an AI-powered social moderation system that analyzes and manages fan-generated content to maintain positive community engagement while preserving constructive criticism. The social engine 142 may process subscriber comments and other user-generated content through multiple analysis stages to determine appropriate moderation actions, including content elevation, visibility reduction, or removal based on quality and appropriateness assessments.

Fan input 702 may comprise various forms of subscriber-generated content as illustrated in FIG. 7, including text comments, time-synchronized comments overlaid on media content at specific timestamps, replies to other subscribers' comments, and/or reactions on media items such as likes or emoji responses. The fan input 702 may include comments posted during music playback at specific timestamps, similar to commenting systems that allow subscribers to associate their thoughts with particular moments in songs. As further described, the time-synchronized commenting functionality may allow subscribers to associate their comments with specific timestamps during music playback, creating a layered discussion experience where comments appear at relevant moments during song playback. The fan input 702 may also encompass broader social interactions such as replies to other subscribers, shared listening session contributions, and community discussions related to artists or media items. In some cases, the fan input 702 may be submitted in real-time during active listening sessions or may be posted asynchronously for later review and moderation.

An analysis engine 704 may receive the fan input 702 and may perform natural language processing and content analysis to evaluate multiple dimensions of the submitted content. As detailed in FIG. 7, the analysis engine 704 may implement multiple natural language processing operations including: tokenization and linguistic parsing to break down text into meaningful linguistic units and understand grammatical structure; named entity recognition to identify references to artists, songs, albums, or other relevant entities; contextual understanding to interpret comments within the broader conversation or media context; intent classification to determine the purpose and tone of comments; and extract topics and themes to identify the main subjects being discussed. The analysis engine 704 may employ trained machine learning models that have been specifically optimized for music-related content and fan community interactions. As illustrated in FIG. 7, the analysis engine 704 may process the fan input 702 through three parallel assessment pathways that operate simultaneously and independently: sentiment scoring 706, value/depth assessment 708, and toxicity detection 710, with all three pathways feeding their outputs into the moderation logic 712 for integrated decision-making.

The analysis engine 704 may process the fan input 702 through three parallel assessment pathways that evaluate different aspects of content quality and appropriateness. A sentiment scoring 706 may evaluate the emotional tone and attitude expressed in subscriber comments. The sentiment scoring 706 may classify comments as positive, negative, or neutral sentiment, perform emotional tone analysis to identify specific emotions such as excitement, frustration, appreciation, or disappointment, and assign constructiveness ratings that measure whether comments contribute meaningfully to community discussions. The sentiment scoring 706 may generate numerical scores on a scale from $-1.0$ to $+1.0$, where negative values indicate negative sentiment, positive values indicate positive sentiment, and values near zero indicate neutral sentiment. As shown in FIG. 7, the sentiment scoring 706 may specifically evaluate positive/negative/neutral sentiment classification, perform emotional tone analysis to identify underlying emotions, assess constructiveness ratings, and generate numerical sentiment scores on a scale from $-1.0$ (most negative) to $+1.0$ (most positive).

A value/depth assessment 708 may measure the informational content and community contribution quality of subscriber comments. The value/depth assessment 708 may evaluate informativeness by determining whether comments provide useful information about music, artists, or related topics, assess musical insight quality by identifying comments that demonstrate knowledge about musical techniques, production methods, or artistic context, and measure community contribution value by analyzing whether comments encourage further discussion or provide helpful responses to other subscribers' questions. The value/depth assessment 708 may generate scores on a scale from 0.0 to 1.0, where higher values indicate greater informational value and community contribution. As illustrated in FIG. 7, the value/depth assessment 708 may specifically measure informativeness of content contributions, assess musical insight quality demonstrated by the commenter, evaluate community contribution value in terms of encouraging discussion, and generate numerical value scores on a scale from 0.0 (no value) to 1.0 (highest value).

A toxicity detection 710 may screen subscriber comments for inappropriate content that violates community guidelines or platform policies. The toxicity detection 710 may implement profanity filtering to identify and flag offensive language, hate speech classification to detect discriminatory or harmful content directed at individuals or groups, and harassment pattern recognition to identify comments that may constitute bullying or targeted negative behavior toward other subscribers or artists. The toxicity detection 710 may produce binary classifications indicating whether content is toxic or safe for community consumption. As depicted in FIG. 7, the toxicity detection 710 may specifically implement profanity filtering, hate speech classification to identify discriminatory content, harassment pattern recognition to detect targeted negative behavior, and produce binary toxic/safe classifications for community safety.

As further shown in FIG. 7, the outputs from the sentiment scoring 706, the value/depth assessment 708, and the toxicity detection 710 may feed into moderation logic 712 that applies rule-based and machine learning-driven decision making to determine appropriate actions for each piece of subscriber content. The moderation logic 712 may implement filtering rules that automatically remove content identified as toxic by the toxicity detection 710, demotion rules that reduce visibility for content with negative sentiment scores combined with low value assessment scores, and elevation rules that increase visibility for content with positive sentiment scores and high value assessment scores. The moderation logic 712 may also consider contextual factors such as the subscriber's history of positive contributions, the relevance of comments to the specific media item being discussed, and the overall community engagement patterns surrounding particular topics or artists. As detailed in FIG. 7, the moderation logic 712 may implement specific decision rules including, or example: if content is classified as toxic, automatically filter or remove it; if content has negative sentiment but high value assessment scores, elevate it to preserve constructive criticism; and if content has negative sentiment combined with low value assessment scores, demote it to reduce visibility of low-quality negative contributions.

he moderation logic 712 may lead to a decision point 714, represented by a decision diamond in FIG. 7 labeled 'Moderation Action?', that determines the specific moderation action to be applied to each piece of subscriber content based on the evaluation of combined scores from the sentiment scoring 706, the value/depth assessment 708, and the toxicity detection 710. The decision point 714 may evaluate the combined scores from the sentiment scoring 706, the value/depth assessment 708, and the toxicity detection 710 to route content to one of several possible outcomes based on predetermined thresholds and decision criteria. As illustrated in FIG. 7, the decision point 714 may route content along three distinct paths: leftward to content removal 716 for toxic or policy-violating content; downward through visibility reduction 718 for moderate-quality content that doesn't warrant prominent display; or rightward to visibility boost 720 for high-quality contributions that merit elevated prominence in the community.

If the decision point 714 determines that content should be removed from the community, the process may proceed to content removal 716. The content removal 716 may filter and remove content that violates community guidelines, contains toxic elements identified by the toxicity detection 710, or fails to meet minimum quality standards for community participation. The content removal 716 may implement graduated responses, such as temporary hiding of content pending manual review, permanent removal for severe violations, or notification to the submitting subscriber about why their content was not approved for community visibility.

If the decision point 714 determines that content has moderate quality but may not warrant prominent display, the process may proceed to visibility reduction 718. The visibility reduction 718 may demote content by reducing its prominence in comment feeds, limiting its distribution to other subscribers, or placing it in secondary display areas where it remains accessible but does not receive primary attention. The visibility reduction 718 may allow content to remain available for subscribers who specifically seek it while preventing low-quality contributions from dominating community discussions. As illustrated in FIG. 7, content subjected to visibility reduction 718 may still appear in the comment feed 726 but with lower prominence compared to boosted content, creating a graduated hierarchy of visibility where content quality correlates with display prominence.

If the decision point 714 determines that content demonstrates high quality and positive community value, the process may proceed to visibility boost 720. The visibility boost 720 may elevate high-quality subscriber contributions by increasing their prominence in community displays, highlighting them with visual indicators such as badges or borders, and ensuring they receive broader distribution to other subscribers who may benefit from the information or insights provided. The visibility boost 720 may help surface the most valuable community contributions while encouraging continued high-quality participation. The positioning of the three moderation outcomes in FIG. 7—with content removal 716 on the left, visibility reduction 718 in the center-bottom, and visibility boost 720 on the right—may reflect the typical distribution of moderation decisions, where most content receives standard visibility, with smaller proportions being either removed for violations or elevated for exceptional quality.

A boost mechanism 722 may receive content from the visibility boost 720 decision path and may implement the specific technical methods for elevating high-quality content identified by the visibility boost 720 determination. As detailed in FIG. 7, the boost mechanism 722 may implement specific elevation techniques including: pinning exceptional comments to the top of comment sections associated with specific media items to ensure maximum visibility; highlighting boosted content with visual indicators such as badges or colored borders to distinguish elevated contributions; and increasing font size or other visual prominence features to draw subscriber attention to high-quality content. The boost mechanism 722 may create incentives for subscribers to contribute thoughtful, informative content by ensuring that high-quality contributions receive appropriate recognition and visibility within the community.

With continued reference to FIG. 7, a feedback loop 724 may track subscriber engagement metrics and community response patterns to continuously improve the moderation system's effectiveness. As shown in FIG. 7, the feedback loop 724 may perform multiple monitoring and refinement operations including: tracking user engagement metrics such as likes, replies, and dwell time spent reading different types of content to measure content effectiveness; measuring positive community response by analyzing whether elevated content generates constructive follow-up discussions; and refining the machine learning models based on observed engagement patterns to improve future moderation decisions. The feedback loop 724 may refine the machine learning models used in the sentiment scoring 706, the value/depth assessment 708, and the toxicity detection 710 based on observed engagement patterns and community feedback, enabling the system to improve its ability to identify valuable contributions and maintain positive community dynamics over time. As illustrated by the dashed feedback arrow in FIG. 7 connecting the feedback loop 724 back to the NLP analysis engine 704, the system may continuously refine the machine learning models used in the sentiment scoring 706, the value/depth assessment 708, and the toxicity detection 710 based on observed engagement patterns and community feedback, creating a closed-loop learning system that enables continuous improvement of the moderation system's ability to identify valuable contributions and maintain positive community dynamics over time. This model training feedback mechanism, as labeled in FIG. 7, may enable supervised and reinforcement learning approaches where the machine learning models are continuously retrained using real-world engagement data as ground truth, allowing the system to adapt to evolving community standards and improve its predictive accuracy for identifying valuable contributions.

The moderation process may result in a comment feed 726 that presents a curated selection of subscriber comments that have passed through the analysis and moderation pipeline. As illustrated in FIG. 7, the comment feed 726 may present content that has been processed through the complete moderation pipeline, displaying high-quality, positive contributions that have been elevated through the visibility boost 720, while filtering out toxic content removed through the content removal 716 and reducing the prominence of lower-quality content through the visibility reduction 718. The comment feed 726 may organize comments chronologically, by relevance, or by community engagement metrics, providing subscribers with access to the most valuable and constructive community discussions related to specific media items or artists. As shown by the convergent flow paths in FIG. 7, all moderation outcomes, whether content removal 716, visibility reduction 718, or visibility boost 720, ultimately contribute to determining the final composition and organization of the comment feed 726.

The method may further comprise analyzing subscriber comments using a trained machine learning model to identify contributions that generate positive community engagement and increase visibility of the identified contributions. The trained machine learning model may be implemented through the analysis engine 704, which may process subscriber comments through the sentiment scoring 706, the value/depth assessment 708, and the toxicity detection 710 to identify high-quality contributions. The visibility of identified contributions may be increased through the visibility boost 720 and the boost mechanism 722, which may elevate valuable content and ensure broader distribution to other subscribers.

The method may further comprise enabling subscribers to overlay time-synchronized comments on media content and moderating the comments to maintain positivity while preserving constructive criticism. As described in connection with the fan input 702, the time-synchronized commenting functionality may allow subscribers to associate their comments with specific timestamps during music playback, creating a layered discussion experience where comments appear at relevant moments during song playback. The moderation of these time-synchronized comments may be performed through the same analysis pipeline, with the moderation logic 712 configured to preserve constructive criticism that provides valuable insights while filtering out negative content that does not contribute meaningfully to community discussions. Constructive criticism may be distinguished from unconstructive negative content by the presence of specific, actionable observations, musical or artistic insights, or thoughtful analysis that contributes to meaningful discussion, as identified through the value/depth assessment 708 which may assign high value scores to negative sentiment comments that demonstrate musical knowledge or provide substantive critique rather than mere complaints or personal attacks.

The method may further comprise facilitating shared listening experiences by generating AI-assisted discussion prompts based on the content and participant interaction history. The social engine 142 may analyze the content being consumed and the interaction patterns of participants in shared listening sessions to generate conversation starters, discussion questions, or topic suggestions that encourage meaningful engagement between subscribers. The AI-assisted discussion prompts may be tailored to the specific media item being played, the musical knowledge levels of the participants as determined through the user knowledge level determination module 416, and the historical interaction patterns observed in the feedback loop 724 to create engaging social experiences that enhance the music consumption experience through community participation.

Figure 8:
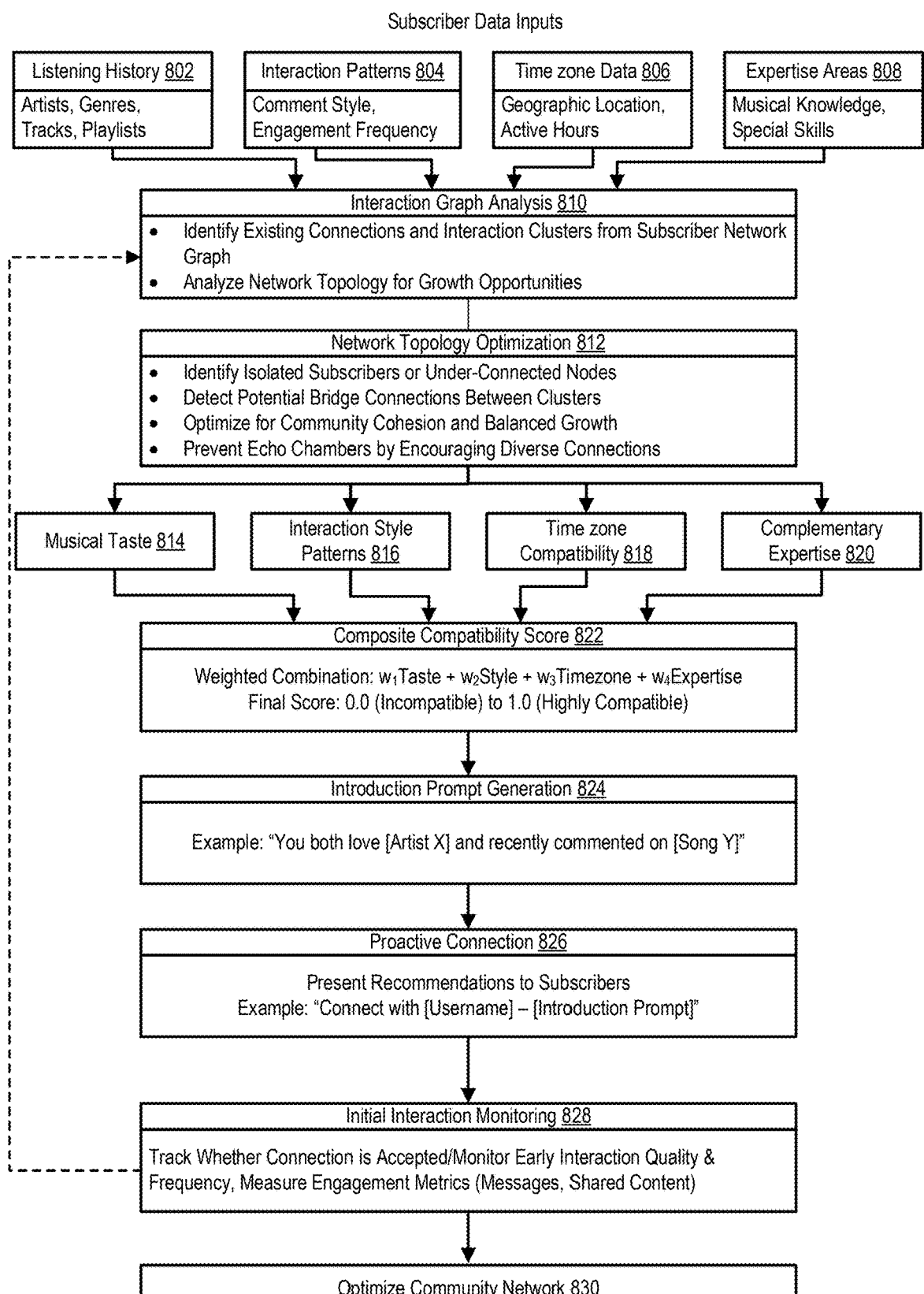
FIG. 8 illustrates a flowchart for analyzing subscriber data and suggesting connections in the subscription system, according to aspects of the present disclosure.

Referring to FIG. 8, a flow diagram may illustrate the architecture of the fan connection prediction and community matching system, showing the progression from multiple subscriber data inputs at the top, through interaction graph analysis and network topology optimization, followed by four parallel compatibility assessment pathways that converge into composite scoring, introduction prompt generation, proactive connection suggestions, interaction monitoring, and community network optimization, with a feedback loop (shown by the dashed line) connecting the monitoring outcomes back to the initial graph analysis stage. In some aspects, the social engine 142 may implement a sophisticated fan connection prediction and community matching system that analyzes multiple data inputs to identify optimal subscriber pairings and promote positive community growth. As illustrated at the top of FIG. 8, the social engine 142 may receive input from four primary data sources displayed as parallel input boxes: listening history 802 providing music consumption data, interaction patterns 804 supplying engagement behavior data, time zone data 806 offering geographical and temporal information, and expertise areas 808 containing musical knowledge and interest information. The social engine 142 may predict subscriber combinations and interaction types that will generate positive community outcomes by analyzing complex interaction patterns and compatibility factors across multiple dimensions of subscriber behavior and preferences.

A listening history input 802 may provide data about each subscriber's music consumption patterns, including specific tracks played, artists followed, albums explored, and temporal listening behaviors. The listening history input 802 may capture detailed information about music preferences, genre affinities, discovery patterns, and engagement levels with different types of content. In some cases, the listening history input 802 may include data about listening session duration, skip rates, repeat play patterns, and seasonal or time-based variations in musical preferences that may indicate compatibility between subscribers with similar or complementary listening behaviors. As shown in FIG. 8, the listening history input 802 may specifically capture data about artists, genres, tracks, and playlists consumed by each subscriber.

An interaction patterns input 804 may supply data about how subscribers engage with the subscription system 100 and with other community members. The interaction patterns input 804 may include information about commenting frequency and style, participation in shared listening experiences, response patterns to other subscribers' contributions, engagement with different types of AI-generated content, and usage patterns for various features within the subscription system 100. The interaction patterns input 804 may capture behavioral indicators that suggest how subscribers prefer to interact socially and what types of community engagement they find most valuable. As illustrated in FIG. 8, the interaction patterns input 804 may specifically include comment style, engagement frequency, and communication patterns demonstrated by subscribers.

A time zone data input 806 may provide geographical and temporal information about subscribers' locations and active usage periods. The time zone data input 806 may include current time zone information, typical active hours for platform usage, geographical location data where privacy settings permit, and patterns of real-time versus asynchronous engagement with community features. The time zone data input 806 may enable the social engine 142 to identify subscribers who are likely to be online simultaneously for real-time interactions or who may benefit from asynchronous connection opportunities. As depicted in FIG. 8, the time zone data input 806 may specifically contain geographic location, active hours, and temporal usage patterns for each subscriber.

An expertise areas input 808 may contain information about subscribers' demonstrated knowledge and interests in specific musical domains, technical areas, or cultural contexts. The expertise areas input 808 may include data derived from the user knowledge level determination module 416, specialized interests in particular genres or artists, technical knowledge about music production or theory, and areas where subscribers have contributed valuable insights to community discussions as identified through the feedback loop 724. The expertise areas input 808 may enable identification of subscribers who may benefit from connecting with others who have complementary knowledge or shared specialized interests. As shown in FIG. 8, the expertise areas input 808 may specifically track musical knowledge, special skills, and areas of demonstrated expertise for subscribers.

As further shown in FIG. 8, the listening history input 802, the interaction patterns input 804, the timezone data input 806, and the expertise areas input 808 may flow into an interaction graph analysis step 810. The interaction graph analysis step 810 may process the input data to construct network representations of existing subscriber relationships and interaction patterns within the community. As detailed in FIG. 8, the interaction graph analysis step 810 may perform specific operations including: identifying existing connections and interaction clusters from subscriber network graphs to understand current community structure; and analyzing the network topology for growth opportunities by mapping how subscribers are already connected and where gaps or opportunities exist for beneficial new connections. The interaction graph analysis step 810 may employ graph theory algorithms and network analysis techniques to understand the current structure of the subscriber community and identify opportunities for beneficial new connections. The architecture illustrated in FIG. 8 may employ a hybrid processing approach, with sequential processing for the initial stages (data inputs feeding into interaction graph analysis 810, which then feeds into network topology optimization 812), followed by parallel processing for the four compatibility assessment pathways (musical taste 814, interaction style patterns 816, time zone compatibility 818, and complementary expertise 820), and then returning to sequential processing for the final stages (composite scoring, prompt generation, connection suggestions, monitoring, and optimization).

The interaction graph analysis step 810 may feed into a network topology optimization step 812 that evaluates the overall structure of the subscriber community network to identify opportunities for improved connectivity and engagement. As illustrated in FIG. 8, the network topology optimization step 812 may implement multiple optimization strategies including: identifying isolated subscribers or under-connected nodes who would benefit from additional community connections; detecting potential bridge connections between different community clusters to facilitate cross-pollination of ideas; optimizing for community cohesion and balanced growth to ensure healthy network structure; and preventing echo chambers by encouraging diverse connections that expose subscribers to new perspectives. Subscriber preferences with overall community health and engagement optimization. As shown in the middle section of FIG. 8, the outputs from the network topology optimization step 812 may flow into four parallel compatibility assessment pathways that operate simultaneously and independently: musical taste analysis 814, interaction style patterns analysis 816, time zone compatibility analysis 818, and complementary expertise assessment 820, with all four pathways feeding their results into the composite compatibility score step 822 for integrated evaluation.

The network topology optimization step 812 may provide context and constraints to the four parallel compatibility assessment pathways, informing them about which potential subscriber pairings should be prioritized based on network structure considerations such as bridging isolated clusters or preventing echo chamber formation. The network topology optimization step 812 may output data to four parallel analysis pathways that evaluate different dimensions of subscriber compatibility. A musical taste step 814 may analyze the overlap and complementarity between subscribers' musical preferences as captured in the listening history input 802. The musical taste step 814 may calculate similarity scores based on shared artists, genres, or songs, identify complementary preferences where subscribers enjoy different but related musical styles that might lead to mutual discovery, analyze temporal patterns in musical taste evolution to identify subscribers whose preferences are trending in similar directions, and evaluate the potential for mutual music discovery based on gaps in each subscriber's listening history that might be filled by the other subscriber's preferences. The musical taste step 814 may generate musical compatibility scores that quantify the degree of overlap and complementarity in musical preferences.

An interaction style patterns step 816 may evaluate how different subscribers prefer to engage with community features and social interactions. The interaction style patterns step 816 may analyze communication styles such as preference for detailed discussions versus brief comments, engagement preferences including real-time versus asynchronous interactions, content creation patterns such as tendency to contribute original insights versus respond to others' contributions, and social interaction frequency including preference for frequent brief interactions versus occasional in-depth discussions. The interaction style patterns step 816 may identify subscribers whose interaction styles complement each other and are likely to result in positive mutual engagement. The interaction style patterns step 816 may generate interaction style compatibility scores that quantify the likelihood of positive social engagement between subscribers.

A time zone compatibility step 818 may assess the likelihood that potential subscriber connections will be able to engage in real-time interactions based on their geographical locations and usage patterns. The time zone compatibility step 818 may calculate overlap in active usage hours between potential connections, evaluate geographical proximity for subscribers who may be interested in local music events or meetups, analyze patterns of real-time versus asynchronous engagement preferences, and consider seasonal or cultural factors that may affect interaction timing and availability. The time zone compatibility step 818 may ensure that suggested connections have practical opportunities for meaningful interaction based on their temporal availability patterns. The time zone compatibility step 818 may generate temporal compatibility scores that quantify the practical opportunity for meaningful interaction based on temporal availability.

A complementary expertise step 820 may identify opportunities for knowledge sharing and mutual learning between subscribers with different but related areas of musical expertise or interest. The complementary expertise step 820 may match subscribers who have expertise in areas where other subscribers have expressed interest or curiosity, identify teaching and learning opportunities where knowledgeable subscribers can share insights with those seeking to expand their understanding, evaluate the potential for collaborative content creation or discussion based on complementary skill sets, and assess the likelihood that expertise sharing will result in positive community outcomes and continued engagement. The complementary expertise step 820 may generate expertise compatibility scores that quantify the potential for mutually beneficial knowledge sharing and learning.

With continued reference to FIG. 8, the outputs from the musical taste step 814, the interaction style patterns step 816, the time zone compatibility step 818, and the complementary expertise step 820 may feed into a composite compatibility score step 822 that calculates a weighted combination according to the formula: $w_1 \times Taste + w_2 \times Style + w_3 \times Timezone + w_4 \times Expertise$, where $w_1$, $w_2$, $w_3$, and $w_4$ represent configurable weight parameters, to produce final numerical scores ranging from 0.0 (indicating incompatible subscribers with low potential for positive engagement) to 1.0 (indicating highly compatible subscribers with strong potential for positive mutual engagement). The composite compatibility score step 822 may calculate weighted combinations of the various compatibility factors to produce final numerical scores ranging from 0.0 indicating incompatible subscribers to 1.0 indicating highly compatible subscribers with strong potential for positive mutual engagement. The composite compatibility score step 822 may apply machine learning algorithms that have been trained on historical connection success patterns to optimize the weighting of different compatibility factors based on observed outcomes from previous connection suggestions. The composite compatibility score step 822 may apply threshold filtering to identify subscriber pairs that exceed a minimum compatibility threshold (e.g., scores above 0.6 or 0.7 on the 0.0-1.0 scale) as candidates for connection suggestions, ensuring that only sufficiently compatible pairs are presented to subscribers through the proactive connection step 826.

The composite compatibility score step 822 may flow to an introduction prompt generation step 824 that creates personalized conversation starters and connection suggestions tailored to the specific shared interests and compatibility factors identified between potential subscriber pairs. As shown in FIG. 8, the introduction prompt generation step 824 may generate example prompts such as 'You both love [Artist X] and recently commented on [Song Y]' to highlight shared musical interests, or conversational starters that reference specific commonalities or complementary interests that make the connection potentially valuable for both subscribers. The introduction prompt generation step 824 may create contextually relevant conversation starters that highlight the specific commonalities or complementary interests that make the connection potentially valuable for both subscribers.

The introduction prompt generation step 824 may lead to a proactive connection step 826 where the social engine 142 may present connection recommendations to subscribers along with the generated introduction prompts. The proactive connection step 826 may implement the method of proactively suggesting connections based on the predicted subscriber combinations calculated through the compatibility scoring process. The proactive connection step 826 may present connection suggestions through the subscription system 100's user interface, provide context about why specific connections are being suggested based on the compatibility analysis, allow subscribers to accept or decline connection suggestions with feedback that can be used to refine future recommendations, and manage the frequency and timing of connection suggestions to avoid overwhelming subscribers while maintaining engagement with community-building features. As illustrated in FIG. 8, the proactive connection step 826 may present recommendations in a specific format such as 'Connect with [Username]-[Introduction Prompt]' where the username identifies the suggested connection and the introduction prompt provides context about why the connection is being recommended. The proactive connection step 826 may implement privacy-preserving mechanisms that only suggest connections based on data that subscribers have consented to share, respect subscriber preferences for connection frequency and types, and allow subscribers to control their visibility and discoverability within the community matching system.

An interaction monitoring step 828 may track the outcomes of connection suggestions made through the proactive connection step 826 to evaluate the effectiveness of the compatibility prediction algorithms and refine future connection recommendations. As detailed in FIG. 8, the interaction monitoring step 828 may perform specific tracking operations including: monitoring whether suggested connections are accepted, ignored, or declined by subscribers to measure recommendation effectiveness; and measuring engagement metrics such as messages exchanged, shared content, and collaborative activities between newly connected subscribers to assess connection quality and success. The interaction monitoring step 828 may provide feedback data that enables continuous improvement of the connection prediction algorithms and compatibility scoring methods. The interaction monitoring step 828 may serve dual purposes in the architecture: providing immediate feedback to the interaction graph analysis step 810 through the dashed feedback loop for continuous algorithm refinement, while also feeding forward to the community network optimization step 830 to inform broader community structure improvements based on aggregated connection success patterns.

As illustrated by the prominent dashed feedback line in FIG. 8, the interaction monitoring step 828 may connect back to the interaction graph analysis step 810 through a feedback mechanism that incorporates learning from successful and unsuccessful connection attempts into the network analysis process. This closed-loop architecture may enable the social engine 142 to continuously refine its understanding of what types of subscriber combinations generate positive community outcomes, update its network topology models based on observed connection success rates, and adjust its prediction algorithms accordingly to improve future connection recommendations.

As shown at the bottom of FIG. 8 as the final outcome of the connection prediction pipeline, the process may conclude with a community network optimization step 830 that represents the ongoing optimization of the overall subscriber community network structure based on successful connections and community engagement patterns. The process may conclude with a community network optimization step 830 that represents the ongoing optimization of the overall subscriber community network structure based on successful connections and community engagement patterns. The community network optimization step 830 may implement topology-aware matching that considers not only individual subscriber compatibility but also the broader impact of new connections on community structure and health. The community network optimization step 830 may work to prevent the formation of isolated cliques or echo chambers by encouraging connections that bridge different community segments, ensure that highly engaged subscribers are not overwhelmed with connection requests while less active subscribers receive appropriate engagement opportunities, and maintain overall community balance and diversity in terms of musical interests, expertise levels, and interaction styles. The entire process illustrated in FIG. 8 may operate continuously and iteratively, with the social engine 142 analyzing subscriber data inputs, calculating new compatibility scores as subscriber behaviors evolve, suggesting new connections as compatibility patterns emerge, monitoring the outcomes of those suggestions, and feeding the learning back into improved prediction algorithms, creating a dynamic and self-improving community matching system that adapts to changing subscriber preferences and community dynamics over time.

The method may further comprise predicting subscriber combinations and interaction types that will generate positive community outcomes by analyzing subscriber interaction graphs to identify optimal network topologies for community growth through the interaction graph analysis step 810 and network topology optimization step 812, calculating compatibility scores based on factors including at least one of musical taste overlap (step 814), interaction style patterns (step 816), time zone compatibility (step 818), or complementary expertise areas (step 820) through the composite compatibility score step 822, generating introduction prompts tailored to shared interests identified through content consumption patterns via the introduction prompt generation step 824, and monitoring initial interactions through the interaction monitoring step 828 to refine future connection predictions. The method may further comprise analyzing subscriber interaction graphs to identify optimal network topologies for community growth, calculating compatibility scores based on factors including at least one of musical taste overlap, interaction style patterns, time zone compatibility, or complementary expertise areas, generating introduction prompts tailored to shared interests identified through content consumption patterns, and monitoring initial interactions to refine future connection predictions. The subscriber interaction graphs may be analyzed through the interaction graph analysis step 810 and the network topology optimization step 812, which may identify network structures that promote healthy community growth while preventing the formation of echo chambers or isolated subscriber groups. The compatibility scores may be calculated through the composite compatibility score step 822, which may combine multiple compatibility factors to predict the likelihood of successful subscriber connections and positive community outcomes.

Figure 9:
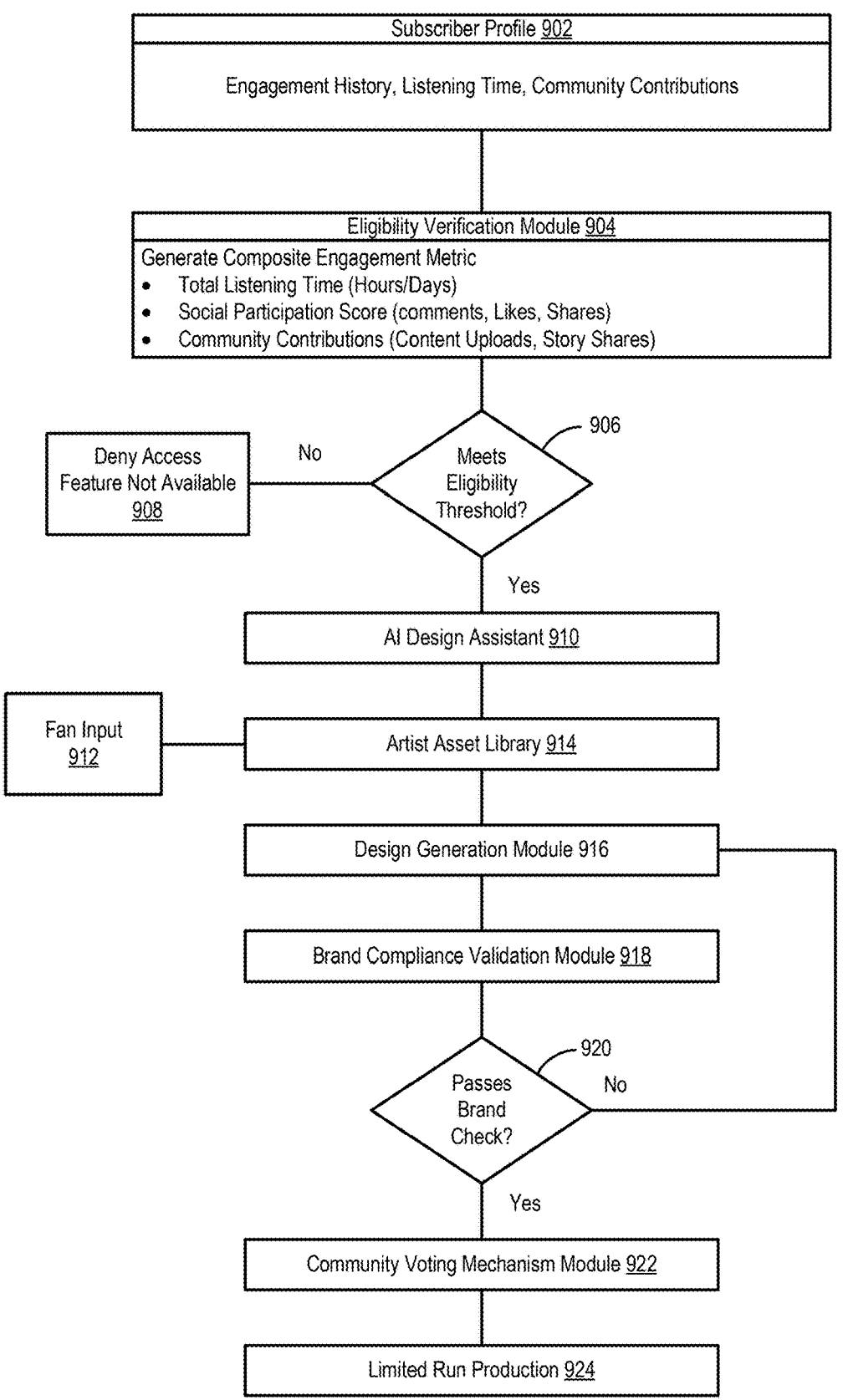
FIG. 9 illustrates a flowchart for merchandise co-creation in a premium music subscription system, according to aspects of the present disclosure.

Referring to FIG. 9, a flow diagram may illustrate the merchandise co-creation workflow architecture, showing the progression from subscriber profile evaluation through eligibility verification, a decision point for access control, AI-assisted design tools, brand compliance validation with an iterative feedback loop, community voting, and final limited run production, creating a complete pipeline from eligibility determination through physical merchandise delivery. In some aspects, the merchandise engine 146 may implement a merchandise co-creation workflow that enables qualified subscribers to participate in designing artist-branded merchandise through AI-assisted design tools. The merchandise co-creation workflow may provide a merit-based access system that evaluates subscriber engagement and community participation to determine eligibility for design privileges, ensuring that merchandise creation opportunities are available to the most dedicated and engaged members of the artist community. The merit-based access system may be implemented through the eligibility verification module 904 and eligibility threshold decision 906 shown at the top of FIG. 9, which evaluate subscriber engagement metrics to determine whether design privileges should be granted, creating a ticred access model where merchandise creation opportunities serve as rewards for sustained community participation and engagement.

A subscriber profile 902 may contain engagement data as illustrated in FIG. 9, including engagement history tracking the subscriber's participation patterns over time, listening time metrics measuring audio consumption duration, and community contributions documenting the subscriber's active participation in discussions, content submissions, and other social activities that demonstrate the subscriber's level of dedication to specific artists or the platform overall. The subscriber profile 902 may track total listening hours accumulated over time, frequency of engagement with specific artists or albums, participation in community discussions through the social engine 142, contributions to fan submissions through the fan submissions module 606, and other behavioral indicators that reflect the subscriber's investment in the artist community. In some cases, the subscriber profile 902 may maintain historical data that enables the merchandise engine 146 to evaluate long-term engagement patterns rather than relying solely on recent activity levels.

An eligibility verification module 904 may receive data from the subscriber profile 902 and may generate a composite engagement metric based on multiple factors that indicate subscriber dedication and community value. As detailed in FIG. 9, the eligibility verification module 904 may generate a composite engagement metric based on multiple specific factors including: total listening time measured in hours or days of audio consumption; social participation scores calculated from comments, likes, and shares contributed through community interactions; and community contributions quantifying content uploads, story shares, and/or other materials submitted by the subscriber. The eligibility verification module 904 may apply weighted scoring algorithms that balance different types of engagement to create an assessment of subscriber merit and community involvement.

The eligibility verification module 904 may feed into an eligibility threshold decision 906, represented by a decision diamond in FIG. 9 labeled 'Meets Eligibility Threshold?', that determines whether the subscriber meets the requirements for merchandise design access by comparing the composite engagement metric against predetermined threshold values. The eligibility threshold decision 906 may compare the composite engagement metric generated by the eligibility verification module 904 against predetermined threshold values that define the minimum level of engagement required for design privileges. The threshold values may be configured differently for different artists based on their preferences for community involvement in merchandise creation, or may be adjusted dynamically based on the volume of design requests and available production capacity for limited run merchandise. As illustrated in FIG. 9, the eligibility threshold decision 906 creates a binary branching pathway: if the subscriber does not meet the threshold (the 'No' path), the flow proceeds leftward to the access denial module 908; if the subscriber meets the threshold (the 'Yes' path), the flow proceeds downward to the AI design assistant 910, ensuring that only qualified subscribers gain access to merchandise creation tools.

If the eligibility threshold decision 906 determines that the subscriber does not meet the required engagement threshold, the process may proceed to an access denial module 908. The access denial module 908 may inform the subscriber that the merchandise design feature is not currently available at their engagement level, provide information about the types of activities that contribute to eligibility for design privileges, and suggest specific actions the subscriber can take to increase their engagement metrics and potentially qualify for design access in the future. The access denial module 908 may maintain the exclusivity of merchandise design privileges while providing clear pathways for subscribers to earn access through continued community participation.

If the eligibility threshold decision 906 determines that the subscriber meets the required engagement threshold, the process may proceed to a design assistant 910 that provides AI-powered tools for merchandise creation. The design assistant 910 may offer guided design workflows that help subscribers create merchandise designs using AI-generated imagery derived from media items, provide template-based design options that ensure brand consistency while allowing creative expression, and implement user-friendly interfaces that enable subscribers without professional design experience to create high-quality merchandise concepts. The design assistant 910 may serve as the user-facing interface and workflow management component, while the design generation module 916 (described below) may comprise the underlying AI algorithms and image processing systems that power the actual creation of merchandise designs based on inputs received through the design assistant 910.

As shown by the lateral entry point in FIG. 9, fan input 912 enters the workflow from the left side after the subscriber has been granted access through the eligibility threshold decision 906, providing creative direction and design preferences that combine with official artist assets to enable the merchandise design creation process. In some aspects, the design assistant 910 may be positioned at the convergence point of two input streams: fan input 912 entering from the left side providing subscriber creative direction, and artist asset library 914 positioned below the design assistant providing official branding materials, with both inputs combining to enable brand-consistent yet creatively expressive merchandise design. In some aspects, the design assistant 910 may receive input from two primary sources that provide the raw materials and creative direction for merchandise design creation. Fan input 912 may comprise creative ideas, design concepts, color preferences, and stylistic directions provided by the subscriber who is creating the merchandise design. The fan input 912 may include text descriptions of desired design elements, uploaded images or artwork that the subscriber wishes to incorporate, selection of specific songs, albums, or artist themes that should influence the design aesthetic, and preferences for merchandise types such as t-shirts, posters, or other branded items. The fan input 912 may enable subscribers to express their creative vision while working within the constraints and guidelines established by the artist and the subscription system 100.

An artist asset library 914 may provide official content and branding materials that ensure merchandise designs maintain consistency with the artist's established visual identity. The artist asset library 914 may contain high-resolution logos, approved color palettes, official artwork, promotional photographs, and other branded materials that have been authorized for use in fan-created merchandise. The artist asset library 914 may implement the brand guidelines integration 256 to ensure that all design elements comply with artist-defined visual standards, logo usage rules, and other branding requirements that maintain the integrity of the artist's commercial identity. As shown in the vertical flow structure of FIG. 9, the artist asset library 914 feeds into the design generation module 916, which processes both the fan input 912 and official assets to create initial merchandise designs that then proceed to the brand compliance validation module 918 for automated quality and standards checking. The artist asset library 914 shown in FIG. 9 may represent the same or similar component as the artist assets repository 152 described in FIG. 1, providing centralized access to official branding materials across multiple system functions, while the brand compliance validation module 918 may work in conjunction with the brand compliance filter 144 and brand models 530 described in earlier figures to ensure consistent enforcement of artist visual guidelines throughout the subscription system 100.

The fan input 912 and the artist asset library 914 may feed into a design generation module 916 that combines subscriber creative input with official artist assets to create merchandise designs that balance fan creativity with brand consistency. The design generation module 916 may employ AI-powered design algorithms that can generate imagery derived from media items, apply artistic styles and effects that complement the artist's aesthetic, combine fan-provided concepts with official branding elements, and create multiple design variations that allow subscribers to explore different creative directions while maintaining brand compliance. The design generation module 916 may enable the method of enabling premium tier subscribers to create designs using AI-generated imagery derived from the media item, providing sophisticated design capabilities that would otherwise require professional graphic design expertise.

The design generation module 916 may output proposed merchandise designs to a brand compliance validation module 918 that ensures all generated designs meet artist-defined visual guidelines and quality standards. The brand compliance validation module 918 may work in conjunction with the brand compliance filter 144 to apply validation checks that evaluate color palette compliance, logo usage correctness, visual style consistency, and overall brand appropriateness. The brand compliance validation module 918 may implement automated validation algorithms that can identify potential brand violations, quality issues, or design elements that may not reproduce effectively on physical merchandise.

The brand compliance validation module 918 may lead to a brand check decision 920, represented by a decision diamond in FIG. 9 labeled 'Passes Brand Check?', that determines whether the generated merchandise design passes all validation requirements by evaluating the validation results from the brand compliance validation module 918. The brand check decision 920 may evaluate the validation results from the brand compliance validation module 918 to determine if the design meets all artist-defined standards for commercial merchandise production. As illustrated by the feedback arrow in FIG. 9, if the design does not pass the brand check decision 920 (following the 'No' path), the process may loop back to the design generation module

916, where the AI algorithms may automatically adjust the design to address the identified compliance issues, modify color schemes or logo placement to meet brand guidelines, or regenerate design elements that failed validation checks, with this iterative refinement cycle continuing until the design successfully passes all brand compliance requirements. This iterative process may continue until the design successfully passes all brand compliance requirements. As shown in FIG. 9, the brand check decision 920 creates two possible flow paths: the 'No' path loops back horizontally to the design generation module 916 for iterative refinement, while the 'Yes' path proceeds downward to the community voting mechanism module 922, ensuring that only brand-compliant designs advance to the community evaluation stage. This closed-loop refinement architecture illustrated by the feedback arrow in FIG. 9 enables automatic iterative improvement without requiring manual intervention, allowing the AI design generation algorithms to progressively converge on brand-compliant solutions through successive refinement cycles until all validation criteria are satisfied.

If the design passes the brand check decision 920, the process may proceed to a community voting module 922 that enables other subscribers within the artist community to evaluate and vote on proposed merchandise designs. The community voting module 922 may present approved designs to other subscribers for feedback and voting, implement voting mechanisms that allow community members to express preferences for different design concepts, track voting results and community engagement with proposed designs, and provide feedback to the original designer about community reception of their creative work. The community voting module 922 may create a democratic process for selecting which fan-created designs will be produced as actual merchandise, ensuring that community preferences influence the final selection of designs that proceed to production. The community voting mechanism module 922 may implement threshold-based selection criteria where designs that receive a minimum number of votes, achieve a certain approval percentage, or rank highly relative to other submitted designs may be deemed successful and eligible to proceed to limited run production 924, ensuring that community preferences influence which fan-created designs are manufactured as physical merchandise. Designs that do not receive sufficient positive community feedback through the community voting mechanism module 922 may remain archived for potential future consideration, be returned to the original designer with community feedback for revision and resubmission, or be excluded from limited run production 924 while still providing the designer with recognition for their creative participation in the community.

Following the final approval through the brand check decision 920, FIG. 9 illustrates a linear progression where designs advance through the community voting mechanism module 922 to gather community feedback and preferences, with successful designs then proceeding to limited run production 924 for physical manufacturing and distribution. In some aspects, designs that receive positive community feedback through the community voting module 922 may proceed to limited run production 924. The limited run production 924 may manufacture approved merchandise designs in small quantities that maintain exclusivity while providing tangible rewards for successful community participation. The limited run production 924 may coordinate with merchandise manufacturing partners to produce physical items such as t-shirts, posters, stickers, or other branded merchandise, implement quality control processes that ensure physical products meet the same standards as the digital designs, and manage distribution logistics to deliver finished merchandise to subscribers who wish to purchase the community-created items. The limited run production 924 may create a complete cycle from digital design creation through physical product delivery, providing subscribers with tangible outcomes from their creative participation in the artist community.

The merchandise co-creation workflow may implement the method of assigning design privileges based on composite engagement metrics including at least one of listening time, social participation, or community contributions. The composite engagement metrics may be calculated by the eligibility verification module 904, which may evaluate listening time through data from the subscriber profile 902, assess social participation through interaction data processed by the social engine 142, and measure community contributions through submissions tracked by the fan submissions module 606. The assignment of design privileges may occur through the eligibility threshold decision 906, which may grant access to the design assistant 910 only for subscribers who demonstrate sufficient engagement across these multiple dimensions of community participation.

The method may further comprise maintaining, by the artificial-intelligence models, brand consistency by adapting fan designs to comply with artist-defined visual guidelines. The brand consistency may be maintained through the design generation module 916, which may employ AI algorithms to ensure that fan creative input is combined with official artist assets in ways that preserve brand integrity. The adaptation of fan designs to comply with artist-defined visual guidelines may be implemented through the brand compliance validation module 918, which may automatically adjust design elements to meet brand standards, and through the iterative feedback loop between the brand check decision 920 and the design generation module 916, which may refine designs until they achieve full compliance with artist branding requirements.

The content-interaction mode may include merchandise design as one of the available AI-powered features for qualified subscribers. The merchandise design functionality may be accessible to premium tier subscribers who meet the engagement requirements established by the eligibility verification module 904, providing an advanced creative feature that extends beyond basic music consumption to enable active participation in artist merchandise creation. The merchandise design capability may represent one of the differentiated features that distinguish premium tier subscriptions from basic tier access, creating additional value for subscribers who demonstrate higher levels of engagement and community participation. The complete merchandise co-creation workflow illustrated in FIG. 9 may provide a pipeline that: evaluates subscriber eligibility through composite engagement metrics (modules 902, 904, 906); enables qualified premium tier subscribers to create designs using AI-generated imagery derived from media items (modules 910, 916); maintains brand consistency by adapting fan designs to comply with artist-defined visual guidelines through automated validation and iterative refinement (modules 918, 920); and assigns design privileges based on composite engagement metrics including listening time, social participation, and community contributions (module 904).

Figure 10:
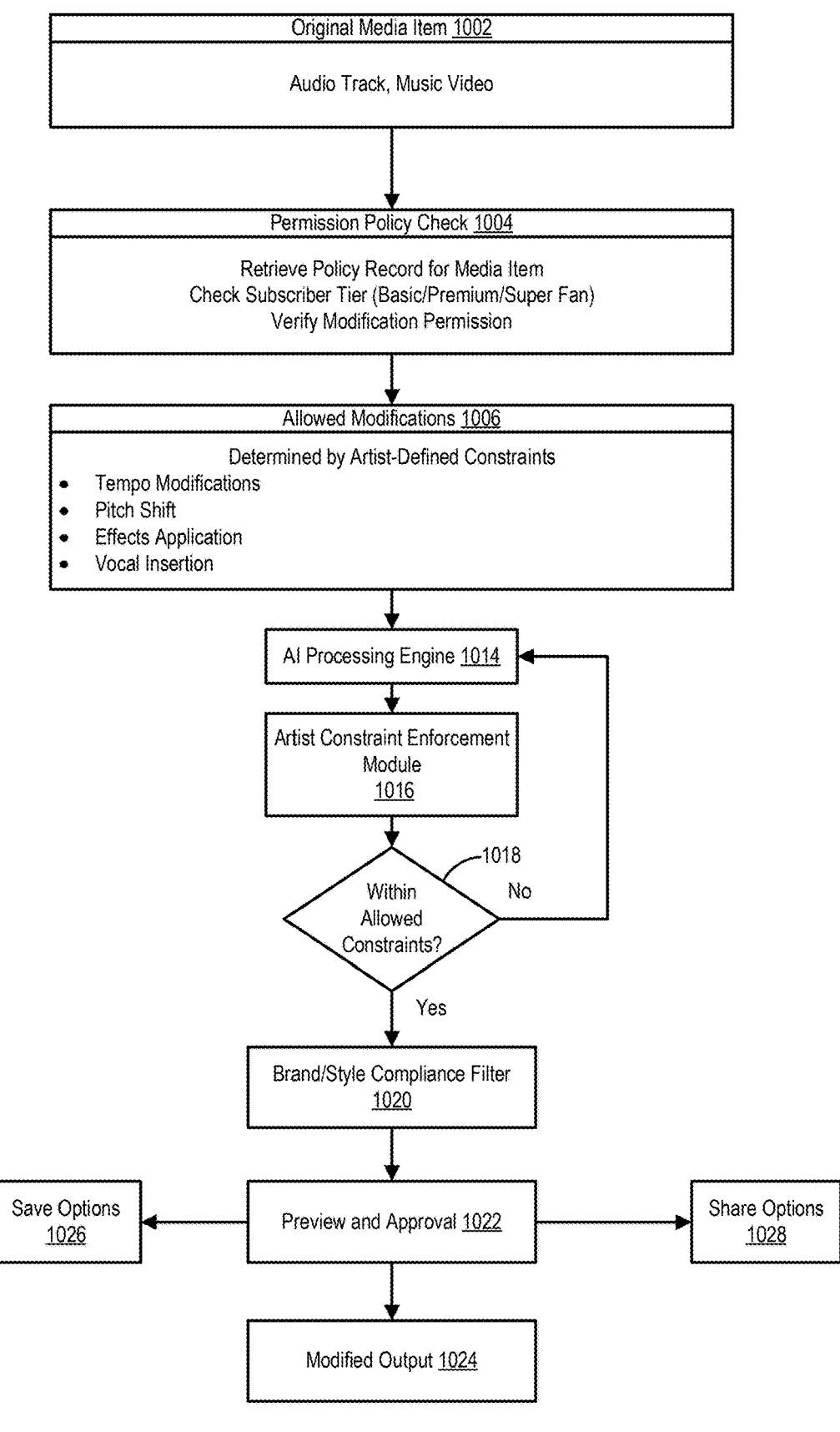
FIG. 10 illustrates a flowchart for a content modification process with permission policy checks, according to aspects of the present disclosure.

Referring to FIG. 10, a flow diagram may illustrate the content modification and remixing process architecture, showing the progression from original media item through permission validation, allowed modifications determination, AI-powered audio processing with constraint enforcement, a decision point for constraint compliance with an iterative feedback loop, brand/style compliance filtering, subscriber preview and approval, and final output with save and share capabilities, creating a complete pipeline that balances subscriber creative freedom with artist-defined boundaries. In some aspects, the remix engine 145 may implement a content modification and remixing process that enables controlled subscriber-led audio manipulation while maintaining compliance with artist-defined constraints and brand guidelines. The remix engine 145 may implement a three-stage validation architecture illustrated in FIG. 10, comprising: initial permission policy validation through the permission policy check module 1004 to verify subscriber entitlement; quantitative constraint enforcement through the artist constraint enforcement module 1016 and constraint decision point 1018 to ensure modifications remain within numerical boundaries; and qualitative brand compliance filtering through the compliance filter 1020 to assess artistic appropriateness, creating a validation pipeline that protects artist interests while enabling subscriber creativity. The remix engine 145 may provide both non-generative audio manipulation capabilities and generative audio content creation features, allowing subscribers to transform existing media items through various modification techniques while ensuring that all transformations remain within boundaries established by content creators.

An original media item 1002 may serve as the source material for audio modification operations within the subscription system 100. As illustrated in FIG. 10, the original media item 1002 may comprise various formats including audio tracks, music videos with synchronized audio, or other forms of recorded musical content available through the media library 151. The original media item 1002 may provide the foundation for subscriber-driven creative modifications while maintaining the artistic integrity of the source material through controlled transformation processes.

When a subscriber requests to modify the original media item 1002, the remix engine 145 may route the request through a permission policy check module 1004. As detailed in FIG. 10, the permission policy check module 1004 may perform three specific validation operations: retrieving the policy record for the media item from the content repositories 150 to access applicable rules and constraints; checking the subscriber tier to determine whether the requesting subscriber is classified as basic tier 212, premium tier 214, or super fan tier 216; and verifying modification permission by consulting the audio modification permission 222 to confirm that the subscriber's tier allows audio modification for the particular media item. The permission policy check module 1004 may verify the subscriber's tier level by determining whether the requesting subscriber is classified as the basic tier 212, the premium tier 214, or the super fan tier 216, as these tier classifications may determine the level of modification access granted. The permission policy check module 1004 may consult the audio modification permission 222 to confirm that the subscriber's tier allows audio modification for the particular media item. The permission policy check module 1004 shown in FIG. 10 may work in conjunction with the permission policy engine 120 described in FIG. 1 and may access the permission policy record 202 structure detailed in FIG. 2, ensuring consistent policy enforcement across all subscription system 100 functions.

Following successful permission validation, the process may proceed to an allowed modifications module 1006 that, as shown in FIG. 10, specifies four categories of permitted transformations determined by artist-defined constraints: tempo modifications for speed adjustments, pitch shift for key transposition, effects application for audio processing enhancements, and vocal insertion for subscriber vocal additions. Following successful permission validation, the process may proceed to an allowed modifications module 1006 that specifies the types and degrees of modification the subscriber may apply to the original media item 1002. The allowed modifications module 1006 may determine permitted modifications based on artist-defined constraints that establish specific parameters and rules for each modification type. The allowed modifications module 1006 may specify tempo modification capabilities that reference permissible ranges of tempo adjustment, enabling subscribers to create slowed or accelerated versions while preventing extreme alterations that would fundamentally change the character of the music. The allowed modifications module 1006 may specify pitch shift capabilities that define permissible ranges of pitch adjustment measured in semitones, allowing subscribers to transpose the key within limited ranges while preventing dramatic tonal alterations.

The allowed modifications module 1006 may specify effects application capabilities that indicate which audio effects such as reverb, echo, equalization, filtering, or compression may be applied to the audio content. The allowed modifications module 1006 may specify vocal insertion capabilities that reference the vocal insertion rule 240, which may permit subscribers to add their own vocal recordings to the track, typically restricted to backup vocals or harmonies rather than replacement of the original lead vocals. The allowed modifications module 1006 may ensure that all modification parameters remain within artist-defined boundaries while providing subscribers with meaningful creative flexibility. As illustrated in the vertical flow structure of FIG. 10, the allowed modifications module 1006 feeds downward into the AI processing engine 1014, which then flows through the artist constraint enforcement module 1016 to the constraint decision point 1018, creating a sequential validation pipeline where each stage builds upon the outputs and constraints established by the preceding stage.

As further shown in FIG. 10, the permitted modifications may be processed by an AI processing engine 1014 that performs the authorized transformations on the audio content. The AI processing engine 1014 shown in FIG. 10 may comprise or invoke the audio models 522 from the model library 518 described in FIG. 5, with the specific models selected by the AI orchestration layer 130 based on the modification types requested by the subscriber and permitted by the allowed modifications module 1006. The AI processing engine 1014 may apply tempo modification through time-stretching algorithms that adjust playback speed without affecting pitch, enabling creation of slowed or accelerated versions that maintain the original key. The AI processing engine 1014 may implement pitch-shifting algorithms with formant preservation that adjust the fundamental frequency of the audio while maintaining the spectral characteristics of voices and instruments that give them their distinctive timbral qualities.

The AI processing engine 1014 may enable subscribers to perform DJ-style cross-mixing between songs using non-generative manipulation including speed change, pitch change, or source separation. The non-generative manipulation capabilities may employ digital signal processing techniques that transform existing audio content without generating entirely new musical elements. The AI processing engine 1014 may implement source separation algorithms that isolate individual instruments or vocal tracks from mixed audio recordings, enabling subscribers to create custom mixes by adjusting the relative levels of different musical elements within the original media item 1002.

The AI processing engine 1014 may further enable controlled music remixing including genre transfer, mashups, tempo modification, or vocal insertion under artist-defined guidelines. The controlled remixing capabilities may employ generative AI techniques that create new musical arrangements while respecting the artistic constraints established by content creators. The AI processing engine 1014 may implement genre transfer algorithms that transform the musical style of the original media item 1002 while preserving melodic and harmonic content, enabling subscribers to explore different musical interpretations within permitted parameters. The AI processing engine 1014 may facilitate mashup creation by combining elements from multiple approved media items, tempo modification through sophisticated time-stretching algorithms, and vocal insertion through audio mixing techniques that blend subscriber-recorded vocals with the original audio content.

The AI processing engine 1014 may enforce constraint limits by ensuring that all modifications remain within the ranges specified by the allowed modifications module 1006, preventing subscribers from requesting or accidentally applying modifications that exceed artist-defined boundaries. The AI processing engine 1014 may preserve original audio quality where possible by employing high-fidelity processing techniques, operating at high sample rates and bit depths, and minimizing cumulative degradation when multiple modifications are applied sequentially.

Following audio processing, the modified audio may be evaluated by an artist constraint enforcement module 1016 that validates compliance with all artist-defined constraints. The artist constraint enforcement module 1016 may perform multiple validation checks to ensure that the completed modifications comply with the parameters established in the allowed modifications module 1006. The artist constraint enforcement module 1016 may verify that tempo modifications remain within allowed ranges by measuring the tempo of the modified audio and confirming that tempo adjustments fall between the minimum and maximum tempo multipliers specified by the artist. The artist constraint enforcement module 1016 may verify that pitch shifts remain within allowed ranges by analyzing the fundamental frequency of the modified audio and confirming that pitch adjustments do not exceed the maximum number of semitones permitted in either direction.

The artist constraint enforcement module 1016 may check compliance with modification rules including the vocal insertion rule 240, the genre transfer rule 242, and the lyric modification rule 244, ensuring that the modifications do not violate prohibitions or restrictions such as genre transfer prohibitions that prevent transforming the musical style, lyric modification restrictions that prohibit changing semantic content, or vocal insertion limitations that restrict vocal additions to specified types.

With continued reference to FIG. 10, the validation results from the artist constraint enforcement module 1016 may be evaluated at a constraint decision point 1018, represented by a decision diamond labeled 'Within Allowed Constraints?', that determines whether the modified audio remains within all artist-defined boundaries through automated verification of compliance with specified parameters. The constraint decision point 1018 may implement automated verification that all artist-defined boundaries have been respected throughout the modification process. As illustrated by the feedback arrow in FIG. 10, if the modified audio exceeds allowed constraints (following the 'No' path from the constraint decision point 1018), the process may loop back horizontally to the AI processing engine 1014, where the modifications may be automatically adjusted to bring them into compliance with artist-defined parameters, rejected with an explanation to the subscriber about which constraints were violated, or regenerated with alternative parameters that would fall within acceptable ranges. Common scenarios that may trigger the 'No' path at constraint decision point 1018 include tempo modifications that exceed the maximum allowed multiplier (e.g., attempting 2.0× speed when only 1.2× is permitted), pitch shifts that exceed the maximum semitone range, application of prohibited effects, or vocal insertions that violate the vocal insertion rule 240 by replacing rather than complementing original vocals. The subscription system 100 may inform the subscriber that their requested modifications exceeded artist-defined limits and may suggest alternative parameters that would fall within acceptable ranges. This feedback loop may prevent creation of modifications that violate artist constraints while protecting artistic integrity and educating subscribers about the boundaries within which they can exercise creative freedom. As shown in FIG. 10, the constraint decision point 1018 creates two flow paths:

the 'No' path loops back horizontally to the AI processing engine 1014 for modification adjustment or rejection, while the 'Yes' path proceeds downward to the brand/style compliance filter 1020, ensuring that only technically compliant modifications advance to qualitative brand assessment. This feedback loop architecture shown in FIG. 10 may support multiple iteration cycles, where the AI processing engine 1014 progressively refines modifications through successive attempts until the output satisfies all constraint requirements verified at decision point 1018, with each iteration building upon feedback from the artist constraint enforcement module 1016 to converge on compliant solutions.

If the modified audio remains within allowed constraints, the process may proceed to a brand and style compliance filter 1020 (hereinafter 'compliance filter 1020') that applies additional quality and appropriateness checks beyond the quantitative constraint verification performed by the artist constraint enforcement module 1016. The compliance filter 1020 may invoke the brand compliance filter 144 to perform qualitative assessment of the modified content, ensuring that modified content respects artist intent by evaluating whether the modifications, while technically within allowed parameters, nonetheless result in output that conflicts with the artist's aesthetic vision or could be perceived as disrespectful when the artist has not authorized such treatment. The compliance filter 1020 may check for quality degradation or distortion by analyzing the modified audio for artifacts, excessive noise, clipping, or other technical defects that might result from the modification process, rejecting modifications that significantly degrade audio quality even if they comply with constraint ranges.

As shown by the vertical flow in FIG. 10, modifications that pass both the quantitative constraint enforcement performed by the artist constraint enforcement module 1016 (verified at decision point 1018) and the qualitative brand compliance checks performed by the compliance filter 1020 may proceed to the preview and approval module 1022 for subscriber review. Modifications that pass both constraint enforcement and brand compliance may proceed to a preview and approval flow through a preview and approval module 1022. The preview and approval module 1022 may present the modified audio to the subscriber for review, allowing the subscriber to listen to the result of their modifications before finalizing the content. The preview and approval module 1022 may allow further adjustments or acceptance, enabling the subscriber to refine their modification parameters and regenerate the audio iteratively until achieving their desired result, or to accept the current version. The preview and approval module 1022 may store the approved version with modification metadata, saving the modified audio file along with metadata that documents the original source media item, the specific modifications applied, the date of creation, and the subscriber who created the modification. As illustrated by the lateral connections in FIG. 10, the preview and approval module 1022 serves as a central hub with bidirectional connections to save module 1026 on the left side and share module 1028 on the right side, enabling subscribers to store or distribute their approved modifications through multiple pathways while maintaining the preview functionality as the central control point for modification finalization.

Following subscriber approval through the preview and approval module 1022, as shown in the lower section of FIG. 10, the preview and approval module 1022 may output a modified output 1024 that represents the subscriber's finalized personalized version of the original media item 1002. The preview and approval module 1022 may output a modified output 1024 that represents the subscriber's personalized version of the original media item 1002, transformed according to their preferences while remaining within artist-defined boundaries. The modified output 1024 may comprise audio content that has been processed through the complete modification and validation pipeline, ensuring compliance with all artist constraints and quality standards. The modified output 1024 may be used for personal listening, shared with others subject to applicable permissions, or incorporated into other creative projects depending on the rights associated with the original media item 1002 and the terms of the subscription service.

After the preview and approval module 1022 generates the modified output 1024, as shown by the lateral connections in FIG. 10, the subscriber may utilize the save module 1026 to store their modified audio in their personal library for future access. As further shown in FIG. 10, the subscription system 100 may provide a save module 1026 that enables subscribers to store their modified audio in their personal library for future access. The save module 1026 may organize modifications into playlists or collections, maintain a history of creative modifications, and provide search and retrieval capabilities that allow subscribers to locate previously created content. The save module 1026 may implement version control features that track different iterations of modifications applied to the same original media item 1002, enabling subscribers to compare different creative approaches and maintain multiple versions of their personalized content.

In addition to storage capabilities, the modified output 1024 may be processed through the share module 1028 shown on the right side of FIG. 10, which enables subscribers to distribute their modified audio content through various channels and platforms. The subscription system 100 may provide a share module 1028 that enables subscribers to distribute their modified audio content through various channels and platforms. The share module 1028 may enable subscribers to export modified audio files for use outside the subscription system 100, subject to digital rights management and licensing constraints that protect artist intellectual property. The share module 1028 may facilitate sharing modifications with other subscribers through the social features implemented by the social engine 142, creating opportunities for community engagement and collaborative creativity. The share module 1028 may enable posting modified audio to social media platforms, potentially as short clips suitable for platforms that support brief audio content, allowing subscribers to showcase their creative work while respecting platform-specific content requirements and duration limitations.

The method may further comprise analyzing user-provided text descriptions or user-provided video content and generating audio clips suitable for social media sharing, with the audio clips selected and modified based on user-specified parameters including at least one of clip length or content subject matter. The AI processing engine 1014 may analyze textual descriptions provided by subscribers to understand their creative intent and desired aesthetic outcomes, using natural language processing capabilities from the NLP models 526 to interpret subscriber requests and translate them into appropriate audio modification parameters. The AI processing engine 1014 may analyze user-provided video content to identify visual themes, pacing, and narrative elements that should be reflected in accompanying audio clips, enabling creation of audio content that complements visual media for social media applications.

The generated audio clips may be selected and modified based on user-specified parameters that include clip length requirements for different social media platforms, with the AI processing engine 1014 capable of creating clips optimized for platforms with varying duration limits and audio quality requirements. The user-specified parameters may include content subject matter preferences that guide the selection of appropriate segments from the original media item 1002 and the application of modifications that enhance the thematic relevance of the audio content to the subscriber's intended use case.

The modified content, supplemental content, or generative content may comprise at least one of audio content or non-audio visual content, with the remix engine 145 capable of producing both audio transformations through the AI processing engine 1014 and visual content that accompanies or complements the modified audio. The audio content may include the various modifications and transformations described above, while the non-audio visual content may include synchronized visualizations, album artwork adaptations, or other visual elements that enhance the presentation of the modified audio content across different platforms and use cases.

The content modification and remixing process illustrated in FIG. 10 may provide a workflow that: validates subscriber permissions based on tier level and permission policies (module 1004); determines allowed content-interaction modes based on artist-defined constraints (module 1006); generates modified or supplemental content through AI models selected based on the content-interaction mode and permission policy (engine 1014); enforces compliance with artist-defined constraints through quantitative validation (modules 1016, 1018) and qualitative brand assessment (filter 1020); and enables subscribers to create, transform, and curate content derived from or associated with media items while maintaining artistic integrity and brand consistency.

Figure 11:
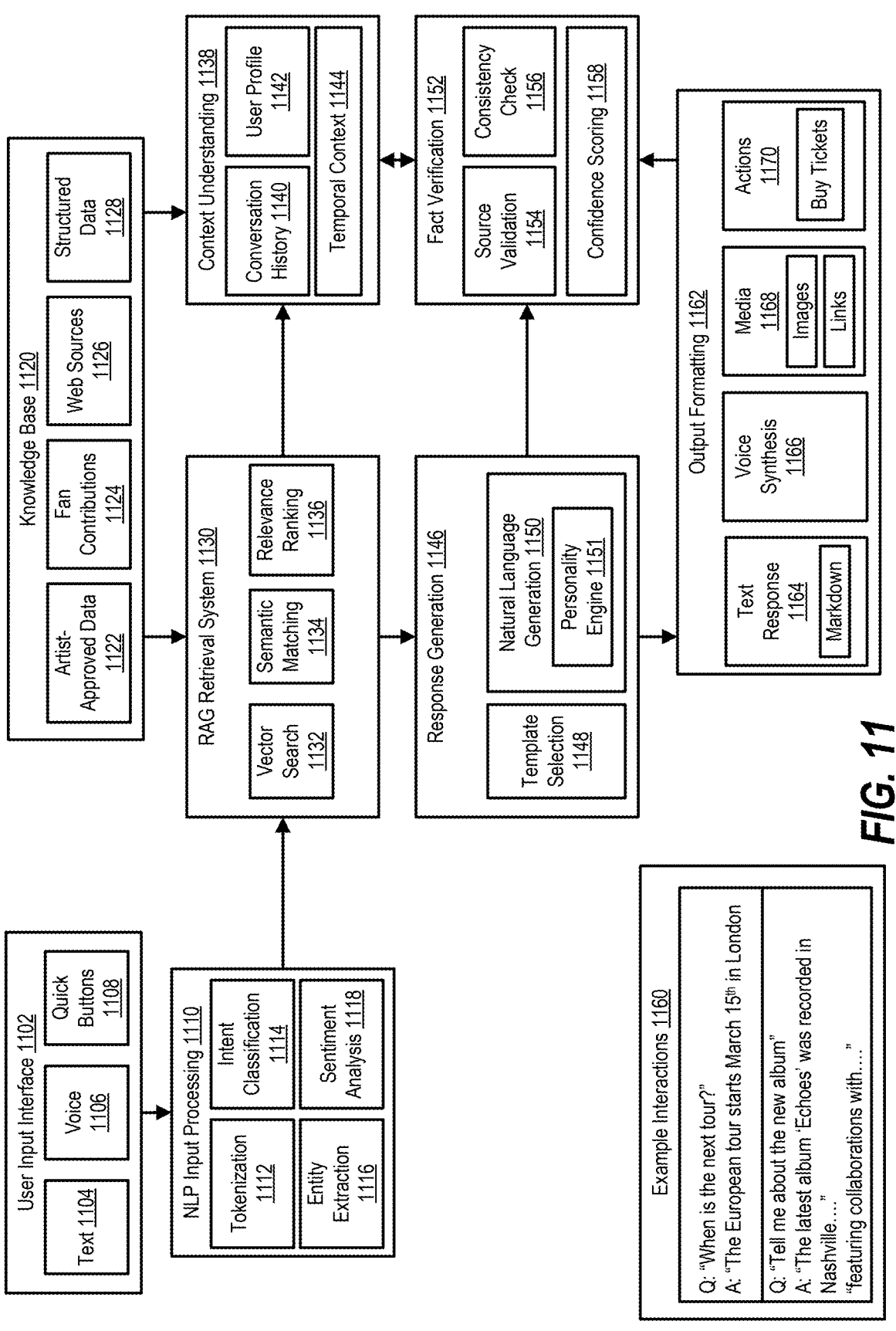
FIG. 11 illustrates an artist chatbot architecture that processes user inputs and generates responses, according to aspects of the present disclosure.

Referring to FIG. 11, an architectural diagram may illustrate an artist knowledge chatbot system, showing the spatial organization of major functional components including the user input interface 1102 positioned at the top-left for receiving subscriber queries, the NLP input processing 1110 below for linguistic analysis, the knowledge base 1120 spanning the top-right containing multiple information sources, the RAG retrieval system 1130 and context understanding 1138 in the center-right for information retrieval and contextual awareness, the response generation 1146 and fact verification 1152 modules in the center for creating validated responses, the output formatting 1162 at the bottom-right for multi-modal presentation, and example interactions 1160 at the bottom-left demonstrating system capabilities, with directional arrows indicating information flow through the processing pipeline. The directional arrows in FIG. 11 illustrate the primary data flow paths: from the user input interface 1102 downward to the NLP input processing 1110; from the NLP processing rightward to the RAG retrieval system 1130; from the knowledge base 1120 downward into the RAG retrieval system 1130; from the RAG system downward to the response generation module 1146; bidirectional arrows between the response generation 1146 and fact verification 1152 modules indicating iterative validation; from the context understanding 1138 into both the RAG system and response generation; and from the response generation 1146 to the output formatting 1162, creating a processing pipeline from query input through validated response output. In some aspects, the chatbot engine 147 may implement an artist knowledge system that provides natural language conversational interactions with subscribers through multiple input modalities and sophisticated information retrieval capabilities. The chatbot engine 147 may enable subscribers to engage in detailed discussions about artists, their music, career history, and related topics through an AI-powered conversational interface that maintains extensive knowledge about artist-specific information while providing contextually relevant and factually accurate responses.

A user input interface 1102 may provide multiple modalities for subscribers to interact with the chatbot system, as illustrated in FIG. 11 by three nested input components within the user input interface box: text input 1104 for typed queries, voice input 1106 for spoken queries, and quick button controls 1108 for pre-configured shortcuts, accommodating diverse user preferences and device capabilities through various input methods that are processed and normalized for downstream natural language understanding components. The user input interface 1102 may support simultaneous operation of multiple input methods, allowing subscribers to switch between different interaction modes based on their current context, device capabilities, or personal preferences.

A text input 1104 may receive typed queries through keyboard or touch screen interfaces on subscriber devices. The text input 1104 may support free-form natural language questions, allowing subscribers to express queries in their own words without requiring specific command syntax or structured formats. The text input 1104 may handle various text encodings and languages, normalizing input for consistent processing while preserving linguistic nuances that may be relevant to query interpretation. In some cases, the text input 1104 may provide auto-completion suggestions or query refinement options based on common artist-related topics and frequently asked questions.

A voice input 1106 may enable spoken queries through microphone capture and automatic speech recognition capabilities. The voice input 1106 may convert audio waveforms to text representations while preserving prosodic features that may indicate query intent or emotional context. The voice input 1106 may support hands-free interaction and may improve accessibility for subscribers with different abilities or situational constraints such as driving or multitasking. The voice input 1106 may implement noise cancellation and acoustic processing to maintain recognition accuracy in various environmental conditions, enabling reliable voice interaction across different usage contexts.

Quick button controls 1108 may provide pre-configured shortcuts for frequently asked questions or common interaction patterns. The quick button controls 1108 may reduce interaction friction for routine queries such as "upcoming tours," "latest release," or "merchandise availability," while maintaining the option for more detailed natural language queries when subscribers require specific information. The quick button controls 1108 may serve as discovery mechanisms for new subscribers who may be unfamiliar with the full range of chatbot capabilities, providing guided entry points into more complex conversational interactions. The quick button controls 1108 may be dynamically updated based on current artist activities, seasonal events, or trending topics within the artist community.

The user input interface 1102, as shown by the arrow flowing from the interface box to the NLP input processing 1110 in FIG. 11, may route input from the text input 1104, the voice input 1106, and the quick button controls 1108 through internal processing logic (represented by the connection between these modules) that coordinates the flow of information between different input modalities and downstream processing components. The processing module 1113 may normalize input from different sources into consistent formats for natural language processing, manage session state and conversation context across different input methods, and coordinate timing and synchronization when subscribers use multiple input modalities simultaneously or in rapid succession.

An NLP input processing module 1110, illustrated in FIG. 11 as containing four parallel sub-components (tokenization 1112, intent classification 1114, entity extraction 1116, and sentiment analysis 1118) arranged within a single processing box, may receive normalized input and may perform linguistic analysis on received queries to extract meaning, intent, and relevant entities. In some aspects, an NLP input processing 1110 may receive normalized input from the processing module 1113 and may perform linguistic analysis on received queries to extract meaning, intent, and relevant entities. The NLP input processing 1110 may employ multiple natural language processing techniques in parallel to ensure robust understanding of subscriber queries regardless of phrasing variations, linguistic complexity, or domain-specific terminology related to music and artist information.

A tokenization 1112 within the NLP input processing 1110 may segment input text into meaningful units including words, phrases, and punctuation marks. The tokenization 1112 may handle contractions, compound words, and domain-specific terminology related to music and artist information, providing foundational text units for subsequent linguistic analysis stages. The tokenization 1112 may preserve semantic boundaries and may identify multi-word expressions that should be treated as single conceptual units, such as album titles, song names, or technical music terminology.

An intent classification 1114 may determine the primary purpose or goal of the subscriber's query within the NLP input processing 1110. The intent classification 1114 may categorize queries into predefined intent categories such as information seeking about artist biography, transaction requests for merchandise or tickets, trivia questions about music history, or conversational engagement for entertainment purposes. The intent classification 1114 may employ machine learning models trained on music domain conversations to accurately identify subscriber objectives even when expressed through indirect or colloquial language, enabling appropriate response generation strategies for different types of queries.

An entity extraction 1116 may identify and extract specific named entities and concepts from the query text within the NLP input processing 1110. The entity extraction 1116 may recognize entity types including song titles, album names, tour locations, dates, collaborator names, record labels, and other music-specific entities that are relevant to artist information queries. The extracted entities may serve as parameters for information retrieval and response generation, enabling precise answers to specific questions about artist activities, discography, or career milestones.

A sentiment analysis 1118 may evaluate the emotional tone and attitude expressed in subscriber queries within the NLP input processing 1110. The sentiment analysis 1118 may detect positive, negative, or neutral sentiment, as well as specific emotions such as excitement, frustration, curiosity, or appreciation. The sentiment analysis 1118 may inform response tone adjustment and may help identify potentially sensitive topics requiring careful handling, ensuring that chatbot responses maintain appropriate emotional resonance with subscriber queries and conversational context.

As further shown in FIG. 11, a knowledge base 1120 may serve as the information repository, illustrated as containing four distinct data source components arranged horizontally: artist-approved data 1122 providing official information, fan contributions 1124 offering community-generated content, web sources 1126 aggregating publicly available information, and structured data 1128 containing formally organized metadata, with all sources collectively providing coverage of artist-related information while maintaining data provenance and reliability indicators. The knowledge base 1120 may aggregate information from multiple sources while maintaining data provenance and reliability indicators, enabling the chatbot system to provide coverage of artist-related information while supporting fact verification and conflict resolution when different sources provide contradictory information.

Artist-approved data 1122 within the knowledge base 1120 may comprise official information provided or authorized by artists or their representatives. The artist-approved data 1122 may include authoritative biography information detailing the artist's history and career milestones, complete discography with album and single releases, tour history including past and upcoming performance dates and venues, awards and recognition received throughout the artist's career, and official statements or interviews that have been approved for public distribution. The artist-approved data 1122 may serve as the primary authoritative source for factual information, taking precedence over other sources when conflicts arise during information retrieval and response generation.

Fan contributions 1124 within the knowledge base 1120 may incorporate community-generated content that has been verified and moderated for accuracy and appropriateness. The fan contributions 1124 may include concert photographs capturing live performance moments, detailed set lists from specific shows documenting song selections and arrangements, fan stories and experiences that provide personal perspectives on the artist's impact, and trivia facts that demonstrate deep fan knowledge and engagement with the artist's work. The fan contributions 1124 may enrich the knowledge base with diverse perspectives and granular details not available through official channels, while undergoing curation and filtering processes to ensure information quality and relevance.

Web sources 1126 within the knowledge base 1120 may aggregate publicly available information from various online platforms and publications. The web sources 1126 may encompass news articles reporting on current events and announcements, professional reviews of albums and performances, published interviews revealing artist insights and perspectives, and social media content providing real-time updates and fan interactions. The web sources 1126 may undergo curation and filtering processes to ensure information quality and relevance while removing unreliable or inappropriate content that could compromise the accuracy of chatbot responses.

Structured data 1128 within the knowledge base 1120 may contain formally organized information with defined schemas and relationships. The structured data 1128 may include song metadata such as duration, key, tempo, and credits, detailed album credits listing producers, musicians, and technical personnel, precise release dates for various markets and formats, and historical chart positions across different ranking systems. The structured data 1128 may enable precise factual responses and may support complex queries involving specific data points or relationships between different pieces of artist information.

A RAG retrieval system 1130, illustrated in FIG. 11 as containing three parallel retrieval components (vector search 1132 for similarity matching, semantic matching 1134 for conceptual relationships, and relevance ranking 1136 for prioritization), may implement advanced information retrieval techniques to identify and extract relevant knowledge from the knowledge base 1120. The RAG retrieval system 1130 may combine multiple retrieval strategies to ensure high recall and precision in finding information pertinent to subscriber queries, enabling the chatbot engine 147 to provide accurate responses based on the most relevant available information from multiple knowledge sources. The retrieval augmented generation (RAG) approach implemented by the RAG retrieval system 1130 combines traditional information retrieval techniques with generative AI capabilities, using the retrieved information from the knowledge base 1120 to augment and ground the natural language generation performed by the response generation module 1146, ensuring responses are factually grounded in available knowledge while maintaining conversational fluency and contextual appropriateness.

A vector search 1132 within the RAG retrieval system 1130 may perform similarity matching in high-dimensional embedding spaces. The vector search 1132 may convert queries and knowledge base entries into dense vector representations that capture semantic meaning, enabling retrieval of conceptually related information even when exact keyword matches are absent. The vector search 1132 may employ neural embedding models trained on music domain content to ensure that semantic relationships specific to artist information and music terminology are accurately captured in the vector representations.

A semantic matching 1134 within the RAG retrieval system 1130 may identify conceptual relationships between query elements and knowledge base content. The semantic matching 1134 may employ knowledge graphs and ontologies specific to the music domain to understand relationships such as "influenced by," "collaborated with," or "similar to" that may be relevant to subscriber queries. The semantic matching 1134 may ensure responses incorporate contextually appropriate information beyond literal query matches, enabling the chatbot to provide answers that address the underlying intent of subscriber questions.

A relevance ranking 1136 within the RAG retrieval system 1130 may order retrieved information by predicted usefulness for answering the subscriber's query. The relevance ranking 1136 may consider factors including semantic similarity scores, source authority based on the reliability of different knowledge sources, temporal relevance for time-sensitive information, and subscriber interaction history that may indicate personal preferences or interests. The relevance ranking 1136 may ensure responses lead with the most pertinent information while maintaining coverage of relevant topics.

With continued reference to FIG. 11, a context understanding module 1138, shown as containing three contextual awareness components (conversation history 1140 tracking prior exchanges, user profile 1142 incorporating subscriber-specific information, and temporal context 1144 maintaining time-sensitive awareness), may maintain awareness of conversational context and subscriber-specific factors that influence appropriate response generation. The context understanding module 1138 may enable coherent multi-turn conversations and personalized responses adapted to individual subscriber characteristics and interaction history, ensuring that chatbot responses remain contextually appropriate and conversationally coherent across extended interactions.

A conversation history 1140 within the context understanding module 1138 may track the sequence of previous exchanges within the current session and across historical interactions. The conversation history 1140 may maintain discourse state including referenced entities, discussed topics, and unresolved questions from earlier turns in the conversation. The conversation history 1140 may enable pronoun resolution, topic continuation, and contextually appropriate responses that build upon previous exchanges, creating natural conversational flow that acknowledges prior discussion points and maintains thematic coherence.

A user profile 1142 within the context understanding module 1138 may incorporate subscriber-specific information including musical preferences, interaction patterns, and demonstrated knowledge levels. The user profile 1142 may enable personalized responses adjusted for subscriber expertise, interests, and communication preferences, drawing from data collected through the user knowledge level determination module 416 and other subscriber interaction tracking systems. The user profile 1142 may ensure responses are appropriately detailed and relevant to individual subscribers' needs and interests.

A temporal context 1144 within the context understanding module 1138 may maintain awareness of time-sensitive factors affecting response relevance. The temporal context 1144 may consider current date and time, upcoming events such as tour dates or album releases, recent releases or news developments, and temporal query references such as "next month" or "last year." The temporal context 1144 may ensure responses reflect current information and may correctly interpret time-relative queries within the appropriate temporal framework. The temporal context 1144 may draw upon information from the knowledge base 1120, particularly the structured data 1128 containing release dates and the web sources 1126 providing current news, to maintain accurate awareness of time-sensitive factors and correctly interpret temporal references in subscriber queries.

As shown by the multiple incoming arrows in FIG. 11, a response generation module 1146 may receive inputs from the RAG retrieval system 1130 providing relevant information, from the context understanding module 1138 providing conversational and subscriber-specific context, and from the NLP input processing 1110 providing query structure and intent, synthesizing these multiple information streams into natural language responses. A response generation module 1146, illustrated in FIG. 11 as containing two primary components (template selection 1148 for choosing response structures and natural language generation 1150 which itself contains a nested personality engine 1151 for maintaining consistent voice and tone), may synthesize retrieved information and contextual understanding into natural language responses. The response generation module 1146 may combine template-based and generative approaches to produce fluent, informative, and engaging responses tailored to the specific query and subscriber context, creating conversational interactions that feel natural and informative while maintaining accuracy and relevance.

A template selection 1148 within the response generation module 1146 may choose appropriate response structures based on query type and intent. The template selection 1148 may maintain templates for different response categories including informative answers providing factual information, conversational responses for engaging dialogue, trivia presentations for entertainment value, and story formats for narrative content about artist history or experiences. The template selection 1148 may ensure responses follow appropriate discourse patterns for their intended purpose while maintaining flexibility for creative and engaging presentation of information.

A natural language generation 1150 within the response generation module 1146 may produce fluent text that naturally incorporates retrieved information while maintaining conversational coherence. The natural language generation 1150 may employ advanced language models that can generate contextually appropriate responses while preserving factual accuracy and maintaining consistent voice and tone characteristics.

A personality engine 1151, shown in FIG. 11 as a nested component within the natural language generation 1150 box, indicating its role as a specialized sub-function of the text generation process, may ensure responses reflect consistent voice and tone characteristics aligned with the artist's brand and communication style. The personality engine 1151 may modulate language choices, formality levels, and stylistic elements to create engaging and authentic-feeling interactions that reflect the artist's personality and communication preferences. The personality engine 1151 may adapt response style based on the specific artist being discussed, ensuring that conversations about different artists maintain appropriate tonal consistency with each artist's established public persona.

A fact verification module 1152, shown in FIG. 11 as containing three validation components (source validation 1154 for verifying credibility, consistency check 1156 for resolving conflicts, and confidence scoring 1158 for assigning reliability estimates), may validate information accuracy before inclusion in responses, implementing multiple verification strategies to ensure the chatbot provides reliable and trustworthy information while acknowledging uncertainty when appropriate. The fact verification module 1152 may prevent the propagation of inaccurate or outdated information in chatbot responses while maintaining transparency about information reliability and source credibility. As illustrated by the bidirectional arrows between the response generation module 1146 and the fact verification module 1152 in FIG. 11, these components may interact iteratively, with the fact verification module 1152 validating content generated by the response generation module 1146 and feeding corrections or confidence scores back to refine the response before final output, creating a closed-loop validation system that ensures response accuracy while maintaining conversational fluency.

A source validation 1154 within the fact verification module 1152 may verify the credibility and currency of information sources. The source validation 1154 may check source reputation, publication dates, and update histories to ensure information reliability, prioritizing the artist-approved data 1122 over other sources when conflicts arise. The source validation 1154 may prevent the propagation of outdated or unreliable information in chatbot responses while maintaining awareness of source hierarchy and credibility rankings.

A consistency check 1156 within the fact verification module 1152 may identify and resolve conflicts between different information sources. The consistency check 1156 may apply resolution rules prioritizing authoritative sources and recent updates while flagging irreconcilable conflicts for human review. The consistency check 1156 may ensure responses do not contain contradictory information that could confuse subscribers while maintaining transparency about information uncertainty when conflicts cannot be resolved.

A confidence scoring 1158 within the fact verification module 1152 may assign reliability estimates to generated responses based on source quality, information consistency, and retrieval confidence. The confidence scoring 1158 may enable the chatbot system to express appropriate uncertainty levels, using phrases such as "according to recent reports" or "official sources indicate" when confidence is moderate. The confidence scoring 1158 may maintain subscriber trust by transparently communicating information reliability and avoiding overconfident assertions when information certainty is limited.

Example interactions 1160, shown in a separate box at the bottom-left of FIG. 11, may illustrate typical query-response exchanges such as 'Q: When is the next tour?' receiving the answer 'A: The European tour starts March 15th in London,' and 'Q: Tell me about the new album' generating the response 'A: The latest album Echoes was recorded in Nashville . . . featuring collaborations with . . . ', demonstrating the chatbot system's capabilities across different types of subscriber inquiries including both specific factual queries and open-ended questions requiring narrative responses. The example interactions 1160 may show tour inquiries receiving specific date and location information retrieved from the structured data 1128, and album questions generating detailed background about recording and collaborations sourced from the artist-approved data 1122 and the fan contributions 1124. The example interactions 1160 may demonstrate the system's ability to handle both factual queries requiring specific data retrieval and open-ended questions requiring narrative responses that synthesize information from multiple knowledge sources.

As further shown at the bottom-right of FIG. 11, an output formatting module 1162, illustrated as containing four distinct output modality components (text response 1164 with markdown support, voice synthesis 1166 for audio output, media 1168 for images and links, and actions 1170 for interactive elements like 'Buy Tickets'), may adapt generated responses for presentation across different interface modalities and device types. The output formatting module 1162 may ensure responses are appropriately structured and enhanced for their delivery medium while maintaining information completeness and accessibility across diverse subscriber devices and interaction preferences.

A text response 1164 within the output formatting module 1162 may structure textual output with appropriate formatting including paragraphs, lists, and emphasis. The text response 1164 may support markup syntax for rich text presentation in compatible interfaces, enabling formatted lists, links, and styled text that improves readability and information organization. The text response 1164 may adapt formatting complexity based on the capabilities of the subscriber's device and interface, ensuring optimal presentation across different platforms and screen sizes. As specifically indicated in FIG. 11, the text response 1164 may support markdown formatting syntax, enabling rich text presentation with structured lists, emphasis, links, and other formatting elements that improve readability and information organization when displayed on compatible subscriber devices.

A voice synthesis 1166 within the output formatting module 1162 may convert text responses to natural-sounding speech output. The voice synthesis 1166 may apply prosodic modeling to generate appropriate intonation, emphasis, and pacing that conveys meaning effectively through audio presentation. The voice synthesis 1166 may enable hands-free interaction and may improve accessibility for subscribers with visual impairments or situational constraints that make audio interaction preferable to text-based communication.

Media 1168 within the output formatting module 1162 may enhance responses with multimedia elements including images, audio clips, and hyperlinks. The media 1168 may identify opportunities to augment textual responses with album artwork, artist photographs, music previews, or links to additional resources available through the content repositories 150. The media 1168 may create more engaging and informative responses that leverage multiple content modalities while maintaining focus on the subscriber's specific query and information needs. As specifically illustrated in FIG. 11, the media 1168 component may incorporate images such as album artwork and artist photographs, as well as hyperlinks to additional resources, enriching responses with visual and navigational elements.

Actions 1170 within the output formatting module 1162 may embed interactive elements enabling direct subscriber actions from within responses. The actions 1170 may generate contextual action buttons such as "Buy Tickets" for tour-related queries, enabling seamless transitions from information seeking to transaction completion. The actions 1170 may integrate with external services and platforms to provide functionality that extends beyond information retrieval to include practical actions that subscribers may wish to take based on the information provided. As shown in the FIG. 11 example, the actions 1170 may generate contextual action buttons such as 'Buy Tickets' for tour-related queries, providing direct paths from information discovery to transaction completion.

The method may further comprise receiving natural language queries from the subscriber regarding an artist, retrieving information from a knowledge base comprising artist-approved data, fan contributions, and web sources using retrieval augmented generation, and generating natural language responses providing contextual information about the artist. The natural language queries may be received through the user input interface 1102, which may support the text input 1104, the voice input 1106, and the quick button controls 1108 for diverse interaction modalities. The retrieval of information using retrieval augmented generation may be implemented through the RAG retrieval system 1130, which may employ the vector search 1132, the semantic matching 1134, and the relevance ranking 1136 to identify and prioritize relevant information from the knowledge base 1120. The natural language responses providing contextual information about the artist may be generated through the response generation module 1146, which may synthesize retrieved information into coherent and engaging conversational responses.

The method may further comprise verifying facts using source validation and consistency checking before generating the natural language responses. The fact verification may be implemented through the fact verification module 1152, which may employ the source validation 1154 to verify the credibility and currency of information sources, and the consistency check 1156 to identify and resolve conflicts between different information sources. The confidence scoring 1158 may assign reliability estimates to information before inclusion in responses, ensuring that subscribers receive accurate and trustworthy information while maintaining transparency about information certainty levels.

The supplemental content may comprise an AI-powered avatar of an artist that is configured to interact with the subscriber through natural language conversation. The AI-powered avatar may be implemented through the chatbot engine 147, which may provide conversational interactions that simulate direct communication with the artist while drawing from the knowledge base 1120 containing artist-specific information. The natural language conversation capability may be enabled through the NLP input processing 1110 for understanding subscriber queries and the response generation module 1146 for generating contextually appropriate responses that reflect the artist's personality and communication style through the personality engine 1151.

The artist knowledge chatbot architecture illustrated in FIG. 11 may implement a conversational AI system that: receives subscriber queries through multiple input modalities (interface 1102); processes natural language input through linguistic analysis (NLP processing 1110); retrieves relevant information from a multi-source knowledge base using advanced RAG techniques (knowledge base 1120 and RAG system 1130); maintains conversational and temporal context for coherent interactions (context understanding 1138); generates natural language responses with appropriate personality and tone (response generation 1146 with personality engine 1151); validates factual accuracy through multi-stage verification (fact verification 1152); and delivers responses through multiple output formats including text, voice, rich media, and interactive actions (output formatting 1162), thereby providing a complete implementation of the AI-powered artist chatbot, which may serve as one form of supplemental content or AI-powered avatar enabling subscribers to interact with artist knowledge through natural conversational interfaces.

Figure 12:
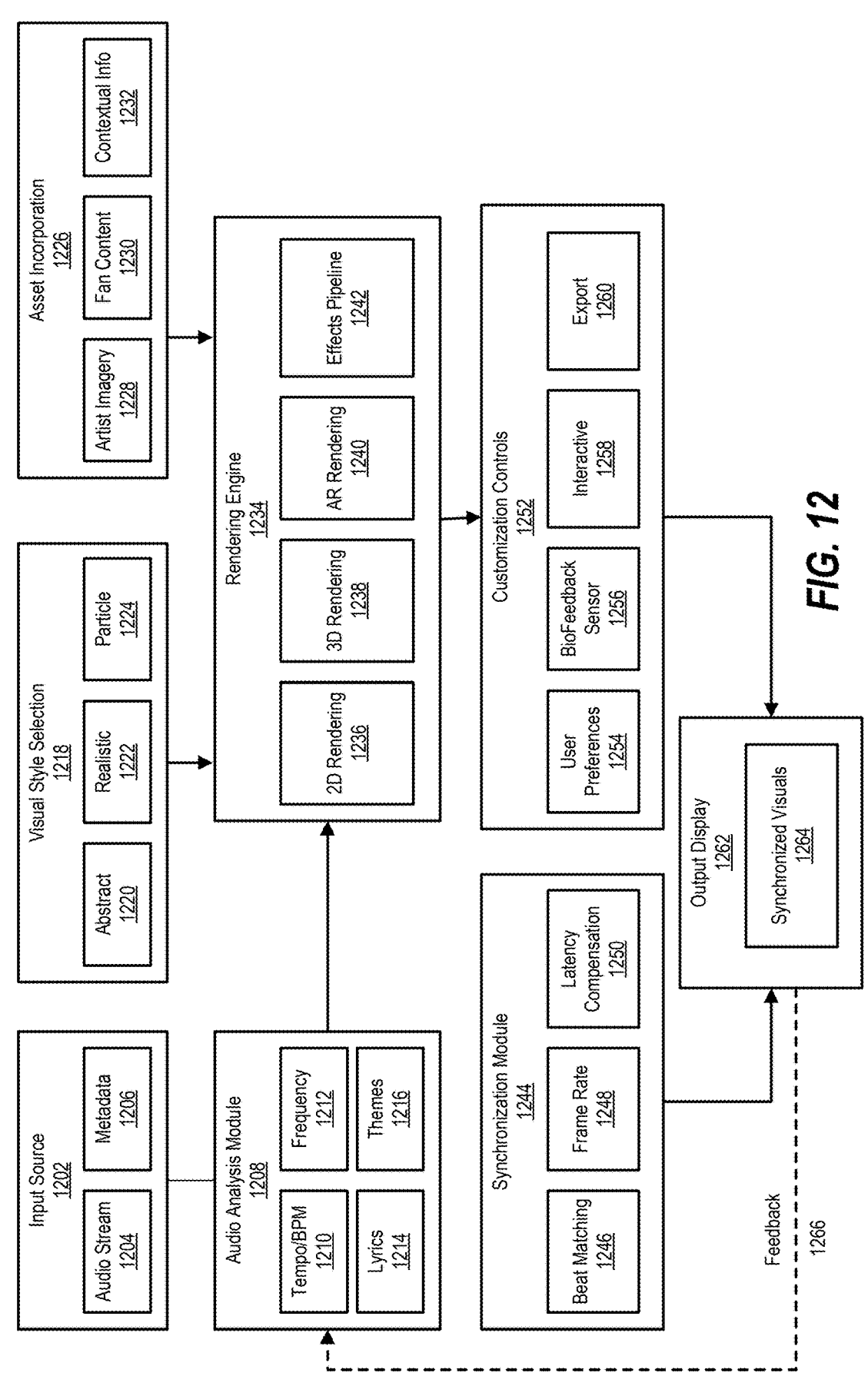
FIG. 12 illustrates a visualizer generation process for creating real-time visual content synchronized with audio, according to aspects of the present disclosure.

Referring to FIG. 12, an architectural diagram may illustrate the real-time visual generation system for creating synchronized visualizations, showing the spatial organization of major functional components including the input source module 1202 at the top-left providing foundational data, the audio analysis module 1208 on the left performing feature extraction, the visual style selection module 1218 and asset incorporation module 1226 spanning the top-center and top-right for determining visual aesthetics and integrating content, the rendering engine 1234 in the center containing multiple rendering modalities, the synchronization module 1244 and customization controls 1252 in the lower portion managing temporal alignment and personalization, and the output display 1262 at the bottom presenting final synchronized visuals, with directional arrows indicating information flow from input sources through processing stages to final output, and a dashed feedback loop 1266 returning performance data to the audio analysis module for continuous optimization. The architectural organization of FIG. 12 employs an arrangements of parallel processing components at multiple levels, including parallel input sources (audio stream and metadata), parallel audio analysis operations (tempo, frequency, lyrics, themes), parallel rendering modalities (2D, 3D, AR, effects), and parallel customization options (preferences, biofeedback, interactive, export), illustrating the system's ability to process multiple data streams and rendering approaches simultaneously to create synchronized visual experiences. In some aspects, an input source module 1202, illustrated as containing two parallel input components (audio stream 1204 providing digital audio data and metadata 1206 supplying contextual information), may provide the foundational data streams required for generating real-time visual content synchronized with audio media. The input source module 1202 may receive and preprocess multiple types of data simultaneously to enable analysis and contextually relevant visual generation that responds to both audio characteristics and associated metadata.

An audio stream 1204 within the input source module 1202 may receive digital audio data in real-time from the media playback system. The audio stream 1204 may provide continuous waveform data represented as amplitude variations over time, enabling downstream processing components to extract musical features and synchronization markers. The audio stream 1204 may maintain a buffer of audio samples to support look-ahead analysis for predictive visual transitions, ensuring that visual elements can anticipate upcoming musical changes and create smooth transitions between different visualization states.

A metadata 1206 within the input source module 1202 may supply contextual information about the current media item including artist identification, album artwork, genre classifications, and release information. The metadata 1206 may inform visual style decisions and may provide source material for asset incorporation, ensuring generated visualizations maintain thematic consistency with the artist's brand identity and the specific media content being played. The metadata 1206 may include structured information such as song duration, release date, and production credits that may influence visualization parameters and content selection.

As further shown in FIG. 12, an audio analysis module 1208, illustrated as containing four parallel analysis components (tempo/BPM detector 1210 for rhythm detection, frequency analyzer 1212 for spectral analysis, lyrics analyzer 1214 for lyrical content processing, and themes extractor 1216 for conceptual identification), may perform signal processing and feature extraction on the incoming audio stream 1204. The audio analysis module 1208 may employ multiple parallel analysis techniques to extract both low-level signal characteristics and high-level semantic features that drive visualization parameters, enabling the visual engine 143 to create responsive visual experiences that reflect the musical content being consumed. The audio analysis module 1208 shown in FIG. 12 may be implemented as part of the visual engine 143 described in FIG. 1, working in conjunction with the visual models 524 from the model library 518 shown in FIG. 5 to provide the audio feature extraction and analysis capabilities necessary for synchronized visual generation.

A tempo detector 1210 (labeled as 'Tempo/BPM' in FIG. 12) within the audio analysis module 1208 may analyze the audio stream 1204 to identify beat patterns and calculate the beats per minute of the current track. The tempo detector 1210 may employ onset detection algorithms and autocorrelation techniques to identify rhythmic patterns, typically detecting tempos within a range suitable for popular music genres. The detected tempo may serve as a primary synchronization reference for animation timing and transition effects, ensuring that visual elements move and change in harmony with the underlying musical rhythm.

A frequency analyzer 1212 within the audio analysis module 1208 may perform Fast Fourier Transform operations on windowed segments of the audio stream 1204 to extract frequency domain characteristics. The frequency analyzer 1212 may decompose the audio signal into constituent frequency bands, enabling visualization elements to respond differentially to bass, midrange, and treble components. The frequency analysis may provide real-time spectral data that drives particle movements, color variations, and geometric transformations in the rendered output, creating visual representations that reflect the harmonic content of the music.

A lyrics analyzer 1214 within the audio analysis module 1208 may process lyrical content when available to determine emotional valence and thematic elements. The lyrics analyzer 1214 may employ natural language processing techniques from the NLP models 526 to classify lyrical segments as positive, negative, or neutral sentiment, influencing color palette selections and visual intensity parameters. The sentiment analysis may enable mood-appropriate visual responses that enhance the emotional impact of the music through synchronized visual presentation.

A theme extractor 1216 within the audio analysis module 1208 may identify conceptual and narrative themes present in the audio content through analysis of both lyrical and musical elements. The theme extractor 1216 may recognize common thematic patterns such as love, loss, celebration, or introspection, which may inform the selection of visual motifs and symbolic elements incorporated into the visualization. The extracted themes may ensure visual coherence with the artistic intent of the original work while providing contextual guidance for visual style and content selection.

With continued reference to FIG. 12, a visual style selector 1218, shown as containing three distinct rendering options (abstract renderer 1220 for non-representational visuals, realistic renderer 1222 for photorealistic elements, and particle renderer 1224 for particle-based simulations), may determine the aesthetic approach for the generated visualization based on analysis results from the audio analysis module 1208, user preferences, and artist guidelines. The visual style selector 1218 may provide multiple rendering paradigms that can be selected automatically based on musical characteristics or manually specified by subscribers through customization interfaces.

An abstract renderer 1220 within the visual style selector 1218 may generate non-representational visual elements using geometric primitives, mathematical functions, and procedural patterns. The abstract renderer 1220 may create visualizations emphasizing form, color, and movement without literal representation, suitable for instrumental music or content where artistic interpretation is prioritized over narrative visualization. The abstract renderer 1220 may employ algorithmic generation techniques that create complex visual patterns from simple mathematical relationships, enabling infinite variation while maintaining aesthetic coherence.

A realistic renderer 1222 within the visual style selector 1218 may produce visualizations incorporating photorealistic elements, natural phenomena simulations, and representational imagery. The realistic renderer 1222 may utilize physics-based rendering techniques and environmental modeling to create immersive visual experiences that complement narrative musical content or artist-specific visual themes. The realistic renderer 1222 may simulate natural environments, lighting conditions, and material properties to create believable visual worlds that enhance the musical experience through environmental storytelling.

A particle renderer 1224 within the visual style selector 1218 may implement massive parallel particle simulations responsive to audio characteristics. The particle renderer 1224 may manage thousands of individual visual elements whose positions, velocities, and appearances are modulated by frequency analysis results from the frequency analyzer 1212, beat detection from the tempo detector 1210, and amplitude envelopes from the audio stream 1204. Particle systems may provide fluid, organic visualizations particularly effective for electronic and rhythmic music genres, creating dynamic visual displays that respond to musical energy and complexity.

An asset incorporator 1226, illustrated in FIG. 12 as containing three asset type components (artist imagery 1228 for official visual materials, fan content 1230 for user-generated contributions, and contextual info 1232 for informational overlays), may integrate external visual resources into the generated visualization, ensuring brand consistency and personalized relevance. The asset incorporator 1226 may manage the selection, processing, and compositing of various asset types while maintaining visual coherence and respecting intellectual property constraints established through the permission policy engine 120.

Artist imagery 1228 within the asset incorporator 1226 may incorporate official artist photographs, album artwork, logos, and approved visual materials into the visualization. The artist imagery 1228 may apply appropriate transformations, filters, and blending operations to integrate artist assets seamlessly with procedurally generated elements while maintaining brand guideline compliance as defined in the brand guidelines integration 256. The artist imagery 1228 may ensure that visualizations maintain connection to the specific artist and media item being consumed.

Fan content 1230 within the asset incorporator 1226 may selectively include user-generated visual materials that have been approved through the content moderation system implemented by the social engine 142. The fan content 1230 may enable community participation in visualization creation while ensuring quality standards and appropriateness through automated and manual review processes. Fan-contributed assets may undergo normalization and style matching to maintain visual consistency with the overall visualization aesthetic.

Contextual information 1232 within the asset incorporator 1226 may overlay relevant textual and graphical information such as song titles, artist names, tour dates, or synchronized lyrics. The contextual information 1232 may manage the timing, positioning, and styling of informational overlays to enhance viewer understanding without disrupting the visual experience. Contextual elements may appear and disappear in synchronization with musical transitions and structural boundaries, providing informative content that enhances the educational and engagement value of the visualization.

As shown by the directional arrows in FIG. 12, the rendering engine 1234 may receive inputs from both the visual style selector 1218 (determining the aesthetic rendering approach) and the asset incorporator 1226 (providing external visual resources to be integrated), combining style parameters and asset data with audio analysis results to serve as a computational platform for generating final visual output. In some aspects, a rendering engine 1234, illustrated as containing four rendering modality components (2D renderer 1236 for two-dimensional graphics, 3D renderer 1238 for three-dimensional spatial visualization, AR renderer 1240 for augmented reality overlays, and effects pipeline 1242 for post-processing enhancements), may serve as a computational platform for generating final visual output from processed audio features, selected styles, and incorporated assets. The rendering engine 1234 may support multiple rendering modalities to accommodate diverse display devices and subscriber preferences while maintaining consistent visual quality and synchronization accuracy.

A 2D renderer 1236 within the rendering engine 1234 may generate two-dimensional visualizations using canvas-based drawing operations and graphics processing techniques. The 2D renderer 1236 may optimize for web browser compatibility and mobile device performance, employing hardware acceleration where available. Canvas rendering may provide broad compatibility while enabling advanced visual effects and high-performance graphics operations for capable devices. The 2D renderer 1236 may create the AI-generated non-interactive visual experience in a 2D format that is configured to accompany music being played by the subscriber.

A 3D renderer 1238 within the rendering engine 1234 may create three-dimensional visualizations using advanced graphics libraries and spatial rendering techniques. The 3D renderer 1238 may implement perspective projection, lighting calculations, texture mapping, and complex geometric transformations to produce immersive spatial visualizations. The 3D renderer 1238 may render and manipulate three-dimensional objects in response to musical dynamics, creating depth and spatial relationships that enhance the visual experience. The 3D renderer 1238 may generate the AI-generated non-interactive visual experience in a 3D format that provides enhanced spatial presentation synchronized with audio playback.

An AR renderer 1240 within the rendering engine 1234 may generate visualizations designed for overlay onto real-world camera feeds. The AR renderer 1240 may perform camera tracking, environmental mapping, and occlusion handling to integrate virtual visual elements naturally with physical surroundings. The camera overlay capability may enable location-aware and context-sensitive visualizations that extend beyond traditional screen-based displays. The AR renderer 1240 may create the AI-generated non-interactive visual experience in an augmented reality format that combines virtual visual elements with real-world environments captured through device cameras.

An effects pipeline 1242, shown in FIG. 12 as the fourth component within the rendering engine 1234 alongside the 2D, 3D, and AR renderers, may apply post-processing operations and visual enhancements to the rendered output from any of the primary rendering modalities. In some aspects, the effects pipeline 1242 within the rendering engine 1234 may apply post-processing operations and visual enhancements to the rendered output. The effects pipeline 1242 may implement custom processing programs for visual effects including blur, glow, color correction, and artistic filters. Post-processing effects may add polish and visual interest while transition systems ensure smooth morphing between visualization states. Filter chains may be dynamically reconfigured based on performance constraints and subscriber preferences, enabling adaptive quality management across different device capabilities.

A synchronization module 1244, shown in FIG. 12 as containing three temporal coordination components (beat matcher 1246 for aligning visuals with musical beats, frame controller 1248 for managing rendering frequency, and latency compensator 1250 for accounting for processing delays), may ensure precise temporal alignment between audio playback and visual rendering. The synchronization module 1244 may compensate for system latencies, maintain consistent frame rates, and synchronize visual events with musical features to create a cohesive audiovisual experience that responds accurately to the audio characteristics of the media being consumed.

A beat matcher 1246 within the synchronization module 1244 may align visual transitions and animation keyframes with detected beat positions in the audio stream 1204. The beat matcher 1246 may implement phase-locked loop algorithms to maintain synchronization even with tempo variations or complex rhythmic patterns. Beat-matched animations may create a tight coupling between visual and auditory perception, enhancing the overall impact of the visualization by ensuring that visual changes occur in precise synchronization with musical beats and rhythmic elements.

A frame controller 1248 (labeled as 'Frame Rate' in FIG. 12) within the synchronization module 1244 may manage rendering frequency to maintain smooth visual playback while optimizing system resource utilization. The frame controller 1248 may dynamically adjust quality settings and effect complexity to maintain target frame rates, typically sixty frames per second for smooth motion perception. Adaptive frame rate control may ensure consistent performance across diverse hardware configurations while maintaining visual quality appropriate to the subscriber's device capabilities.

A latency compensator 1250 within the synchronization module 1244 may account for processing delays between audio analysis and visual rendering to maintain perceptual synchronization. The latency compensator 1250 may measure system latencies and may apply predictive algorithms to anticipate upcoming audio events, enabling visual elements to respond simultaneously with auditory perception despite computational delays inherent in real-time processing systems. The outputs from the beat matcher 1246, frame controller 1248, and latency compensator 1250 within the synchronization module 1244 may be provided to the output display 1262 as shown by the directional arrow in FIG. 12, ensuring that the synchronized visuals 1264 maintain precise temporal alignment with the audio playback throughout the presentation to subscribers.

With continued reference to FIG. 12, a customization controls module 1252, illustrated as containing four personalization components (user preferences 1254 for configurable parameters, biofeedback sensor 1256 for physiological inputs, interactive controller 1258 for direct manipulation, and export module 1260 for social sharing), may provide subscriber-configurable parameters and interactive features that personalize the visualization experience. The customization controls 1252 may enable both manual adjustments and automated adaptations based on subscriber behavior and environmental inputs, creating personalized visual experiences that adapt to individual preferences and physiological responses.

User preferences 1254 within the customization controls 1252 may maintain configurable visualization parameters including color schemes, animation speeds, visual complexity levels, and style preferences. The user preferences 1254 may store subscriber-specific settings that persist across sessions, enabling personalized visual experiences tailored to individual aesthetic preferences and device capabilities. The user preferences 1254 may allow subscribers to customize the visual experience according to their personal taste while maintaining synchronization with the underlying audio content.

A biofeedback sensor 1256 within the customization controls 1252 may incorporate physiological sensors to modulate visualization parameters based on subscriber state. The biofeedback sensor 1256 may process inputs from heart rate monitors, motion sensors, or other biometric devices to create visualizations that respond to subscriber physical and emotional states. Heart rate variations may influence color warmth and animation intensity, while motion data may control camera perspectives and particle behaviors. The biofeedback sensor 1256 may enable the method of generating interactive visualizations that respond to biofeedback, creating personalized visual experiences that adapt to the subscriber's physiological responses to the music. The visual engine 143 may incorporate the biofeedback sensor 1256 such as heart rate monitors to modulate visualization parameters based on subscriber physiological state, enabling responsive visual experiences that reflect both musical characteristics and subscriber biological responses.

An interactive controller 1258 within the customization controls 1252 may enable direct subscriber manipulation of visualization elements through touch, gesture, or controller inputs. The interactive controller 1258 may map subscriber interactions to visualization parameters, allowing real-time modification of visual elements during playback. Interactive controls may enhance engagement by transforming passive viewing into participatory experiences where subscribers can influence the visual presentation through direct interaction. The interactive controller 1258 may enable the method of generating interactive visualizations that respond to listener movements, creating dynamic visual experiences that change based on subscriber physical interaction with their devices.

An export module 1260 may facilitate sharing of generated visualizations through social media platforms and messaging applications. The export module 1260 may capture video recordings or may generate shareable links to visualization sessions, enabling subscribers to distribute personalized visual experiences. Social sharing capabilities may include format optimization for various platforms and automatic metadata tagging that maintains attribution to the original media item and artist. As shown within the customization controls 1252 in FIG. 12, the export module 1260 may receive data from the output display 1262 (through the customization controls pathway) to capture and share generated visualizations, enabling subscribers to preserve and distribute their personalized visual experiences beyond the live playback context.

As shown by the convergent arrows in FIG. 12, an output display 1262 may receive inputs from both the synchronization module 1244 providing temporal alignment data and the customization controls 1252 providing personalization parameters, and may manage the final presentation of generated visualizations to subscribers across various display devices and contexts. An output display 1262, shown in FIG. 12 as containing synchronized visuals 1264 that present the final rendered visualization, may manage the final presentation of generated visualizations to subscribers across various display devices and contexts. The output display 1262 may handle display adaptation, performance monitoring, and quality optimization to ensure optimal viewing experiences across different device types and usage scenarios.

Synchronized visuals 1264 within the output display 1262 may present the final rendered visualization in precise temporal alignment with audio playback. The synchronized visuals 1264 may display real-time animations that move and transform in response to musical dynamics detected by the audio analysis module 1208. The real-time animation may maintain consistent synchronization accuracy between visual events and corresponding audio features, creating cohesive audiovisual experiences that enhance music consumption through multi-sensory engagement. The synchronized visuals 1264 may implement the method of generating interactive visualizations that respond to audio characteristics, lyrical content, and thematic elements of the media item, creating visual experiences that reflect multiple dimensions of the musical content.

As illustrated by the dashed feedback arrow in FIG. 12, a feedback loop 1266 may return performance data and subscriber interaction metrics from the output display 1262 back to the audio analysis module 1208 and other earlier processing stages for continuous optimization. The feedback loop 1266 may enable adaptive algorithms to refine analysis parameters, adjust rendering complexity, and improve synchronization accuracy based on observed system performance and subscriber engagement patterns. The feedback loop 1266 may incorporate machine learning techniques that analyze subscriber preferences and interaction patterns to optimize visualization generation for individual subscribers and improve overall system performance.

The method may further comprise generating, by the artificial-intelligence models, interactive visualizations that respond to at least one of audio characteristics, lyrical content, listener movements, biofeedback, or thematic elements of the media item. The interactive visualizations may be generated through the rendering engine 1234, which may process audio characteristics extracted by the audio analysis module 1208, lyrical content analyzed by the lyrics analyzer 1214, listener movements detected by the interactive controller 1258, biofeedback monitored by the biofeedback sensor 1256, and thematic elements identified by the theme extractor 1216. The artificial-intelligence models may include the visual models 524 that process these multiple input streams to create responsive visual experiences that adapt to both musical content and subscriber behavior.

The supplemental content may comprise an AI-generated non-interactive visual experience in at least one of a 2D format, a 3D format, or an augmented reality format, with the visual experience configured to accompany music being played by the subscriber. The AI-generated non-interactive visual experience may be created through the rendering engine 1234, which may employ the 2D renderer 1236 for two-dimensional presentations, the 3D renderer 1238 for three-dimensional spatial visualizations, and the AR renderer 1240 for augmented reality overlays. The visual experience may be configured to accompany music through the synchronization module 1244, which may ensure precise temporal alignment between visual presentation and audio playback.

The supplemental content may comprise an AI-generated game thematically related to at least one of an artist, a song, an album, a playlist, or a theme. The AI-generated game may be implemented through the rendering engine 1234 in combination with the interactive controller 1258, creating interactive experiences that allow subscribers to participate in game-like activities synchronized with or inspired by the musical content. The thematic relationship to artists, songs, albums, playlists, or themes may be established through the theme extractor 1216 and the contextual information 1232, which may identify relevant thematic elements and incorporate them into interactive game mechanics that enhance subscriber engagement with the musical content.

The real-time visual generation system illustrated in FIG. 12 may provide a visualization pipeline that: receives and analyzes audio streams with metadata (modules 1202, 1208); extracts multiple audio features including tempo, frequency, lyrics, and themes (components 1210-1216); selects appropriate visual styles from multiple renderings (module 1218 with renderers 1220-1224); incorporates artist imagery, fan content, and contextual information while maintaining brand compliance (module 1226); generates visual output in multiple formats including 2D, 3D, and augmented reality presentations (rendering engine 1234); ensures precise synchronization between visual and audio through beat matching, frame rate control, and latency compensation (module 1244); enables personalization through user preferences, biofeedback sensors, and interactive controls (module 1252); and continuously optimizes performance through feedback loops (1266), thereby providing a complete implementation of an interactive and non-interactive visual experience, which may respond to at least one of audio characteristics, lyrical content, listener movements, biofeedback, or thematic elements of media items.

In some aspects, The subscription system may implement a preference-aware model selection framework that personalizes content generation by selecting artificial-intelligence models based on each subscriber's historical engagement patterns and demonstrated preferences. When the subscription system receives a content generation request from a subscriber, the AI orchestration layer 130 may retrieve subscriber-specific preference data from the user profile 1142 maintained by the context understanding module 1138, which may indicate content characteristics that the subscriber has previously engaged with, including interaction patterns with previously generated content, engagement metrics indicating duration and frequency of content consumption, explicit feedback provided by the subscriber, and demonstrated knowledge level determined through analysis of subscriber behavior. The AI orchestration layer 130 may select one or more artificial-intelligence models from the model library 518 by evaluating the decision tree logic 508 that maps content generation requests to available artificial-intelligence models, filtering available artificial-intelligence models based on the subscriber-specific preference data, and choosing specific artificial-intelligence models that historically generated content characteristics matching the subscriber-specific preference data. When the content comprises visual content, the visual style selector 1218 may identify a preferred visual rendering style from the subscriber-specific preference data, determine whether the preferred visual rendering style corresponds to the abstract renderer 1220, the realistic renderer 1222, or the particle renderer 1224, and select the artificial-intelligence model corresponding to the determined renderer for processing by the rendering engine 1234. The subscription system may track subscriber engagement with the generated content through the feedback loop 1266, update the subscriber-specific preference data based on the tracked engagement by analyzing dwell time spent consuming the generated content, interaction frequency with specific content features, sharing behavior indicating preference for particular content styles, and explicit ratings or feedback provided by the subscriber, and use the updated subscriber-specific preference data for subsequent artificial-intelligence model selections for the subscriber. The subscriber-specific preference data may indicate preferred explanation complexity levels for content recommendations generated by the discovery engine 141, preferred visual style characteristics for generated visualizations created by the visual engine 143, preferred audio modification parameters for remix operations performed by the remix engine 145, and preferred social interaction patterns for community features managed by the social engine 142. The user profile 1142 may maintain configurable visualization parameters including color schemes, animation speeds, and visual complexity levels as described in the customization controls 1252, which may be incorporated into the subscriber-specific preference data to prioritize artificial-intelligence models that generate content characteristics matching the configurable visualization parameters. When selecting the one or more artificial-intelligence models, the AI orchestration layer 130 may first determine the subscription tier of the subscriber through the subscription management module 110, filter available artificial-intelligence models based on the subscription tier to identify tier-appropriate models as defined in the tier-based permission matrix 210, further filter the tier-appropriate models based on the subscriber-specific preference data, and select from the filtered tier-appropriate models based on computational resource availability managed by the resource allocation module 540. The subscription system may analyze aggregate engagement patterns across multiple subscribers stored in the user data store 1316, identify correlations between subscriber characteristics and preferences for specific artificial-intelligence models through machine learning analysis, predict preferred artificial-intelligence model characteristics for the subscriber based on the identified correlations, and weight the artificial-intelligence model selection toward artificial-intelligence models matching the predicted preferred characteristics, thereby creating a continuously improving personalization system that adapts to individual subscriber preferences while respecting tier-based access controls and resource constraints.

In some aspects, the subscription system may implement a contextual feature availability framework that dynamically enables or restricts AI-powered features based on real-time contextual factors including geographic location, temporal conditions, device capabilities, and network conditions. When the subscription system receives a feature access request from a subscriber for an artificial-intelligence powered feature, the AI orchestration layer 130 may determine one or more contextual parameters associated with the feature access request through a contextual evaluation module, where the contextual parameters comprise at least one of geographic location of a client device from the devices 160, current temporal conditions maintained by the temporal context 1144, device capability characteristics of the mobile devices 161, desktop computers 163, AR/VR headsets 1338, or smart speakers 1342, or network condition metrics monitored by the network components 1328. The permission policy engine 120 may evaluate, based on the one or more contextual parameters, whether the requested artificial-intelligence powered feature is contextually available to the subscriber, and selectively enable or restrict access to the requested artificial-intelligence powered feature based on the evaluation. When determining the one or more contextual parameters, the network interface 1326 may identify a geographic location of the client device through at least one of IP address geolocation, GPS coordinates, or network infrastructure identification, retrieve jurisdiction-specific regulations from the permission policies repository 154 applicable to the identified geographic location, and determine whether the requested artificial-intelligence powered feature is permitted in the identified geographic location based on the jurisdiction-specific regulations, which may comprise copyright licensing restrictions that prohibit content modification in specific territories, content generation prohibitions based on regional laws, data privacy regulations that restrict certain data processing operations, or export control restrictions on artificial-intelligence technologies. The temporal context 1144 within the context understanding module 1138 may identify a current time and date, compare the current time and date against a schedule of time-based feature availability windows stored in the structured data 1128, and determine that the requested artificial-intelligence powered feature is temporally available only during specific time windows associated with at least one of live concert events, album release windows, artist appearance schedules, or promotional campaign periods, and when a time-based feature availability window has commenced, the subscription management module 110 may automatically enable the requested artificial-intelligence powered feature for subscribers associated with the time-based event and automatically disable the requested artificial-intelligence powered feature when the time-based feature availability window concludes. The output display 1262 may analyze device capability characteristics of the client device, including processing power specifications, available memory, graphics processing capabilities, display resolution, sensor availability, or operating system version, compare the device capability characteristics against minimum requirements for the requested artificial-intelligence powered feature, and determine whether the client device possesses sufficient capabilities to deliver the requested artificial-intelligence powered feature at acceptable quality levels, where when the client device meets minimum requirements the rendering engine 1234 may enable full-quality delivery of the requested artificial-intelligence powered feature, when the client device partially meets requirements the rendering engine 1234 may enable degraded-quality delivery with reduced computational complexity, lower resolution output, or simplified feature functionality, and when the client device fails to meet minimum requirements the subscription system may restrict access and provide notification of required hardware upgrades. The network components 1328 may measure network condition metrics comprising available bandwidth, connection latency, packet loss rates, connection stability, or data transfer costs across the network 155, compare the network condition metrics against bandwidth requirements for the requested artificial-intelligence powered feature, and determine an appropriate quality level for feature delivery based on the comparison, continuously monitoring the network condition metrics during feature delivery, detecting degradation in network conditions below acceptable thresholds, automatically adjusting feature quality through the effects pipeline 1242 by reducing at least one of visual resolution, frame rate, audio bitrate, or computational complexity, and automatically restoring full-quality feature delivery when network conditions improve. When access to the requested artificial-intelligence powered feature is restricted based on contextual parameters, the user input interface 1102 may generate an explanation message identifying which contextual constraint caused the restriction, provide, when available, an estimated time or condition change that would enable feature access through information from the temporal context 1144, and automatically notify the subscriber when contextual conditions change to enable previously restricted features. The subscription system may maintain a feature availability matrix in the permission policies repository 154 that maps combinations of contextual parameters to permitted artificial-intelligence powered features, update the feature availability matrix based on at least one of regulatory changes, licensing agreement modifications, event scheduling updates, or performance optimization data, and synchronize the feature availability matrix across the distributed edge servers 1340 to ensure consistent feature restriction enforcement globally, thereby providing context-aware feature management that ensures regulatory compliance, optimizes user experience across diverse hardware platforms, and adapts feature delivery to match prevailing technical constraints while maintaining transparent communication with subscribers about feature availability.

Figure 13:
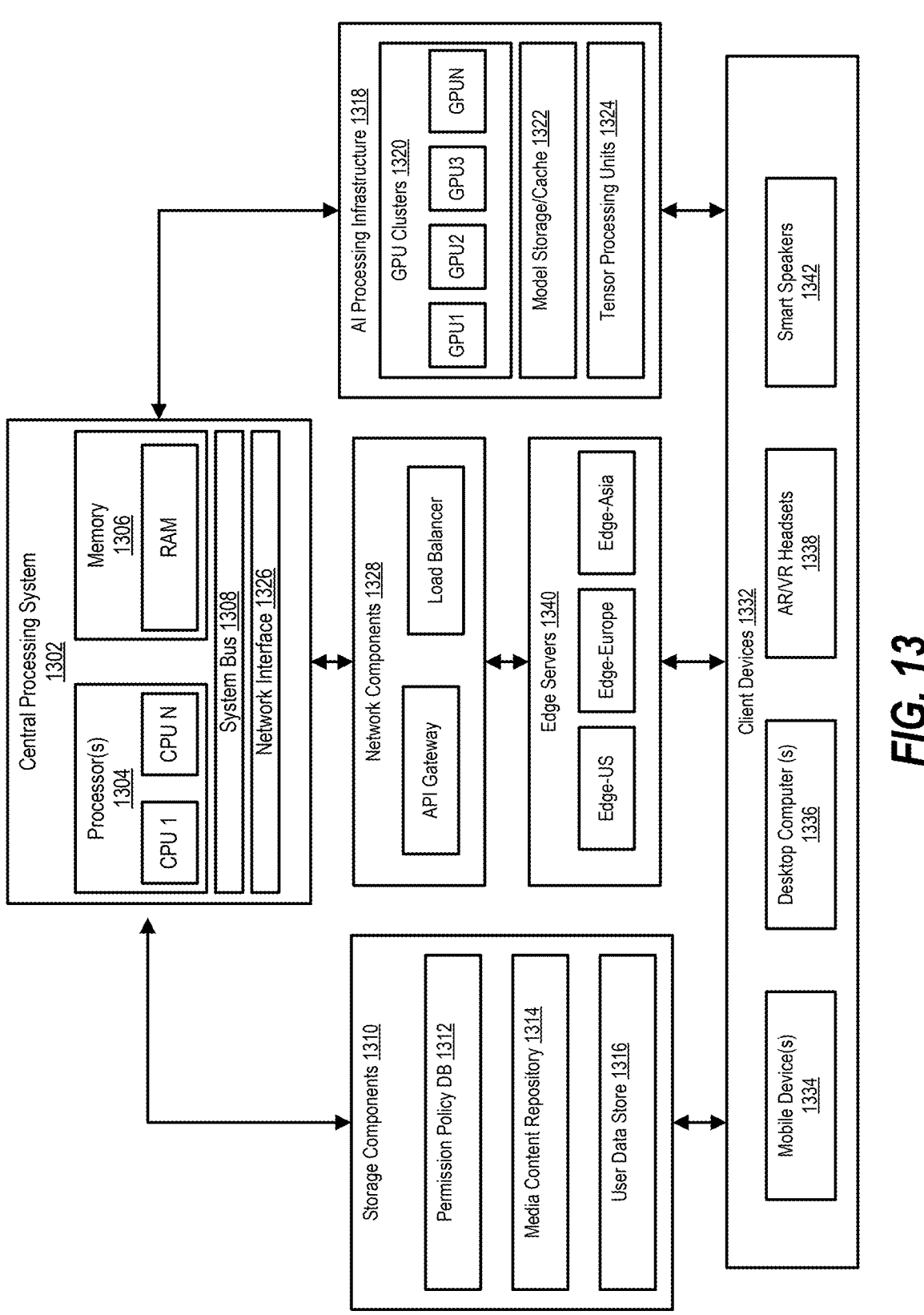
FIG. 13 illustrates a system hardware architecture for implementing the AI-augmented premium music subscription system, according to aspects of the present disclosure.

Referring to FIG. 13, a system architecture diagram may illustrate the distributed infrastructure for the AI-augmented premium music subscription tier system, showing the spatial organization of major functional components including the central processing system 1302 at the top containing processors and memory, the storage components 1310 on the left providing persistent data storage, the network components 1328 in the center managing communications, the AI processing infrastructure 1318 on the right providing specialized computational resources, the edge servers 1340 in the middle tier for distributed content delivery, and the client devices 1332 at the bottom representing various client device types, with bidirectional arrows indicating communication paths between the central system and distributed components. In some aspects, a central processing system 1302, illustrated as containing four primary infrastructure components (processor(s) 1304 with multiple CPU cores shown as CPU 1 and CPU N, memory 1306 containing RAM, system bus 1308 providing interconnection, and network interface 1326 managing external communications), may provide a computational infrastructure for implementing the AI-augmented premium music subscription tier system. The central processing system 1302 may serve as the primary execution environment for the subscription tier management logic, permission policy enforcement, and orchestration of distributed system components that enable the various AI-powered features described herein.

Processors 1304 within the central processing system 1302 may execute stored program instructions to implement the methods and processes described in the subscription system 100. The processors 1304 may comprise multiple central processing units that enable parallel processing and scalable performance across different subscription tiers. Each processor core may include multiple execution units, cache levels, and instruction pipelines that enable high-performance computation for simultaneous processing of user requests from subscribers in the basic tier 212, the premium tier 214, and the super fan tier 216. The processors 1304 may comprise one or more multi-core processors configured for server-grade reliability and performance, supporting concurrent execution of multiple threads while maintaining isolation and resource allocation policies that prioritize higher-tier subscribers. As illustrated in FIG. 13 by the labels 'CPU 1' and 'CPU N' within the processor(s) box 1304, the central processing system 1302 may comprise multiple processor units arranged in a scalable configuration where N represents the total number of processors, enabling flexible scaling from smaller deployments with fewer processors to large-scale implementations with many processors based on system demand and subscription tier service requirements.

The use of 'N' notation in multiple components throughout FIG. 13 (including 'CPU N' in processors 1304 and 'GPUN' in GPU clusters 1320) indicates the scalable nature of the system architecture, where 'N' represents a variable number of processing units that can be adjusted based on system load, subscription tier demands, and deployment scale, enabling the infrastructure to grow from initial deployments to large-scale production systems serving millions of subscribers across all subscription tiers.

A memory 1306 may store instructions that, when executed by the processors 1304, cause the central processing system 1302 to perform the methods described herein. The memory 1306 may maintain executable program code including the permission policy engine 120, AI orchestration layer 130 logic, content modification algorithms, and tier-based routing instructions. The memory 1306 may also store runtime data structures including active user sessions, cached permission policies, temporary content buffers, and AI model parameters during execution. The memory 1306 may provide high-bandwidth information exchange with the processors 1304 through separate data and control signal paths that enable real-time content processing and AI inference operations. As indicated by the 'RAM' label in FIG. 13, the memory 1306 may comprise random access memory providing high-speed volatile storage for active program instructions and runtime data, enabling rapid information exchange with the processors 1304 during real-time content processing and AI inference operations. The memory 1306 may store the executable implementations of the subscription management module 110, permission policy engine 120, AI orchestration layer 130, and all AI engines 140 described in FIG. 1, providing the runtime environment where these logical components execute to deliver the subscription system's functionality.

A system bus 1308 may provide the communication backbone connecting all components within the central processing system 1302. The system bus 1308 may implement multiple parallel channels for data, address, and control signals, enabling simultaneous communication between components while reducing bottlenecks and improving overall system throughput. The system bus 1308 may implement high-speed protocols that provide sufficient bandwidth for GPU communication, storage access, and network traffic required for the AI-powered features of the subscription system 100.

A network interface 1326 within the central processing system 1302 may manage all external communications with client devices, storage systems, and distributed processing infrastructure. The network interface 1326 may support multiple simultaneous connections and protocols, enabling the central processing system 1302 to communicate with diverse client devices and external services while maintaining quality of service guarantees for different subscription tiers. The network interface 1326 may implement tier-based traffic prioritization that ensures premium tier 180 and super fan tier 190 subscribers receive preferential network resource allocation compared to basic tier 170 subscribers. While the tier-based traffic prioritization and resource allocation mechanisms are implemented in software logic rather than being visually represented as separate components in FIG. 13, these capabilities are integral to the operation of the network interface 1326, the GPU clusters 1320, and other system components that differentiate service levels between basic tier 170, premium tier 180, and super fan tier 190 subscribers.

As shown by the arrangement in FIG. 13, the storage components 1310, network components 1328, and AI processing infrastructure 1318 operate as three independent but interconnected subsystems at the same architectural level, each providing specialized functionality that collectively enables the feature set of the subscription system 100. As further shown in FIG. 13, storage components 1310, illustrated as containing three specialized storage systems (permission policy database 1312 for access control data, media content repository 1314 for digital media assets, and user data store 1316 for subscriber information), may provide persistent data storage for all system information including user data, content libraries, and configuration parameters. The storage components 1310 may implement a distributed storage architecture with specialized databases optimized for different data types and access patterns required by the various AI engines 140 and content processing workflows.

A permission policy database 1312 may store the hierarchical permission structures that define allowed interactions for each subscription tier. The permission policy database 1312 may maintain structured data storage with indexed access for rapid permission lookups during request processing. The permission policy database 1312 may maintain records associating each subscriber with their subscription tier, store permission policies for each media item that define allowed subscriber interactions through the permission policy record 202, and cache frequently accessed policies in the memory 1306 for reduced latency. The database schema may support complex permission inheritance, override rules, and temporal restrictions that may apply to certain content or features based on artist preferences and commercial agreements.

A media content repository 1314 may store the digital media assets including audio files, video content, album artwork, and associated metadata that form the foundation for the AI-powered features. The media content repository 1314 may implement content-addressable storage for efficient deduplication, maintaining multiple quality levels for tier-based streaming while supporting rapid content retrieval through distributed caching layers. The content-addressable storage may enable parallel access to support multiple simultaneous users while maintaining consistent performance across subscription tiers. The distributed caching layers may store frequently accessed content closer to processing resources, reducing latency for AI operations performed by the discovery engine 141, the visual engine 143, and other AI engines 140.

A user data store 1316 may maintain subscriber profiles, preferences, interaction histories, and generated content created through the various AI-powered features. The user data store 1316 may implement a graph database structure suitable for storing complex user relationships and social connections managed by the social engine 142. The user data store 1316 may capture user engagement metrics for analytics and recommendation systems, store user-generated content including remixes and visualizations created through the remix engine 145 and the visual engine 143, and maintain privacy-compliant data retention and access controls. The user data store 1316 may implement horizontal scaling to accommodate growing user bases while maintaining query performance for real-time personalization and recommendation generation.

With continued reference to FIG. 13, an AI processing infrastructure 1318, illustrated as containing three specialized computational components (GPU clusters 1320 for parallel AI operations, model storage/cache 1322 for maintaining pre-trained models, and tensor processing units 1324 for specialized machine learning acceleration), may provide specialized computational resources optimized for artificial intelligence and machine learning workloads. The AI processing infrastructure 1318 may enable the subscription system 100 to execute complex AI models for content generation, modification, and analysis while maintaining the performance requirements of real-time user interactions across different subscription tiers.

The model storage 1322 may maintain subscriber-specific model configurations that adapt AI model parameters based on individual subscriber interaction history. The AI orchestration layer 130 may select models with cached subscriber-specific preferences or biases that influence content generation toward styles and characteristics the subscriber has previously engaged with positively. The feedback loop 1266 may continuously update these subscriber-specific model configurations based on engagement metrics, click-through rates, and explicit feedback, enabling the system to progressively personalize AI output for individual subscribers over time.

GPU clusters 1320 may comprise multiple graphics processing units configured for parallel execution of AI inference and training operations. The GPU clusters 1320 may accelerate neural network computations for natural language processing performed by the NLP models 526, image generation handled by the visual models 524, and audio analysis conducted by the audio models 522. Each GPU may provide thousands of cores optimized for matrix operations and tensor computations that are fundamental to modern AI algorithms. The GPU clusters 1320 may implement dynamic load balancing to distribute AI workloads based on subscription tier priorities, ensuring that premium tier 214 and super fan tier 216 subscribers receive preferential resource allocation for reduced latency and enhanced features compared to basic tier 212 subscribers. As illustrated in FIG. 13 by the labels 'GPU1,' 'GPU2,' 'GPU3,' through 'GPUN' within the GPU clusters box 1320, the AI processing infrastructure may comprise multiple individual graphics processing units arranged in a scalable cluster configuration where N represents the total number of GPUs, enabling the system to scale computational capacity based on AI workload demands across different subscription tiers.

A model storage 1322 may maintain pre-trained AI models and cache frequently used model parameters for rapid deployment across the various AI engines 140. The model storage 1322 may store different AI models including the discovery models 520, visual models 524, audio models 522, and other specialized models required for the AI-powered features. The model storage 1322 may implement a cache layer that reduces model loading times by maintaining recently used models in high-speed memory, enabling rapid switching between different AI capabilities based on user requests and the AI orchestration layer 130 routing decisions.

Tensor processing units 1324 may provide specialized acceleration for specific machine learning operations that require enhanced computational performance. The tensor processing units 1324 may offer enhanced performance for large-scale AI models that benefit from custom silicon optimization, including transformer-based models for natural language understanding used by the chatbot engine 147, recommendation algorithms for personalized discovery implemented by the discovery engine 141, and real-time processing of complex generative models used by the visual engine 143. The tensor processing units 1324 may enable more sophisticated AI capabilities for higher subscription tiers while maintaining cost-effective operation for the overall system.

Network components 1328, shown in FIG. 13 as containing two traffic management elements (API gateway for external request handling and load balancer for distributing traffic across system resources), may facilitate communication between system elements and manage external traffic from client devices accessing the subscription system 100. The network components 1328 may implement intelligent routing and load balancing that considers subscription tier priorities and geographic distribution of users to optimize performance and resource utilization.

As further shown in FIG. 13, the network components 1328 may connect to client devices 1332, which represent various client device types illustrated as four distinct categories (mobile device(s) 1334 for portable platforms, desktop computer(s) 1336 for traditional computing, AR/VR headsets 1338 for immersive experiences, and smart speakers 1342 for voice-first interfaces) through which subscribers access the AI-augmented premium music subscription services. The client devices 1332 may support heterogeneous device types with varying computational capabilities and interface modalities while maintaining consistent service quality across all supported platforms.

Mobile devices 1334 may represent portable computing platforms running various mobile operating systems that connect through cellular or WiFi networks. The mobile devices 1334 may have limited processing power compared to other device types, requiring efficient streaming protocols and optional quality adjustments based on network conditions and device capabilities. The subscription system 100 may adapt content delivery and feature availability based on mobile device capabilities while maintaining tier-based feature access through the permission policy engine 120.

Desktop computers 1336 may represent traditional computing platforms with substantial local processing power and stable network connections. The desktop computers 1336 may support enhanced features including high-resolution visualizations generated by the visual engine 143, complex interactive experiences, and local content caching for offline access. Desktop clients may leverage local GPU resources for certain AI operations, reducing server load while improving responsiveness for computationally intensive features available to premium tier 214 and super fan tier 216 subscribers.

AR/VR headsets 1338 may enable immersive three-dimensional experiences and spatial audio presentations that extend the capabilities of the visual engine 143 and other AI-powered features. The AR/VR headsets 1338 may require high-bandwidth, low-latency connections for real-time rendering of virtual environments synchronized with audio playback. The subscription system 100 may provide specialized rendering pipelines optimized for stereoscopic display and spatial tracking, enabling unique premium tier experiences that are not available on traditional displays and represent advanced features that differentiate higher subscription tiers.

Smart speakers 1342 may provide voice-first interfaces for audio playback and conversational interactions with the chatbot engine 147. The smart speakers 1342 may rely entirely on cloud processing for AI features, requiring the central processing system 1302 to handle all computational tasks server-side. The smart speakers 1342 may integrate with the artist chatbot system for voice-based queries and support simplified interaction patterns optimized for audio-only interfaces while maintaining access to tier-appropriate features based on subscriber status.

Edge servers 1340, illustrated in FIG. 13 as containing geographically distributed deployment locations (Edge-US for North American regions, Edge-Europe for European regions, and Edge-Asia for Asian regions), may provide geographically distributed content delivery infrastructure to minimize latency and improve user experience across different global regions. In some aspects, edge servers 1340 may provide geographically distributed content delivery infrastructure to minimize latency and improve user experience across different global regions. The edge servers 1340 may implement global points of presence that cache frequently accessed content closer to end users, reducing the distance that data must travel between the central processing system 1302 and subscriber devices. The edge servers 1340 may cache generated visualizations and modified content created by the visual engine 143 and the remix engine 145 for rapid delivery, implement tier-based cache priorities with premium content receiving preferential treatment, and provide localized compute capabilities for lightweight AI inference at the edge. The global distribution of the edge servers 1340 may ensure that subscribers in different geographic regions receive consistent performance while maintaining the tier-based service differentiation that defines the subscription model. The connection topology illustrated in FIG. 13 reflects functional relationships and data flow patterns, with storage components 1310 and AI processing infrastructure 1318 connecting to the central processing system 1302 to support low-latency access to frequently used data and computational resources, while client devices in client devices 1332 connect through network components 1328 and edge servers 1340 to provide geographic distribution, load balancing, and network optimization that enable global service delivery with tier-appropriate quality of service.

The distributed infrastructure illustrated in FIG. 13 may provide a computational foundation for implementing features described in the AI-augmented premium music subscription tier system, including: the permission policy enforcement and tier-based access control managed through the storage components 1310; the AI-powered content generation, modification, and analysis performed by the AI processing infrastructure 1318; the efficient content delivery and network communication handled by the network components 1328 and edge servers 1340; and the support for diverse client device types represented in client devices 1332. The architecture's scalability, specialization of computational resources, tier-based resource allocation capabilities, and geographic distribution enable the subscription system 100 to deliver differentiated service levels to basic tier 212, premium tier 214, and super fan tier 216 subscribers while maintaining consistent performance, security, and reliability across a global user base, thereby providing the technical infrastructure necessary to implement the complete set of AI-augmented features, interactive experiences, and subscription tier differentiation described throughout this patent application.

The interconnections between the central processing system 1302, the storage components 1310, the AI processing infrastructure 1318, and the network components 1328 may implement high-speed protocols that ensure minimal latency for real-time features while maintaining data consistency across distributed components. The distributed architecture may enable incremental capacity expansion as user demand grows, while the specialized AI processing infrastructure 1318 may ensure that advanced features can be delivered with the performance and quality expectations of premium tier subscribers. The system's support for diverse client device types through the client devices 1332 may ensure broad market reach while maintaining consistent service quality across all supported platforms and subscription tiers.

Note that FIG. 13 is just one example of a processing system consistent with aspects described herein, and other processing systems having additional, alternative, or fewer components are possible consistent with this disclosure.

The subscription system 100 may implement additional AI-powered features that extend beyond basic music consumption to create entertainment experiences for subscribers across different tiers. These additional features may leverage the AI orchestration layer 130 and the various AI engines 140 to generate diverse types of supplemental content that enhance subscriber engagement and provide differentiated value propositions for premium tier 214 and super fan tier 216 subscribers.

The supplemental content may comprise AI-generated playlists and song recommendations that extend beyond individual track suggestions to create curated listening experiences tailored to specific contexts, moods, or activities. The discovery engine 141 may generate playlists by analyzing subscriber listening patterns, temporal preferences, and contextual factors such as time of day, weather conditions, or calendar events. The AI-generated playlists may incorporate machine learning algorithms that understand musical flow, energy progression, and thematic coherence to create seamless listening experiences that maintain engagement over extended periods. The playlist generation may consider factors such as tempo transitions, key relationships, and genre compatibility to ensure smooth musical progression while introducing new content that aligns with subscriber preferences.

The supplemental content may comprise an AI-generated game thematically related to at least one of an artist, a song, an album, a playlist, or a theme. The AI-generated games may be created through collaboration between the visual engine 143 and the audio models 522, which may analyze musical characteristics to generate interactive gameplay mechanics that respond to audio features such as tempo, rhythm, and harmonic progression. The games may include rhythm-based challenges where subscribers must interact with visual elements in synchronization with musical beats, exploration-based experiences where subscribers navigate virtual environments themed around specific albums or artist aesthetics, and puzzle games that incorporate lyrical content or musical theory concepts as gameplay elements. The AI-generated games may adapt difficulty levels based on subscriber performance and musical knowledge, as determined through the user knowledge level determination module 416, ensuring that gameplay remains engaging for subscribers with varying levels of musical expertise.

The method may further comprise providing supplemental content that comprises a content challenge created by at least one of an artist or an artificial-intelligence model. The content challenges may be generated through the AI orchestration layer 130, which may coordinate multiple AI engines 140 to create structured creative activities that invite subscriber participation while maintaining alignment with artist branding and aesthetic guidelines. The content challenges may be created by artists who wish to engage their fan communities in specific creative activities, or may be generated automatically by artificial-intelligence models that analyze current trends, seasonal events, or milestone celebrations to propose relevant creative challenges.

The method may further comprise inviting subscribers to create and submit content meeting specified requirements established by the content challenge parameters. The invitation process may be managed through the subscription management module 110, which may identify eligible subscribers based on their subscription tier and engagement history. The specified requirements may include technical parameters such as content duration, format specifications, or quality standards, as well as creative guidelines that ensure submissions align with the challenge theme and artist aesthetic. The requirements may be communicated through the user input interface 1102 and may include examples, templates, or reference materials that help subscribers understand the creative objectives and technical constraints of the challenge.

The method may further comprise judging winning content by at least one of an artificial-intelligence model or human evaluators. The judging process may employ the moderation models 528 to evaluate submissions based on technical quality, creative merit, adherence to challenge requirements, and alignment with artist branding guidelines. The artificial-intelligence model evaluation may analyze factors such as visual composition, audio quality, thematic consistency, and brand compliance through automated assessment algorithms. Human evaluators may provide qualitative assessment of creative elements that require subjective judgment, such as artistic interpretation, emotional impact, or cultural relevance. The judging process may combine automated screening to ensure technical compliance with human evaluation of creative merit to identify winning submissions.

The method may further comprise making winning content available to other subscribers through the content repositories 150 and the social engine 142. The winning content may be featured in dedicated sections of the subscription system 100, integrated into the visual experience interface 618, or promoted through the social features to increase visibility and recognition for successful participants. The winning content may be made available across different subscription tiers, with premium tier 214 and super fan tier 216 subscribers potentially receiving early access or enhanced presentation of winning submissions.

The method may further comprise facilitating, by the artificial-intelligence models, creation of the submitted content by providing at least one of AI-assisted design tools for modifying artist branding elements or AI-assisted remixing tools for modifying artist audio content. The AI-assisted design tools may be implemented through the merchandise engine 146 and the visual engine 143, which may provide subscribers with intelligent design assistance that helps them create visual content while maintaining compliance with artist branding guidelines. The design tools may offer automated color palette suggestions based on the brand guidelines integration 256, intelligent logo placement that respects the logo usage rules 260, and style transfer capabilities that adapt subscriber creative input to match artist aesthetic preferences.

The AI-assisted remixing tools may be implemented through the remix engine 145 and the audio models 522, which may enable subscribers to modify artist audio content within the constraints established by the permission policy record 202. The remixing tools may provide guided workflows that help subscribers apply audio effects, adjust tempo and pitch parameters, and combine multiple audio elements while ensuring that all modifications remain within the artist-defined constraints 234. The AI assistance may include automatic constraint checking that prevents subscribers from exceeding permitted modification ranges, quality enhancement algorithms that optimize audio processing results, and creative suggestion systems that recommend modification parameters based on the subscriber's creative objectives and the characteristics of the source audio content.

The method may further comprise providing an AI-mediated interface through which subscribers contribute to artist-related world building content. The AI-mediated interface may be implemented through a combination of the chatbot engine 147, the visual engine 143, and the social engine 142, creating a collaborative environment where subscribers can contribute creative content that expands the narrative and aesthetic universe associated with specific artists or media items. The interface may provide structured input mechanisms that guide subscriber contributions while ensuring thematic consistency and quality standards.

The method may further comprise ensuring thematic consistency of contributed content through analysis performed by the theme extractor 1216 and validation processes implemented by the brand compliance filter 144. The thematic consistency may be maintained by analyzing subscriber contributions against established artistic themes, narrative elements, and aesthetic guidelines associated with the specific artist or media item. The AI-mediated interface may provide real-time feedback to subscribers about whether their contributions align with established themes, suggest modifications that would improve thematic consistency, and automatically adjust contributed content to better match the overall artistic vision while preserving the subscriber's creative intent.

The method may further comprise filtering out problematic content including at least one of explicit imagery or objectionable language through the content moderation capabilities implemented by the moderation models 528 and the toxicity detection 710. The filtering process may employ automated content analysis that identifies inappropriate visual elements, offensive language, or content that violates community guidelines or artist preferences. The filtering may operate in real-time as subscribers create content, providing immediate feedback about potential issues and suggesting alternative approaches that would meet content standards while maintaining creative expression.

The method may further comprise presenting the artist-related world building content as at least one of an interactive multimedia space, a game, or a collection of videos. The interactive multimedia space may be created through the rendering engine 1234, which may combine subscriber contributions into cohesive virtual environments that can be explored and experienced by other subscribers. The multimedia space may incorporate visual elements created by subscribers, audio content modified through the AI-assisted remixing tools, and narrative elements that create immersive storytelling experiences. The game presentation may transform subscriber contributions into interactive gameplay elements, where contributed content becomes part of game mechanics, visual assets, or narrative components that other subscribers can experience through gameplay. The collection of videos may organize subscriber contributions into curated presentations that showcase the collaborative world building efforts while maintaining narrative coherence and visual consistency.

The AI orchestration layer 130 may coordinate the various AI engines 140 to deliver these tier-differentiated experiences by intelligently routing subscriber requests to appropriate processing components based on subscription tier, content type, and system resource availability. The coordination process may involve the decision tree logic 508, which may evaluate subscriber requests and determine which combination of AI engines 140 should be activated to fulfill specific content generation or modification requests. The AI orchestration layer 130 may manage the sequential processing 538 and parallel processing 536 of complex requests that require multiple AI capabilities, such as content challenges that involve both visual design assistance and audio remixing tools.

The resource allocation module 540 may implement tier-based prioritization that ensures premium tier 214 and super fan tier 216 subscribers receive preferential access to computationally intensive AI features such as the AI-generated games, content challenges, and world building interfaces. The resource allocation may consider the computational requirements of different AI engines 140, the current system load across the GPU clusters 1320 and the tensor processing units 1324, and the subscription tier of requesting subscribers to optimize resource distribution and maintain service quality standards.

An output assembly module 542 may combine results from multiple AI engines 140 when complex requests require coordination between different AI capabilities. The output assembly module 542 may integrate visual content generated by the visual engine 143 with audio modifications produced by the remix engine 145, combine social features managed by the social engine 142 with personalized recommendations from the discovery engine 141, and coordinate chatbot interactions from the chatbot engine 147 with visual presentations and interactive elements. The output assembly module 542 may ensure that multi-component responses maintain consistency in branding, quality, and user experience while delivering functionality that leverages the full capabilities of the subscription system 100.

The permission policy engine 120 may enforce access controls and content modification constraints across all additional features, ensuring that AI-generated games, content challenges, and world building interfaces respect artist-defined boundaries and subscription tier limitations. The enforcement may involve real-time validation of subscriber actions, automatic constraint checking for content modifications, and brand compliance verification for all generated or modified content before delivery to subscribers.

The brand compliance filter 144 may validate all content generated through the additional features to ensure consistency with artist branding guidelines and quality standards. The validation process may apply to AI-generated game assets, content challenge submissions, world building contributions, and any other content created through the AI-assisted tools, ensuring that all output maintains thematic consistency and respects artist aesthetic preferences while enabling creative subscriber participation.

Implementation examples are described in the following numbered clauses:

Clause 1: A method comprising: maintaining, by a system comprising at least one processor and memory, a data store that (i) associates a plurality of subscribers with subscription tiers and (ii) stores a permission policy that defines allowed subscriber interactions with media items supplied by creators; receiving, from a client device of a subscriber of the plurality of subscribers, the subscriber being identified as belonging to a premium tier, a request relating to a referenced media item; determining, from the permission policy, at least one content-interaction mode that is permitted for the subscriber with respect to the referenced media item; and generating, by one or more artificial-intelligence models selected based on the content-interaction mode and the permission policy, at least one of modified content, supplemental content, or generative content in accordance with the permission policy.

Clause 2: The method of Clause 1, further comprising generating natural language explanations identifying at least one of: harmonic progression patterns, tempo relationships, vocal characteristics, or thematic similarities as a reason for recommending media items to the subscriber.

Clause 3: The method of Clause 2, wherein the natural language explanations are personalized based on a demonstrated musical knowledge level of a user, and a complexity of the natural language explanations varies according to the demonstrated musical knowledge level of the user.

Clause 4: The method of Clause 3, wherein the demonstrated musical knowledge level of the user is determined by analyzing at least: interaction patterns with technical features, dwell time on explanations, search query complexity, and explicit user feedback.

Clause 5: The method of any one of Clauses 1-4, further comprising: analyzing subscriber comments using a trained machine learning model to identify contributions that generate positive community engagement; and increasing visibility of the identified contributions.

Clause 6: The method of Clause 5, further comprising: enabling subscribers to overlay time-synchronized comments on media content; and moderating the time-synchronized comments to maintain positivity while preserving constructive criticism.

Clause 7: The method of any one of Clauses 5-6, further comprising facilitating shared listening experiences by generating AI-assisted discussion prompts based on the at least one of the modified content, supplemental content, or generative content and participant interaction history.

Clause 8: The method of any one of Clauses 5-7, further comprising: predicting, by the artificial-intelligence models, at least one of subscriber combinations or interaction types that are to generate positive community outcomes; and providing a recommended connection based on the at least one of the subscriber combinations or interaction types.

Clause 9: The method of Clause 8, wherein suggesting connections comprises: analyzing subscriber interaction graphs to identify optimal network topologies for community growth; calculating compatibility scores based on factors including at least one of musical taste overlap, interaction style patterns, time zone compatibility, or complementary expertise areas; generating introduction prompts tailored to shared interests identified through content consumption patterns; and monitoring initial interactions to refine future connection predictions.

Clause 10: The method of any one of Clauses 1-9, wherein at least one of the modified content, supplemental content, or generative content comprises dynamically generated interactive visual experiences that aggregate content from multiple sources including digitized album materials, web-based information, and fan submissions.

Clause 11: The method of Clause 10, further comprising generating, by the artificial-intelligence models, interactive visualizations that respond to at least one of audio characteristics, lyrical content, listener movements, biofeedback, or thematic elements of the media item.

Clause 12: The method of Clause 11, wherein the interactive visualizations incorporate at least one of artist imagery, fan-contributed assets, or contextual information.

Clause 13: The method of any one of Clauses 1-12, wherein the subscription tiers are differentiated based on access to artificial-intelligence powered features.

Clause 14: The method of Clause 13, wherein basic tier subscribers receive algorithmic recommendations and premium tier subscribers receive AI-generated explanations, interactive features, and content creation capabilities.

Clause 15: The method of any one of Clauses 13-14, further comprising dynamically allocating computational resources to prioritize AI processing requests from premium tier subscribers.

Clause 16: The method of any one of Clauses 13-15, further comprising: tracking AI feature usage by tier; and adjusting available features based on subscription level and resource availability.

Clause 17: The method of any one of Clauses 13-16, wherein the permission policy indicates different AI capabilities available at each subscription tier, enabling creators to control feature access while maintaining content parity across tiers.

Clause 18: The method of any one of Clauses 1-17, wherein the content-interaction mode includes merchandise design, the method further comprising enabling premium tier subscribers to create designs using AI-generated imagery derived from the media item.

Clause 19: The method of Clause 18, further comprising assigning design privileges based on composite engagement metrics including at least one of listening time, social participation, or community contributions.

Clause 20: The method of Clause 19, further comprising maintaining, by the artificial-intelligence models, brand consistency by adapting fan designs to comply with artist-defined visual guidelines.

Clause 21: The method of any one of Clauses 1-20, wherein the supplemental content comprises AI-generated recommendations.

Clause 22: The method of Clause 21, wherein the AI-generated recommendations comprise at least one of playlist recommendations, song recommendations, album recommendations, or artist recommendations.

Clause 23: The method of Clause 22, further comprising: analyzing cross-platform listening patterns; identifying recommendation confidence scores; and adjusting recommendation algorithms based on subscription tier.

Clause 24: The method of any one of Clauses 1-20, wherein the supplemental content comprises AI-generated visual experiences.

Clause 25: The method of Clause 24, wherein the AI-generated visual experiences comprise non-interactive visualizations in at least one of a 2D format, a 3D format, or an augmented reality format.

Clause 26: The method of Clause 25, wherein the non-interactive visualizations are synchronized to audio characteristics of the media item being played.

Clause 27: The method of Clause 24, wherein the AI-generated visual experiences comprise interactive elements responsive to user input.

Clause 28: The method of any one of Clauses 1-20, wherein the supplemental content comprises AI-powered interactive experiences.

Clause 29: The method of Clause 28, wherein the AI-powered interactive experiences comprise an avatar of an artist.

Clause 30: The method of Clause 29, wherein the avatar is configured to: conduct natural language conversations with the subscriber; access a knowledge base of artist-approved information; and adapt personality traits based on the artist's public persona.

Clause 31: The method of Clause 29 or 30, wherein the avatar interaction is further configured to: store previous conversations with the subscriber; provide personalized responses based on subscriber's listening history; and offer content reveals during conversations.

Clause 32: The method of any one of Clauses 1-20, wherein the supplemental content comprises gamified experiences.

Clause 33: The method of Clause 32, wherein the gamified experiences comprise AI-generated games thematically related to at least one of an artist, a song, an album, or a playlist.

Clause 34: The method of Clause 33, wherein the AI-generated games include: rhythm-based challenges synchronized to the media item; trivia contests with AI-generated questions; and creative challenges judged by AI evaluation models.

Clause 35: The method of any one of Clauses 1-34, further comprising facilitating community-generated content.

Clause 36: The method of Clause 35, wherein facilitating community-generated content comprises: receiving fan-submitted artwork, images, or videos; applying AI moderation to filter inappropriate content; and sequencing approved content with AI-applied effects and animations.

Clause 37: The method of Clause 36, further comprising creating content challenges, wherein creating content challenges comprises: defining challenge parameters through AI analysis of artist style; providing AI-assisted creation tools to subscribers; and implementing hybrid AI-human judging systems.

Clause 38: The method of Clause 37, wherein winning challenge content is: integrated into the artist's official visual experiences; made available to other premium tier subscribers; and attributed to the creating subscriber with optional royalty sharing.

Clause 39: The method of any one of Clauses 1-38, further comprising providing collaborative world-building capabilities.

Clause 40: The method of Clause 39, wherein the collaborative world-building comprises: an AI-mediated interface for subscriber contributions; thematic consistency enforcement through AI style transfer; and automatic filtering of problematic content.

Clause 41: The method of Clause 40, wherein the world-building content is presented as at least one of: an explorable 3D virtual environment; an interactive multimedia narrative; or a collection of interconnected artistic experiences.

Clause 42: The method of any one of Clauses 1-41, further comprising providing an interactive content-modification interface.

Clause 43: The method of Clause 42, wherein the interactive content-modification interface enables the subscriber to at least one of: create derivative content from the referenced media item; transform existing content using AI-assisted tools; or curate collections combining original and modified content.

Clause 44: The method of Clause 43, wherein the content modification is constrained by: the permission policy parameters; technical quality thresholds; and artist-defined creative boundaries.

Clause 45: The method of any one of Clauses 1-44, wherein the permission policy comprises a hierarchical structure including: catalog-level permissions that define default interaction modes for all media items from a creator; item-level permissions that selectively override the catalog-level permissions for specific media items; and feature-level permissions that specify granular AI capabilities within each interaction mode.

Clause 46: The method of Clause 45, wherein the catalog-level permissions are automatically inherited by newly added media items unless explicitly overridden by the creator at the time of upload.

Clause 47: The method of Clause 45 or 46, further comprising: detecting a conflict between catalog-level and item-level permissions; applying a most-restrictive policy rule when permissions conflict; and notifying the creator of permission conflicts for resolution.

Clause 48: The method of any one of Clauses 1-47, further comprising: monitoring aggregate engagement metrics across the plurality of subscribers for each media item; adjusting the permission policy when engagement metrics exceed predefined thresholds; and notifying creators of recommended permission adjustments based on the engagement metrics.

Clause 49: The method of Clause 48, wherein the engagement metrics comprise at least one of: derivative work creation frequency; social sharing rates; average interaction session duration; community sentiment scores; or revenue generation from AI-enabled features.

Clause 50: The method of Clause 48 or 49, further comprising: implementing a probationary period for newly enabled AI features; collecting performance data during the probationary period; and reverting permission changes if negative engagement indicators are detected.

Clause 51: The method of any one of Clauses 45-50, wherein permissions cascade according to a precedence hierarchy comprising, in order of priority: explicit item-level restrictions; creator-defined catalog policies; label or publisher-wide policies; platform default settings; and regulatory compliance requirements.

Clause 52: The method of Clause 51, further comprising: generating a permission inheritance tree that visualizes how permissions cascade from catalog to individual items; identifying permission gaps where no explicit policy is defined; and applying intelligent defaults based on similar media items in the creator's catalog.

Clause 53: The method of any one of Clauses 45-52, wherein the permission policy supports batch operations enabling creators to: apply permission templates across multiple media items simultaneously; create conditional permissions based on temporal factors or release windows; and delegate permission management to authorized representatives with configurable scope limitations.

Clause 54: The method of any one of Clauses 1-53, wherein the permission policy includes version control, the method further comprising: maintaining a history of permission policy changes with timestamps and change reasons; enabling rollback to previous permission states; and providing A/B testing capabilities for different permission configurations.

Clause 55: The method of any one of Clauses 1-54, wherein the permission policy comprises smart contracts that: enforce revenue sharing rules for derivative content; trigger permission changes based on achievement of commercial milestones; and distribute royalties to stakeholders according to AI feature usage metrics.

Clause 56: The method of any one of Clauses 48-50, wherein the dynamic adjustment comprises machine learning-based optimization, the method further comprising: training a permission optimization model on historical engagement data; predicting optimal permission settings for maximizing creator-defined objectives; providing confidence scores for recommended permission changes; and implementing gradual rollout of AI-recommended permissions with continuous monitoring.

Clause 57: The method of any one of Clauses 1-56, wherein the permission policy defines separate permissions for: generative content creation with source attribution requirements; modification extent limits specifying maximum deviation from original content; distribution rights for derivative works across different platforms; commercial use restrictions for AI-generated content; and collaborative creation permissions enabling multi-subscriber projects.

Clause 58: The method of Clause 57, further comprising: encoding the permissions as a structured permission token associated with each media item; cryptographically signing permission tokens to prevent unauthorized modification; and embedding permission tokens in derivative content for downstream rights management.

Clause 59: The method of any one of Clauses 1-58, further comprising: synchronizing permission policies across multiple distribution platforms; resolving permission conflicts between platform-specific requirements; maintaining a canonical permission state in a distributed ledger; and providing real-time permission updates to all integrated platforms.

Clause 60: The method of Clause 59, wherein the permission policy includes platform-specific overrides that: comply with regional content regulations; respect platform-exclusive content windows; and enforce platform-specific technical limitations while maintaining creator intent.

Clause 61: The method of any one of Clauses 1-60, further comprising: receiving natural language queries from the subscriber regarding an artist; processing the queries through an NLP pipeline comprising tokenization, intent classification, entity extraction, and sentiment analysis; retrieving information using a RAG system that performs vector search, semantic matching, and relevance ranking across a knowledge base comprising artist-approved data, fan contributions, and curated web sources; maintaining conversation context across multiple interactions using a context understanding module; and generating natural language responses with fact verification through source validation and consistency checking.

Clause 62: The method of any one of Clauses 1-61, wherein the content-interaction mode includes audio manipulation, the method further comprising enabling subscribers to perform at least one of: DJ-style cross-mixing between songs using non-generative manipulation including speed change, pitch change, or source separation; or controlled music remixing including genre transfer, mashups, tempo modification, or vocal insertion under artist-defined guidelines.

Clause 63: The method of any one of Clauses 1-62, further comprising: analyzing user-provided text descriptions or user-provided video content; and generating audio clips suitable for social media sharing, the audio clips selected and modified based on user-specified parameters including at least one of clip length or content subject matter.

Clause 64: The method of any one of Clauses 1-63, further comprising: authenticating the subscriber through a third-party streaming service account; aggregating engagement data from multiple platforms to generate a unified engagement score; and adjusting available AI features based on the unified engagement score.

Clause 65: The method of any one of Clauses 1-64, further comprising: tracking subscriber engagement across derivative work creation, social interactions, and content consumption; implementing a progression system with unlockable features at achievement thresholds; and masking tier transitions as gameplay achievements rather than subscription upgrades.

Clause 66: A processing system, comprising: a memory comprising computer-executable instructions; and a processor configured to execute the computer-executable instructions and cause the processing system to perform a method in accordance with any one of Clauses 1-65.

Clause 67: A processing system, comprising means for performing a method in accordance with any one of Clauses 1-65.

Clause 68: A non-transitory computer-readable medium storing program code for causing a processing system to perform the steps of any one of Clauses 1-65.

Clause 69: A computer program product embodied on a computer-readable storage medium comprising code for performing a method in accordance with any one of Clauses 1-65.

Clause 70: A method comprising: maintaining, by a system comprising at least one processor and memory, a data store that stores subscriber-specific preference data indicating content characteristics that subscribers have previously engaged with; receiving, from a client device of a subscriber, a content generation request relating to referenced content; selecting, by an AI orchestration layer, one or more artificial-intelligence models from a model library based on the content generation request and the subscriber-specific preference data associated with the subscriber; and generating content using the selected one or more artificial-intelligence models in accordance with the subscriber-specific preference data.

Clause 71: The method of clause 70, wherein the subscriber-specific preference data comprises: interaction patterns with previously generated content including frequency and types of interactions; engagement metrics indicating duration and frequency of content consumption across multiple sessions; explicit feedback provided by the subscriber through ratings, comments, or preference selections; and demonstrated knowledge level determined through analysis of subscriber behavior including interaction complexity and technical feature usage.

Clause 72: The method of clause 70, wherein selecting the one or more artificial-intelligence models comprises: evaluating decision tree logic that maps content generation request types to available artificial-intelligence model categories; filtering available artificial-intelligence models based on matching between model output characteristics and the subscriber-specific preference data; and choosing a specific artificial-intelligence model from the filtered models that has historically generated content characteristics most closely matching the subscriber-specific preference data based on similarity scoring.

Clause 73: The method of clause 70, wherein the content comprises visual content, and wherein selecting the one or more artificial-intelligence models comprises: identifying a preferred visual rendering style from the subscriber-specific preference data by analyzing historical engagement with visual content types; determining whether the preferred visual rendering style corresponds to an abstract rendering approach emphasizing geometric patterns and non-representational forms, a realistic rendering approach emphasizing photorealistic representations, or a particle-based rendering approach emphasizing dynamic particle simulations; and selecting the artificial-intelligence model corresponding to the determined rendering approach from a visual models category in the model library.

Clause 74: The method of clause 70, further comprising: tracking subscriber engagement with the generated content by monitoring interaction metrics, consumption duration, and behavioral indicators; updating the subscriber-specific preference data based on the tracked engagement by adjusting preference weights and adding new preference indicators; and using the updated subscriber-specific preference data for subsequent artificial-intelligence model selections for the subscriber to create progressively refined personalization.

Clause 75: The method of clause 74, wherein tracking subscriber engagement comprises analyzing at least one of: dwell time spent consuming the generated content measured in seconds or minutes of active engagement; interaction frequency with specific content features including replay counts, navigation patterns, or feature activation frequencies; sharing behavior indicating preference for particular content styles through social sharing actions, export operations, or distribution to other subscribers; or explicit ratings or feedback provided by the subscriber through numerical scores, binary preferences, or textual commentary.

Clause 76: The method of clause 70, wherein the subscriber-specific preference data indicates: preferred explanation complexity levels for content recommendations ranging from simplified descriptions to technical analyses; preferred visual style characteristics for generated visualizations including color preferences, animation intensity preferences, or abstraction level preferences; preferred audio modification parameters for remix operations including tempo adjustment ranges, pitch shift preferences, or effect application preferences; or preferred social interaction patterns for community features including commenting frequency preferences, sharing propensity indicators, or collaborative activity preferences.

Clause 77: The method of clause 70, further comprising: maintaining, in a user profile stored in a user data store, configurable visualization parameters including color schemes specifying preferred color palettes, animation speeds specifying preferred motion characteristics, and visual complexity levels specifying preferred detail density; incorporating the configurable visualization parameters into the subscriber-specific preference data by merging explicit configuration settings with inferred preferences from behavioral analysis; and prioritizing artificial-intelligence models that generate content characteristics matching the configurable visualization parameters when multiple models satisfy other selection criteria.

Clause 78: The method of clause 70, wherein selecting the one or more artificial-intelligence models comprises: determining a subscription tier of the subscriber from a subscription management module; filtering available artificial-intelligence models based on the subscription tier to identify tier-appropriate models by removing models restricted to higher tiers; further filtering the tier-appropriate models based on the subscriber-specific preference data to identify preference-matching models; and selecting from the filtered tier-appropriate and preference-matching models based on computational resource availability by prioritizing models with lower computational requirements when resources are constrained.

Clause 79: The method of clause 70, further comprising: analyzing aggregate engagement patterns across multiple subscribers by identifying common behavioral trends and preference correlations; identifying correlations between subscriber characteristics including demographic attributes, listening history profiles, or engagement behavior patterns and preferences for specific artificial-intelligence models or model output characteristics; predicting preferred artificial-intelligence model characteristics for the subscriber based on the identified correlations by matching the subscriber's characteristics to the aggregate patterns; and weighting the artificial-intelligence model selection toward artificial-intelligence models matching the predicted preferred characteristics by applying preference multipliers to selection scoring algorithms.

Clause 80: A processing system, comprising: a memory comprising computer-executable instructions; and a processor configured to execute the computer-executable instructions and cause the processing system to perform a method in accordance with any one of clauses 70-79.

Clause 81: A processing system, comprising means for performing a method in accordance with any one of clauses 70-79.

Clause 82: A non-transitory computer-readable medium storing program code for causing a processing system to perform the steps of any one of clauses 70-79.

Clause 83: A computer program product embodied on a computer-readable storage medium comprising code for performing a method in accordance with any one of clauses 70-79.

Clause 84: A method comprising: maintaining, by a system comprising at least one processor and memory, a feature availability framework that dynamically enables or restricts artificial-intelligence powered features based on contextual factors; receiving, from a client device of a subscriber, a feature access request for an artificial-intelligence powered feature; determining, by an AI orchestration layer in coordination with a permission policy engine, one or more contextual parameters associated with the feature access request, the contextual parameters comprising at least one of geographic location of the client device, current temporal conditions relative to scheduled events, device capability characteristics including hardware specifications and sensor availability, or network condition metrics including bandwidth and latency measurements; evaluating, based on the one or more contextual parameters, whether the requested artificial-intelligence powered feature is contextually available to the subscriber by comparing the contextual parameters against feature availability criteria; and selectively enabling or restricting access to the requested artificial-intelligence powered feature based on the evaluation to ensure regulatory compliance and optimize user experience.

Clause 85: The method of clause 84, wherein determining the one or more contextual parameters comprises: identifying a geographic location of the client device through at least one of IP address geolocation by analyzing network routing information, GPS coordinates obtained from device sensors, or network infrastructure identification through cellular tower triangulation or WiFi access point mapping; retrieving jurisdiction-specific regulations from a permission policies repository, the regulations being applicable to the identified geographic location and defining legal constraints on feature availability; and determining whether the requested artificial-intelligence powered feature is permitted in the identified geographic location based on the jurisdiction-specific regulations by matching feature characteristics against regulatory requirements.

Clause 86: The method of clause 85, wherein the jurisdiction-specific regulations comprise at least one of: copyright licensing restrictions that prohibit content modification operations in specific territories due to territorial licensing agreements or moral rights protections; content generation prohibitions based on regional laws restricting artificial-intelligence generated content or derivative works; data privacy regulations that restrict certain data processing operations including biometric data collection, cross-border data transfers, or automated decision-making; or export control restrictions on artificial-intelligence technologies classified as controlled items under international trade regulations.

Clause 87: The method of any one of clauses 84-86, wherein determining the one or more contextual parameters comprises: identifying a current time and date from system clock information; comparing the current time and date against a schedule of time-based feature availability windows stored in structured data repositories, the schedule defining temporal boundaries for event-specific features; and determining that the requested artificial-intelligence powered feature is temporally available only during specific time windows associated with at least one of live concert events where enhanced interactive features are enabled for attendees, album release windows where exclusive content generation features are temporarily activated, artist appearance schedules where avatar interaction features are made available, or promotional campaign periods where special merchandise design features are unlocked.

Clause 88: The method of clause 87, further comprising: detecting that a time-based feature availability window has commenced by monitoring temporal context information maintained by a context understanding module; automatically enabling the requested artificial-intelligence powered feature for subscribers associated with the time-based event by updating feature access permissions in a subscription management module; and automatically disabling the requested artificial-intelligence powered feature when the time-based feature availability window concludes by reverting feature access permissions to pre-event states, thereby creating limited-time exclusive experiences.

Clause 89: The method of any one of clauses 84-88, wherein determining the one or more contextual parameters comprises: analyzing device capability characteristics of the client device from device types including mobile devices, desktop computers, augmented reality headsets, or smart speakers, the device capability characteristics comprising at least one of processing power specifications measured in processor cores and clock speeds, available memory measured in gigabytes of RAM, graphics processing capabilities including GPU model and VRAM capacity, display resolution measured in pixels, sensor availability including accelerometers, gyroscopes, or biometric sensors, or operating system version affecting API availability; comparing the device capability characteristics against minimum requirements for the requested artificial-intelligence powered feature defined by computational complexity, memory footprint, and hardware dependencies; and determining whether the client device possesses sufficient capabilities to deliver the requested artificial-intelligence powered feature at acceptable quality levels by evaluating whether device specifications meet or exceed minimum thresholds.

Clause 90: The method of clause 89, wherein selectively enabling or restricting access comprises: when the client device meets minimum requirements by possessing specifications exceeding all threshold values, enabling full-quality delivery of the requested artificial-intelligence powered feature by selecting high-fidelity rendering modes, maximum resolution outputs, and complete feature functionality; when the client device partially meets requirements by satisfying some but not all threshold values, enabling degraded-quality delivery with reduced computational complexity through simplified algorithms, lower resolution output through downscaling operations, or simplified feature functionality by disabling computationally intensive sub-features; and when the client device fails to meet minimum requirements by falling below critical threshold values, restricting access to prevent poor user experience and providing notification of required hardware upgrades specifying which device capabilities are insufficient.

Clause 91: The method of any one of clauses 84-90, wherein determining the one or more contextual parameters comprises: measuring network condition metrics through network components, the metrics comprising at least one of available bandwidth measured in megabits per second through throughput testing, connection latency measured in milliseconds through round-trip time measurements, packet loss rates measured as percentage of dropped packets, connection stability assessed through variance in latency measurements, or data transfer costs determined from cellular data pricing or metered connection status; comparing the network condition metrics against bandwidth requirements for the requested artificial-intelligence powered feature defined by data volume requirements, real-time processing constraints, and acceptable latency thresholds; and determining an appropriate quality level for feature delivery based on the comparison by selecting from multiple quality tiers optimized for different network conditions.

Clause 92: The method of clause 91, further comprising: continuously monitoring the network condition metrics during feature delivery through periodic measurements at defined intervals; detecting degradation in network conditions below acceptable thresholds by identifying when measured metrics fall outside acceptable ranges; automatically adjusting feature quality through an effects pipeline by reducing at least one of visual resolution through dynamic downscaling algorithms, frame rate through adaptive frame skipping, audio bitrate through variable bitrate encoding, or computational complexity through algorithm simplification; and automatically restoring full-quality feature delivery when network conditions improve by detecting sustained improvement in measured metrics and progressively re-enabling quality enhancements, thereby maintaining continuous service with graceful degradation.

Clause 93: The method of any one of clauses 84-92, further comprising: when access to the requested artificial-intelligence powered feature is restricted based on contextual parameters, generating an explanation message through a user interface that identifies which contextual constraint caused the restriction by specifying whether the limitation is geographic, temporal, device-based, or network-based; providing, when available, an estimated time or condition change that would enable feature access by calculating based on scheduled events, device upgrade recommendations, or network improvement suggestions; and automatically notifying the subscriber when contextual conditions change to enable previously restricted features by monitoring contextual parameters and triggering notifications upon favorable changes, thereby maintaining transparent communication about feature availability.

Clause 94: The method of any one of clauses 84-93, further comprising: maintaining a feature availability matrix in a permission policies repository that maps combinations of contextual parameters to permitted artificial-intelligence powered features through multi-dimensional lookup tables defining availability rules; updating the feature availability matrix based on at least one of regulatory changes requiring modification of geographic restrictions, licensing agreement modifications altering content usage rights, event scheduling updates adjusting temporal availability windows, or performance optimization data indicating device capability requirements; and synchronizing the feature availability matrix across distributed edge servers to ensure consistent feature restriction enforcement globally by propagating updates through content delivery networks, thereby maintaining uniform policy application across geographic regions.

Clause 95: A processing system, comprising: a memory comprising computer-executable instructions; and a processor configured to execute the computer-executable instructions and cause the processing system to perform a method in accordance with any one of clauses 84-94.

Clause 96: A processing system, comprising means for performing a method in accordance with any one of clauses 84-94.

Clause 97: A non-transitory computer-readable medium storing program code for causing a processing system to perform the steps of any one of clauses 84-94.

Clause 98: A computer program product embodied on a computer-readable storage medium comprising code for performing a method in accordance with any one of clauses 84-94.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

In some aspects, 'artificial intelligence models' or 'AI models' refer to machine learning algorithms, neural networks, and/or trained computational models used for content generation, analysis, and processing. In some aspects, an AI model refers to a trained machine learning model, neural network, and/or other artificial intelligence system configured to process input data and generate output data for generation tasks. In some aspects, the generation tasks may be media generation tasks. AI models may include, but are not limited to, large language models (LLMs), diffusion models, generative adversarial networks (GANs), transformer-based models, convolutional neural networks (CNNs), recurrent neural networks (RNNs), and variational autoencoders (VAEs). Each AI model may be characterized by trained parameters, weights, or other learned configurations that enable the model to perform specific processing operations. AI models may be pre-trained, fine-tuned, or otherwise adapted for specific media modalities or processing tasks. The AI models may be accessed locally, remotely via APIs, or through cloud-based services, and may be provided by different vendors or developers.

In some aspects, 'subscribers' refer to users who have registered accounts with defined subscription tiers.

In some aspects, media modalities may include, but are not limited to, text, audio, image, video, 3D models, and any combinations thereof. Cross-modal operations may refer to processing that involves transformation between different media modalities, combination of multiple modalities, and/or coordination across modalities.

Learning mechanisms described herein, including reinforcement learning, user preference learning, and score updates, may be implemented using various machine learning techniques known in the art or developed in the future. The system's ability to improve over time through accumulated experience is independent of the specific learning algorithms employed.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method comprising:

maintaining, by a system comprising at least one processor and memory, at least one data store that (i) associates a plurality of subscribers with subscription tiers and (ii) stores a permission policy that defines allowed subscriber interactions with media items supplied by creators;

receiving, from a client device of a subscriber of the plurality of subscribers, the subscriber being identified as belonging to a premium tier, a request relating to a referenced media item;

determining, from the permission policy, at least one content-interaction mode that is permitted for the subscriber with respect to the referenced media item; and generating, by one or more AI models selected based on the content-interaction mode and the permission policy, at least one of modified content derived from the referenced media item, supplemental content associated with the referenced media item, or generative content based on characteristics of the referenced media item, in accordance with the permission policy.

2. The method of claim 1, further comprising:

accessing a listening history associated with the subscriber, the listening history comprising media items previously accessed by the subscriber;

analyzing audio characteristics of media items in the listening history to identify at least one of harmonic progression patterns, tempo relationships, vocal characteristics, or thematic similarities;

identifying candidate media items having corresponding audio characteristics that match the analyzed audio characteristics; and generating natural language explanations identifying at least one of: harmonic progression patterns, tempo relationships, vocal characteristics, or thematic similarities as a reason for recommending the candidate media items to the subscriber.

3. The method of claim 2, wherein the natural language explanations are personalized based on a demonstrated musical knowledge level of a subscriber, and a complexity of the natural language explanations varies according to the demonstrated musical knowledge level of the subscriber.

4. The method of claim 3, further comprising:

capturing behavioral data comprising:

interaction patterns with technical features including engagement with detailed audio analysis displays, dwell time measurements indicating duration spent reviewing the natural language explanations, search query complexity analysis indicating use of musical terminology, and explicit feedback indicating subscriber comprehension level; and determining the demonstrated musical knowledge level of the subscriber by processing the behavioral data, wherein each type of behavioral data indicates a level of musical sophistication.

5. The method of claim 1, further comprising:

receiving subscriber comments posted by subscribers in response to media items;

analyzing the subscriber comments using a trained machine learning model to identify subscriber comments that generate elevated community engagement metrics comprising at least one of increased reply counts, increased dwell time by other subscribers, or higher positive sentiment scores; and increasing visibility of the identified subscriber comments.

6. The method of claim 5, further comprising:

enabling subscribers to overlay time-synchronized comments on media items; and moderating the time-synchronized comments by:

filtering comments containing profanity, hate speech, or harassment patterns; and reducing visibility of comments with low value scores and negative sentiment scores.

7. The method of claim 5, further comprising facilitating shared listening experiences with the referenced media item by generating AI-assisted discussion prompts based on the content of the referenced media item, the at least one of the modified content, supplemental content, or generative content derived therefrom, and participant interaction history.

8. The method of claim 5, further comprising:

predicting, by the one or more AI models, at least one of subscriber combinations or interaction types that are to generate community outcomes characterized by sustained mutual engagement, constructive discussion interactions, and shared content creation; and providing a recommended connection based on the at least one of the subscriber combinations or interaction types.

9. The method of claim 1, further comprising:

collecting subscriber data comprising: listening history indicating music consumption patterns, interaction patterns indicating engagement behaviors, time zone data indicating geographic locations and active usage periods, and expertise areas indicating musical knowledge domains;

constructing subscriber interaction graphs from the collected subscriber data by mapping relationships between subscribers based on their interactions with media items and each other;

analyzing the subscriber interaction graphs to identify network topologies for community growth;

calculating compatibility scores between subscriber pairs by processing at least one of: musical taste overlap determined from listening history similarity, interaction style patterns derived from communication preferences, time zone compatibility assessed from temporal availability overlap, or complementary expertise areas identified from knowledge domain analysis;

generating introduction prompts tailored to shared interests identified through content consumption patterns by analyzing commonalities in the listening history and interaction patterns; and monitoring initial interactions between connected subscribers to refine future connection predictions by tracking engagement metrics and updating compatibility scoring algorithms.

10. The method of claim 1, wherein at least one of the modified content, supplemental content, or generative content comprises dynamically generated interactive visual experiences synchronized with playback of the referenced media item, the visual experiences aggregating content from multiple sources including digitized album materials, web-based information, and fan submissions.

11. The method of claim 10, further comprising generating, by the one or more AI models, interactive visualizations that respond to at least one of audio characteristics, lyrical content, listener movements, biofeedback, or thematic elements of the referenced media item.

12. The method of claim 11, wherein the interactive visualizations incorporate at least one of artist imagery, fan-contributed assets, or contextual information.

13. The method of claim 1, wherein the subscription tiers are differentiated based on access to artificial-intelligence powered features, the artificial-intelligence powered features comprising AI capabilities that generate the at least one of modified content, supplemental content, or generative content.

14. The method of claim 13, wherein the subscription tiers comprise at least a basic tier and a premium tier, and wherein subscribers associated with the basic tier receive algorithmic recommendations and subscribers associated with the premium tier receive at least one of AI-generated explanations, interactive features, or content creation capabilities.

15. The method of claim 13, further comprising dynamically allocating computational resources to prioritize AI processing requests from premium tier subscribers.

16. The method of claim 13, further comprising:

tracking artificial-intelligence powered feature usage for each of the subscription tiers; and adjusting availability of the artificial-intelligence powered features based on the subscription tiers and resource availability.

17. The method of claim 1, further comprising enabling premium tier subscribers to create designs using AI-generated imagery derived from the referenced media item.

18. The method of claim 14, further comprising:

tracking engagement metrics for a subscriber comprising: total listening time measured in hours of audio playback, social participation quantified by comments posted and replies contributed, and community contributions quantified by content uploaded and shared;

calculating a composite engagement score by weighting the engagement metrics according to predefined weighting factors;

comparing the composite engagement score against a promotion threshold associated with premium tier eligibility; and when the composite engagement score exceeds the promotion threshold, automatically promoting the subscriber from the basic tier to the premium tier by updating subscription tier data in the at least one data store and enabling access to the artificial-intelligence powered features restricted to the premium tier.

19. The method of claim 1, wherein the supplemental content comprises at least one of an AI-generated playlist, song recommendation, album recommendation, artist recommendation, or playlist recommendation.

20. The method of claim 1, wherein the supplemental content comprises an AI-generated non-interactive visual experience in at least one of a 2D format, a 3D format, or an augmented reality format, the AI-generated non-interactive visual experience configured to accompany music being played by the subscriber.

21. The method of claim 1, wherein the modified content, supplemental content, or generative content comprises at least one of audio content or non-audio visual content.

22. The method of claim 1, wherein the permission policy is defined at a catalog level and applies to multiple media items supplied by a creator.

23. The method of claim 1, wherein the permission policy is defined individually for each media item supplied by a creator.

\* \* \* \* \*